US012289646B2

(12) United States Patent
Parichehrehteroujeni et al.

(10) Patent No.: US 12,289,646 B2
(45) Date of Patent: Apr. 29, 2025

(54) REPORTING FAILURES OF CONDITIONAL HANDOVER MOBILITY OPERATIONS

(71) Applicant: Telefonaktiebolaget LM Ericsson (publ), Stockholm (SE)

(72) Inventors: Ali Parichehrehteroujeni, Linköping (SE); Pradeepa Ramachandra, Linköping (SE); Icaro Leonardo Da Silva, Solna (SE); Angelo Centonza, Granada (ES); Cecilia Eklöf, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 309 days.

(21) Appl. No.: 17/787,850

(22) PCT Filed: Jan. 25, 2021

(86) PCT No.: PCT/SE2021/050042
§ 371 (c)(1),
(2) Date: Jun. 21, 2022

(87) PCT Pub. No.: WO2021/154142
PCT Pub. Date: Aug. 5, 2021

(65) Prior Publication Data
US 2023/0040285 A1 Feb. 9, 2023

Related U.S. Application Data

(60) Provisional application No. 62/967,973, filed on Jan. 30, 2020.

(51) Int. Cl.
*H04W 36/00* (2009.01)
*H04W 36/36* (2009.01)
(52) U.S. Cl.
CPC ... *H04W 36/0079* (2018.08); *H04W 36/0058* (2018.08); *H04W 36/362* (2023.05)

(58) Field of Classification Search
CPC ......... H04W 36/0079; H04W 36/0058; H04W 36/362
See application file for complete search history.

(56) References Cited

U.S. PATENT DOCUMENTS

2013/0242898 A1 9/2013 Plumb et al.
2013/0260745 A1 10/2013 Johansson et al.
(Continued)

FOREIGN PATENT DOCUMENTS

EP 2922334 A1 9/2015
EP 3171638 A1 5/2017
(Continued)

OTHER PUBLICATIONS

"3GPP TR 37.816 V16.0.0", 3rd Generation Partnership Project; Technical Specification Group Radio Access Network; Study on RAN-centric data collection and utilization for LTE and NR (Release 16), Jul. 2019, pp. 1-35.
(Continued)

*Primary Examiner* — Chandrahas B Patel
(74) *Attorney, Agent, or Firm* — Murphy, Bilak & Homiller, PLLC

(57) ABSTRACT

Embodiments include methods, performed by a user equipment, UE, for reporting failures related to mobility operations by the UE to a network node in a radio access network, RAN. Such methods include logging (1210) information associated with a plurality of failures during conditional handover, CHO, operations related to a source cell and one or more first target cells. Such methods also include, after a successful mobility operation to a second target cell served by the network node, reporting (1240) the logged information, associated with the plurality of failures, to the network node. Other embodiments include complementary methods
(Continued)

performed by a network node, as well as UEs and network nodes configured to perform such methods.

18 Claims, 14 Drawing Sheets

(56) References Cited

U.S. PATENT DOCUMENTS

| | | | |
|---|---|---|---|
| 2019/0082363 | A1 | 3/2019 | Park et al. |
| 2022/0264394 | A1* | 8/2022 | Wang ................ H04W 36/0061 |
| 2022/0400416 | A1* | 12/2022 | Yang .................... H04W 24/04 |

FOREIGN PATENT DOCUMENTS

| | | |
|---|---|---|
| WO | 2018188078 A1 | 10/2018 |
| WO | 2019184621 A1 | 10/2019 |
| WO | 2019218990 A1 | 11/2019 |
| WO | 2021003598 A1 | 1/2021 |

OTHER PUBLICATIONS

"3GPP TS 24.301 V16.3.0", 3rd Generation Partnership Project; Technical Specification Group Core Network and Terminals; Non-Access-Stratum (NAS) protocol for Evolved Packet System (EPS); Stage 3 (Release), Dec. 2019, pp. 1-570.

"3GPP TS 32.422 V16.0.0", 3rd Generation Partnership Project; Technical Specification Group Services and System Aspects; Telecommunication management; Subscriber and equipment trace; Trace control and configuration management (Release 16), Dec. 2019, pp. 1-197.

"3GPP TS 33.401 V15.6.0", 3rd Generation Partnership Project; Technical Specification Group Services and System Aspects; 3GPP System Architecture Evolution (SAE); Security architecture (Release 15), Dec. 2018, pp. 1-163.

"3GPP TS 36.133 V16.4.0", 3rd Generation Partnership Project; Technical Specification Group Radio Access Network; Evolved Universal Terrestrial Radio Access (E-UTRA); Requirements for support of radio resource management (Release 16), Dec. 2019, pp. 1-3640.

"3GPP TS 36.213 V16.0.0", 3rd Generation Partnership Project; Technical Specification Group Radio Access Network; Evolved Universal Terrestrial Radio Access (E-UTRA); Physical layer procedures (Release 16), Dec. 2019, pp. 1-568.

"3GPP TS 36.300 V16.0.0", 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16), Dec. 2019, pp. 1-366.

"3GPP TS 36.304 V15.5.0", 3rd Generation Partnership Project; Technical Specification Group Radio Access Network; Evolved Universal Terrestrial Radio Access (E-UTRA); User Equipment (UE) procedures in idle mode (Release 15), Dec. 2019, pp. 1-55.

"3GPP TS 36.321 V15.8.0", 3rd Generation Partnership Project; Technical Specification Group Radio Access Network; Evolved Universal Terrestrial Radio Access (E-UTRA); Medium Access Control (MAC) protocol specification (Release 15), Dec. 2019, pp. 1-134.

"3GPP TS 36.423 V15.8.0", 3rd Generation Partnership Project; Technical Specification Group Radio Access Network; Evolved Universal Terrestrial Radio Access Network(E-UTRAN); X2 application protocol (X2AP) (Release 15), Dec. 2019, pp. 1-422.

"3GPP TS 38.401 V15.7.0", 3rd Generation Partnership Project; Technical Specification Group Radio Access Network; NG-RAN; Architecture description (Release 15), Dec. 2019, pp. 1-47.

"3GPP TS 38.423 V16.0.0", 3rd Generation Partnership Project;Technical Specification Group Radio Access Network; NG-RAN; Xn application protocol (XnAP) (Release 16), Dec. 2019, pp. 1-69.

"3GPP TS 38.473 V16.0.0", 3rd Generation Partnership Project; Technical Specification Group Radio Access Network; NG-RAN; F1 application protocol (F1AP) (Release 16), Dec. 2019, pp. 1-239.

"Enhancements to radio link failure report as part of MDT", 3GPP TSG-RAN WG2#105bis, Tdoc R2-1904014, Xi'an, China, Apr. 8-12, 2019, pp. 1-7.

"Failure handling and RLF report for CHO", 3GPP TSG-RAN WG2 #107bis, R2-1913057, Chongqing, China, Oct. 14-18, 2019, pp. 1-3.

"On RLF reporting for CHO and DAPS", 3GPP TSG-RAN WG2 Meeting #108, R2-1915497, Reno, USA, Nov. 18-22, 2019, pp. 1-3.

"The Reporting of CHO failure", 3GPP TSG-RAN WG2 Meeting #108, R2-1916276, Reno, Nevada, USA, Nov. 18-22, 2019, pp. 1-3.

"3GPP TS 36.331 V15.8.0", 3rd Generation Partnership Project; Technical Specification Group Radio Access Network; Evolved Universal Terrestrial Radio Access (E-UTRA); Radio Resource Control (RRC); Protocol specification (Release 15), Dec. 2019, pp. 1-317.

"3GPP TS 38.331 V15.8.0", 3rd Generation Partnership Project; Technical Specification Group Radio Access Network; NR; Radio Resource Control (RRC) protocol specification (Release 15), Dec. 2019, pp. 1-532.

"3GPP TR 38.801 V14.0.0", 3rd Generation Partnership Project; Technical Specification Group Radio Access Network; Study on new radio access technology: Radio access architecture and interfaces (Release 14), Mar. 2017, pp. 1-91.

"3GPP TS 23.501 V15.4.0", 3rd Generation Partnership Project; Technical Specification Group Services and System Aspects; System Architecture for the 5G System; Stage 2 (Release 15) 3GPP TS 23.501 V15.4.0, Dec. 2018, pp. 1-236.

"3GPP TS 38.401 V15.4.0", 3rd Generation Partnership Project; Technical Specification Group Radio Access Network; NG-RAN; Architecture description (Release 15), Dec. 2018, pp. 1-40.

* cited by examiner

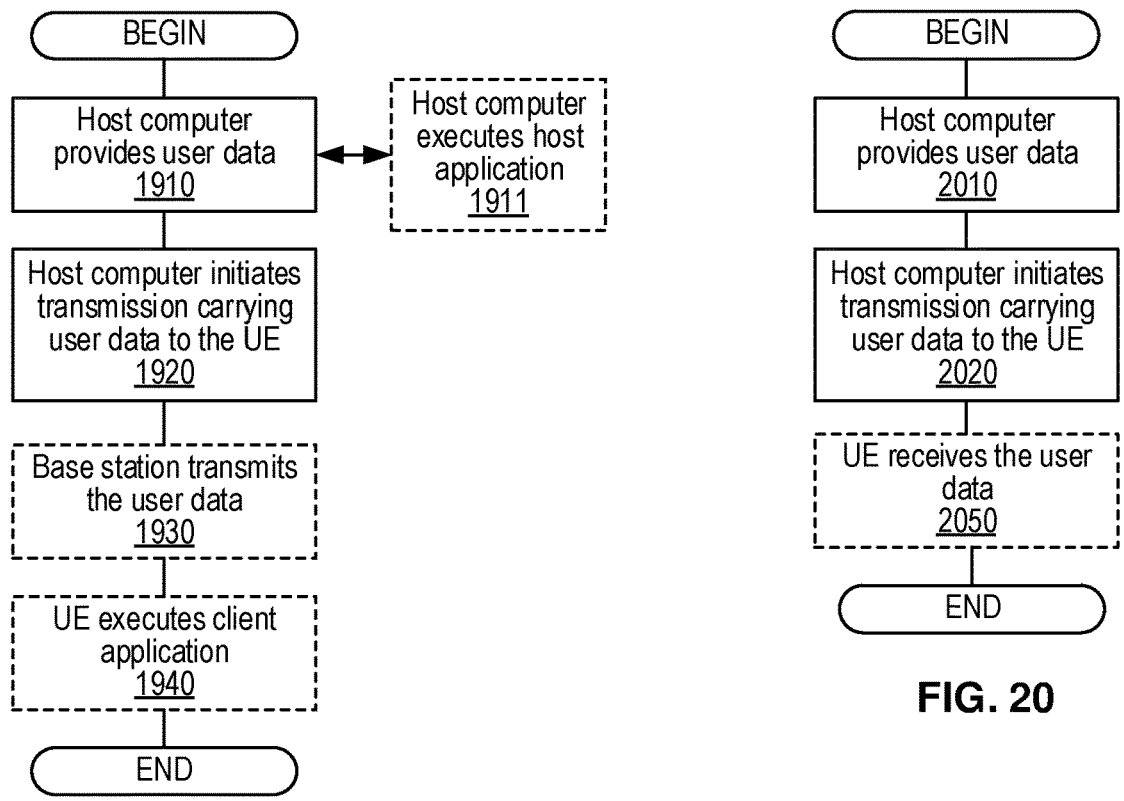
FIG. 19
FIG. 20
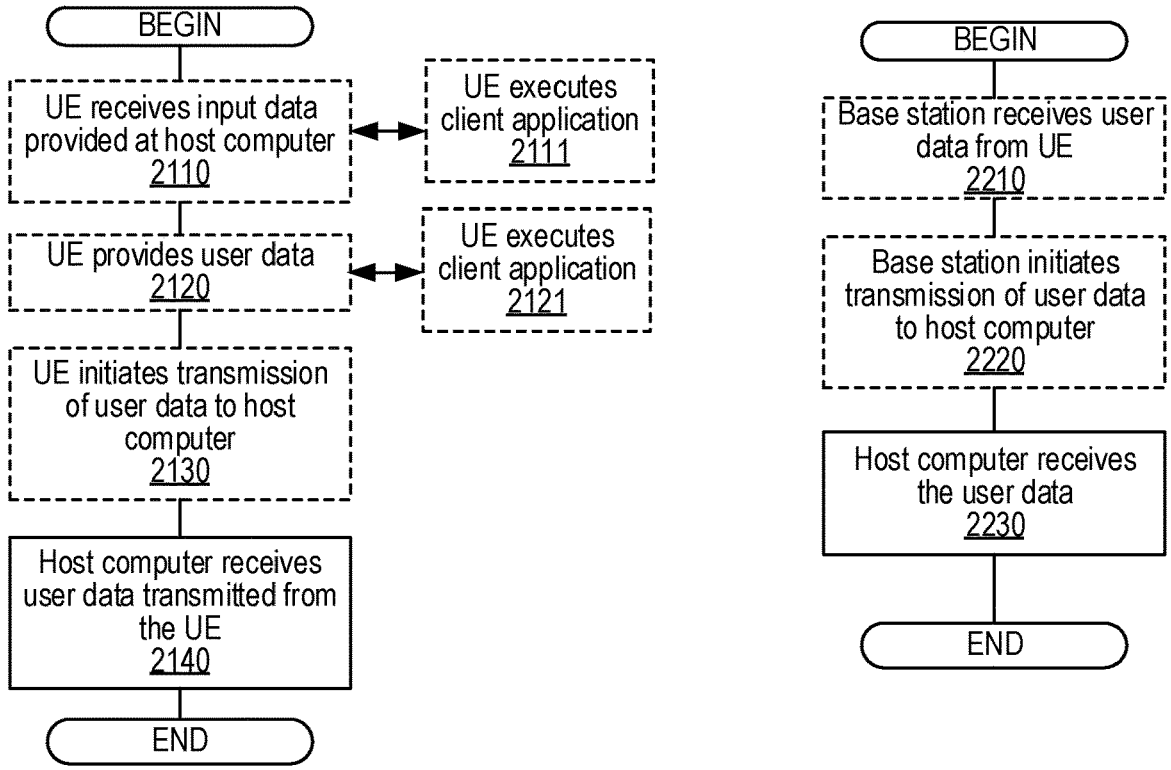
FIG. 21
FIG. 22

REPORTING FAILURES OF CONDITIONAL HANDOVER MOBILITY OPERATIONS

TECHNICAL FIELD

The present application relates generally to the field of wireless communications, and more specifically to devices, methods, computer program products and computer-readable media that improve mobility operations of wireless devices or user equipment (UEs) in a wireless network.

BACKGROUND

Currently the fifth generation ("5G") of cellular systems, also referred to as New Radio (NR), is being standardized within the Third-Generation Partnership Project (3GPP). NR is developed for maximum flexibility to support multiple and substantially different use cases. Besides the typical mobile broadband use case, also machine type communication (MTC), ultra-low latency critical communications (URLCC), side-link device-to-device (D2D), and several other use cases too. The present disclosure relates generally to NR, but the following description of previous-generation Long-Term Evolution (LTE) technology is provided for context since it shares many features with NR.

LTE is an umbrella term for so-called fourth-generation (4G) radio access technologies developed within 3GPP and initially standardized in Release 8 (Rel-8) and Release 9 (Rel-9), also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network.

LTE continues to evolve through subsequent releases. LTE Rel-10 supports bandwidths larger than 20 MHz, but with backward compatibility towards LTE Rel-8. One way to achieve this is by Carrier Aggregation (CA), whereby a Rel-10 terminal can receive multiple Component Carriers (CCs), each preferably having the same structure as a Rel-8 carrier. LTE Rel-12 introduced dual connectivity (DC) whereby a UE can be connected to two network nodes simultaneously, thereby improving connection robustness and/or capacity.

An overall exemplary architecture of a network comprising LTE and SAE is shown in FIG. 1. E-UTRAN 100 includes one or more evolved Node B's (eNB), such as eNBs 105, 110, and 115, and one or more user equipment (UE), such as UE 120. As used within the 3GPP standards, "user equipment" or "UE" means any wireless communication device (e.g., smartphone or computing device) that is capable of communicating with 3GPP-standard-compliant network equipment, including E-UTRAN as well as UTRAN and/or GERAN, as the third-generation ("3G") and second-generation ("2G") 3GPP RANs are commonly known.

As specified by 3GPP, E-UTRAN 100 is responsible for all radio-related functions in the network, including radio bearer control, radio admission control, radio mobility control, scheduling, and dynamic allocation of resources to UEs in uplink and downlink, as well as security of the communications with the UE. These functions reside in the eNBs, such as eNBs 105, 110, and 115. Each of the eNBs can serve a geographic coverage area including one more cells, including cells 106, 111, and 115 served by eNBs 105, 110, and 115, respectively.

The eNBs in the E-UTRAN communicate with each other via the X2 interface, as shown in FIG. 1. The eNBs also are responsible for the E-UTRAN interface to the EPC 130, specifically the S1 interface to the Mobility Management Entity (MME) and the Serving Gateway (SGW), shown collectively as MME/S-GWs 134 and 138 in FIG. 1. In general, the MME/S-GW handles both the overall control of the UE and data flow between the UE and the rest of the EPC. More specifically, the MME processes the signaling (e.g., control plane) protocols between the UE and the EPC, which are known as the Non-Access Stratum (NAS) protocols. The S-GW handles all Internet Protocol (IP) data packets (e.g., data or user plane) between the UE and the EPC and serves as the local mobility anchor for the data bearers when the UE moves between eNBs, such as eNBs 105, 110, and 115.

EPC 130 can also include a Home Subscriber Server (HSS) 131, which manages user- and subscriber-related information. HSS 131 can also provide support functions in mobility management, call and session setup, user authentication and access authorization. The functions of HSS 131 can be related to the functions of legacy Home Location Register (HLR) and Authentication Centre (AuC) functions or operations. HSS 131 can also communicate with MMES 134 and 138 via respective Sha interfaces.

In some embodiments, HSS 131 can communicate with a user data repository (UDR)—labelled EPC-UDR 135 in FIG. 1—via a Ud interface. EPC-UDR 135 can store user credentials after they have been encrypted by AuC algorithms. These algorithms are not standardized (i.e., vendor-specific), such that encrypted credentials stored in EPC-UDR 135 are inaccessible by any other vendor than the vendor of HSS 131.

FIG. 2 illustrates a block diagram of an exemplary control plane (CP) protocol stack between a UE, an eNB, and an MME. The exemplary protocol stack includes Physical (PHY), Medium Access Control (MAC), Radio Link Control (RLC), Packet Data Convergence Protocol (PDCP), and Radio Resource Control (RRC) layers between the UE and eNB. The PHY layer is concerned with how and what characteristics are used to transfer data over transport channels on the LTE radio interface. The MAC layer provides data transfer services on logical channels, maps logical channels to PHY transport channels, and reallocates PHY resources to support these services. The RLC layer provides error detection and/or correction, concatenation, segmentation, and reassembly, reordering of data transferred to or from the upper layers. The PDCP layer provides ciphering/deciphering and integrity protection for both CP and user plane (UP), as well as other UP functions such as header compression. The exemplary protocol stack also includes non-access stratum (NAS) signaling between the UE and the MME.

The RRC layer controls communications between a UE and an eNB at the radio interface, as well as the mobility of a UE between cells in the E-UTRAN. After a UE is powered ON it will be in the RCC_IDLE state until an RRC connection is established with the network, at which time the UE will transition to RRC_CONNECTED state (e.g, where data transfer can occur). The UE returns to RRC_IDLE after the connection with the network is released. In RCC_IDLE state, the UE does not belong to any cell, no RRC context has been established for the UE (e.g., in E-UTRAN), and the UE is out of UL synchronization with the network. Even so, a UE in RCC_IDLE state is known in the EPC and has an assigned IP address.

Furthermore, in RCC_IDLE state, the UE's radio is active on a discontinuous reception (D RX) schedule configured by upper layers. During I)RX active periods (also referred to as "DRX On durations"), an RRC_IDLE UE receives system information (SI) broadcast by a serving cell, performs measurements of neighbor cells to support cell reselection, and monitors a paging channel for pages from the EPC via an eNB serving the cell in which the UE is camping.

A UE must perform a random-access (RA) procedure to move from RRC_IDLE to RRC_CONNECTED state. In RRC_CONNECTED state, the cell serving the UE is known and an RRC context is established for the UE in the serving eNB, such that the UE and eNB can communicate. For example, a Cell Radio Network Temporary Identifier (C-RNTI)—a UE identity used for signaling between UE and network—is configured for a UE in RRC_CONNECTED state.

Generally speaking, a physical channel corresponds to a set of resource elements carrying information that originates from higher layers. Downlink (i.e., eNB to UE) physical channels provided by the LTE PHY include Physical Downlink Shared Channel (PDSCH), Physical Multicast Channel (PMCH), Physical Downlink Control Channel (PDCCH), Relay Physical Downlink Control Channel (R-PDCCH), Physical Broadcast Channel (PBCH), Physical Control Format Indicator Channel (PCFICH), and Physical Hybrid ARQ Indicator Channel (PHICH). In addition, the LTE PHY downlink includes various reference signals, synchronization signals, and discovery signals.

PBCH carries the basic system information, required by the UE to access the network. PDSCH is the main physical channel used for unicast DL data transmission, but also for transmission of RAR (random access response), certain system information blocks, and paging information. PHICH carries HARQ feedback (e.g., ACK/NAK) for UL transmissions by the UEs. Similarly, PDCCH carries DL scheduling assignments (e.g., for PDSCH), UL resource grants (e.g., for PUSCH), channel quality feedback (e.g., CSI) for the UL channel, and other control information.

Uplink (i.e., UE to eNB) physical channels provided by the LTE PHY include Physical Uplink Shared Channel (PUSCH), Physical Uplink Control Channel (PUCCH), and Physical Random-Access Channel (PRACH). In addition, the LTE PHY uplink includes various reference signals including demodulation reference signals (DM-RS), which are transmitted to aid the eNB in the reception of an associated PUCCH or PUSCH; and sounding reference signals (SRS), which are not associated with any uplink channel.

PRACH is used for random access preamble transmission. PUSCH is the counterpart of PDSCH, used primarily for unicast UL data transmission. Similar to PDCCH, PUCCH carries uplink control information (UCI) such as scheduling requests, CSI for the DL channel, HARQ feedback for eNB DL transmissions, and other control information.

The multiple access scheme for the LTE PHY is based on Orthogonal Frequency Division Multiplexing (OFDM) with a cyclic prefix (CP) in the downlink, and on Single-Carrier Frequency Division Multiple Access (SC-FDMA) with a cyclic prefix in the uplink. To support transmission in paired and unpaired spectrum, the LTE PHY supports both Frequency Division Duplexing (FDD) (including both full- and half-duplex operation) and Time Division Duplexing (TDD). FIG. 3 shows an exemplary radio frame structure ("type 1") used for LTE FDD downlink (DL) operation. The DL radio frame has a fixed duration of 10 ms and consists of 20 slots, labeled 0 through 19, each with a fixed duration of 0.5 ms. A 1-ms subframe comprises two consecutive slots where subframe i consists of slots 2i and 2i+1. Each exemplary FDD DL slot consists of $N^{DL}_{symb}$ OFDM symbols, each of which is comprised of $N_{sc}$ OFDM subcarriers. Exemplary values of $N^{DL}_{symb}$ can be 7 (with a normal CP) or 6 (with an extended-length CP) for subcarrier spacing (SCS) of 15 kHz. The value of $N_{sc}$ is configurable based upon the available channel bandwidth. Since persons of ordinary skill in the art are familiar with the principles of OFDM, further details are omitted in this description.

As shown in FIG. 3, a combination of a particular subcarrier in a particular symbol is known as a resource element (RE). Each RE is used to transmit a particular number of bits, depending on the type of modulation and/or bit-mapping constellation used for that RE. For example, some REs may carry two bits using QPSK modulation, while other REs may carry four or six bits using 16- or 64-QAM, respectively. The radio resources of the LTE PHY are also defined in terms of physical resource blocks (PRBs). A PRB spans $N^{RB}_{sc}$ sub-carriers over the duration of a slot (i.e., $N^{DL}_{symb}$ symbols), where $N^{RB}_{sc}$ is typically either 12 (with a 15-kHz sub-carrier bandwidth) or 24 (7.5-kHz bandwidth). A PRB spanning the same $N^{RB}_{sc}$ subcarriers during an entire subframe (i.e., $2N^{DL}_{symb}$ symbols) is known as a PRB pair. Accordingly, the resources available in a subframe of the LTE PHY DL comprise $N^{DL}_{RB}$ PRB pairs, each of which comprises $2N^{DL}_{symb} \cdot N^{RB}_{sc}$ REs. For a normal CP and 15-KHz SCS, a PRB pair comprises 168 REs.

The LTE FDD uplink (UL) radio frame can be configured in a similar manner as the exemplary FDD DL radio frame discussed above. Using terminology consistent with the above DL description, each UL slot consists of $N^{UL}_{symb}$ OFDM symbols, each of which is comprised of $N_{sc}$ OFDM subcarriers.

The LTE PHY maps the various DL and UL physical channels to REs and/or RBs in the resource grid (e.g., the exemplary DL arrangement shown in FIG. 3). Both PDCCH and PUCCH can be transmitted on aggregations of one or several consecutive control channel elements (CCEs), and a CCE is mapped to the physical resource based on resource element groups (REGs), each of which is comprised of a plurality of REs.

Since LTE-release 8, three Signaling Radio Bearers (SRBs), namely SRB0, SRB1 and SRB2 have been available for the transport of RRC and Non Access Stratum (NAS) messages between the UE and network node. A new SRB, known as SRB ibis, was also introduced in rel-13 for supporting DoNAS (Data Over NAS) in NB-IoT. SRB0 is for RRC messages using the CCCH logical channel, and it is used for handling RRC connection setup, RRC connection resume and RRC connection re-establishment. Once the UE is connected to the network node (i.e., RRC connection setup or RRC connection reestablishment/resume has succeeded), SRB1 is used for handling RRC messages (which may include a piggybacked NAS message) as well as for NAS messages prior to the establishment of SRB2, all using DCCH logical channel. On the other hand, SRB2 is used for RRC messages, including logged measurement information as well as for NAS messages, all using DCCH logical channel. SRB2 has a lower priority than SRB1, because logged measurement information and NAS messages can be lengthy and could cause the blocking of more urgent and smaller SRB1 messages. SRB2 is always configured by E-UTRAN after security activation.

As briefly mentioned above, the LTE RRC layer controls UE mobility between cells in the E-UTRAN. A common mobility procedure for UEs in RRC_CONNECTED state (e.g., with an active connection) is handover (HO) between cells. A UE is handed over from a source or serving cell, provided by a source node, to a target cell provided by a target node. In general, for LTE, handover source and target nodes are different eNBs, although intra-node handover between different cells provided by a single eNB is also possible.

Seamless handovers are a key feature of 3GPP technologies. Successful handovers ensure that the UE moves around in the coverage area of different cells without causing too much interruptions in the data transmission. However, handover can have various problems related to robustness. For example, the HO command (e.g., RRCConnectionReconfiguration with mobilityControlInfo or RRCReconfiguration with a reconfigurationWithSync) is normally sent when the radio conditions for the UE are already quite bad. As such, the HO command may need to be segmented (e.g., to allow for redundancy to protect against errors) and/or retransmitted (e.g., using HARQ) one or more times before it reaches the UE. In such case, the HO command may not reach the UE in time (or at all) before the degraded connection with the source node (e.g., the node hosting the UE's current serving cell) is dropped.

Some "conditional mobility" techniques have been proposed to address these and other difficulties with handovers and other mobility procedures. Nevertheless, these "conditional mobility" techniques suffer from various deficiencies—particularly when a UE is provided multiple target cell candidates for handover—that make them unsuitable in various use cases, scenarios, and/or conditions.

SUMMARY

Accordingly, exemplary embodiments of the present disclosure address these and other mobility-related issues in wireless communication networks by providing improvements to mobility operations, such as handovers (including conditional handovers) between a source node (or cell) and a target node (or cell).

Exemplary embodiments include methods (e.g., procedures) for reporting failures related to mobility operations by a user equipment (UE) to a network node in a radio access network (RAN). The exemplary method can be performed by a UE (e.g., wireless device, MTC device, NB-IoT device, modem, etc. or component thereof) in communication with a network node (e.g., base station, eNB, gNB, etc., or components thereof) serving a cell in the RAN (e.g., E-UTRAN, NG-RAN).

These exemplary methods can include logging information associated with a plurality of failures during conditional handover (CHO) operations related to a source cell and one or more first target cells. In various embodiments, the plurality of failures can include any of the following:
- one or more radio link failures (RLF) while monitoring for CHO in the source cell; and
- one or more failed CHOs from the source cell to any of the first target cells.

In some embodiments, the plurality of failures can include a first failure and a subsequent second failure. The first failure can be RLF while monitoring for CHO in the source cell or a failed CHO to a first one of the first target cells. The second failure can be a failed CHO to a second one of the first target cells. In some of these embodiments, in response to the first failure, the second one of the first target cells is selected based on the UE having a stored CHO configuration for the second one of the first target cells.

In various embodiments, the logged information, for each failure, can include one or more of the following (as described in more detail above):

- random-access failure information for one of the first target cells;
- UE measurement information, at time of the failure, associated with one or more of the following: the source cell, one or more of the first target cells, the second target cell, one or more candidate target cells associated with a CHO configuration, and one or more neighbor cells not associated with a CHO configuration;
- UE location information at the time of the failure;
- UE measurements for other radio technologies;
- CHO configuration associated with the failure; and
- UE timer values at the time of the failure.

In some embodiments, the logged information for each failure can include a failure type identifier. Each failure type identifier can indicate one of the following types of failures: radio link failure (RLF), handover failure, or conditional handover (CHO) failure. In some embodiments, the logged information for each failed CHO includes a CHO configuration associated with the failure.

These exemplary methods can also include, after a successful mobility operation to a second target cell served by the network node, reporting the logged information, associated with the plurality of failures, to the network node. In various embodiments, the successful mobility operation can include one of the following:
- a handover to the second target cell;
- a CHO to the second target cell;
- a connection re-establishment procedure with the second target cell;
- a connection resume procedure with the second target cell; or
- a connection setup procedure with the second target cell.

In some embodiments, the exemplary method can also include sending a message, to the network node, indicating availability of the logged information and receving, from the network node, a request for the logged information. The request can be in response to the message indicating availability. The logged information can be reported in response to the request.

Other exemplary embodiments include methods (e.g., procedures) for receiving failure reports related to CHO operations by a user equipment (UE). These exemplary methods can be performed by a network node (e.g., base station, eNB, gNB, etc., or component thereof) in a radio access network (RAN, e.g., E-UTRAN, NG-RAN).

These exemplary methods can include performing a successful mobility operation, for the UE, with respect to a second target cell served by the network node. In various embodiments, the successful mobility operation can include one of the following:
- a handover to the second target cell;
- a CHO to the second target cell;
- a connection re-establishment procedure with the second target cell;
- a connection resume procedure with the second target cell; or
- a connection setup procedure with the second target cell.

These exemplary methods can also include subsequently receiving information, from the UE, associated with a plurality of failures during UE CHO operations related to a source cell and one or more first target cells. For example, the information can be received after the successful mobility operation.

In some embodiments, the plurality of failures can include a first failure and a subsequent second failure. The first failure can be a radio link failure (RLF) while monitoring for CHO in the source cell or a failed CHO to a first one of the first target cells. The second failure can be a failed CHO to a second one of the first target cells.

In various embodiments, the plurality of failures can include any of the following:
one or more radio link failures (RLF) during UE monitoring for CHO in the source cell; and
one or more failed CHOs of the UE from the source cell to any of the first target cells.

In various embodiments, the received information, for each failure, can include one or more of the following (as described in more detail above):
random-access failure information for one of the first target cells;
UE measurement information, at time of the failure, associated with one or more of the following: the source cell, one or more of the first target cells, the second target cell, one or more candidate target cells associated with a CHO configuration, and one or more neighbor cells not associated with a CHO configuration;
UE location information at the time of the failure;
UE measurements for other radio technologies;
CHO configuration associated with the failure; and
UE timer values at the time of the failure.

In some embodiments, the received information for each failure can include a failure type identifier. Each failure type identifier can indicate one of the following types of failures: radio link failure (RLF), handover failure, or conditional handover (CHO) failure. In some embodiments, the logged information for each failed CHO includes a CHO configuration associated with the failure.

In some embodiments, the exemplary method can also include receiving a message, from the UE, indicating availability of the information and transmitting, to the UE, a request for the information. The request can be in response to the message indicating availability. The information can be received in response to the request.

In some embodiments, the exemplary method can also include, based on the received information, determining one or more further nodes associated with the failures during the UE CHO operations, parsing the received information into respective information associated with the respective further nodes, and sending the respective information to the respective further nodes. Such information can facilitate optimization of mobility settings (e.g., CHO configurations) by those respective nodes.

Other exemplary embodiments include user equipment (UEs, e.g., wireless devices, MTC devices, NB-IoT devices, modems, etc. or components thereof) and network nodes (e.g., base stations, gNBs, eNBs, etc. or components thereof) configured to perform operations corresponding to any of the exemplary methods described herein. Other exemplary embodiments include computer program products and non-transitory, computer-readable media storing computer-executable instructions that, when executed by processing circuitry of a UE or a network node, configure such UEs or network nodes to perform operations corresponding to any of the exemplary methods described herein.

These and other objects, features, and advantages of embodiments of the present disclosure will become apparent upon reading the following Detailed Description in view of the Drawings briefly described below.

BRIEF DESCRIPTION OF THE DRAWINGS

FIG. 6, which includes

FIGS. 19-22 are flow diagrams of exemplary methods and/or procedures for transmission and/or reception of user data that can be implemented, for example, in the exemplary communication systems and/or networks illustrated in FIGS. 17-18.

DETAILED DESCRIPTION

Figure 1:
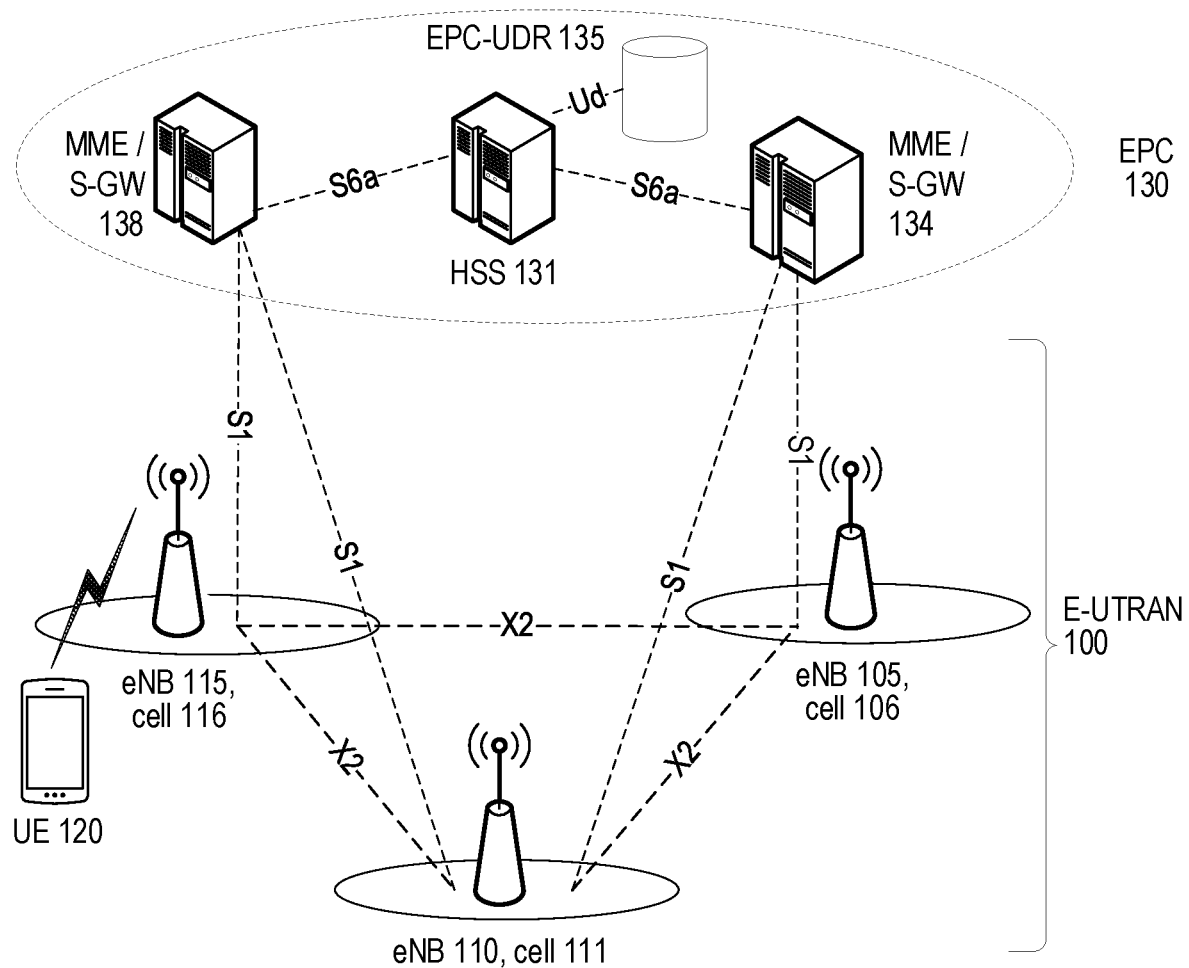
FIG. 1 is a high-level block diagram of an exemplary architecture of the Long-Term Evolution (LTE) Evolved UTRAN (E-UTRAN) and Evolved Packet Core (EPC) network, as standardized by 3GPP.
Figure 2:
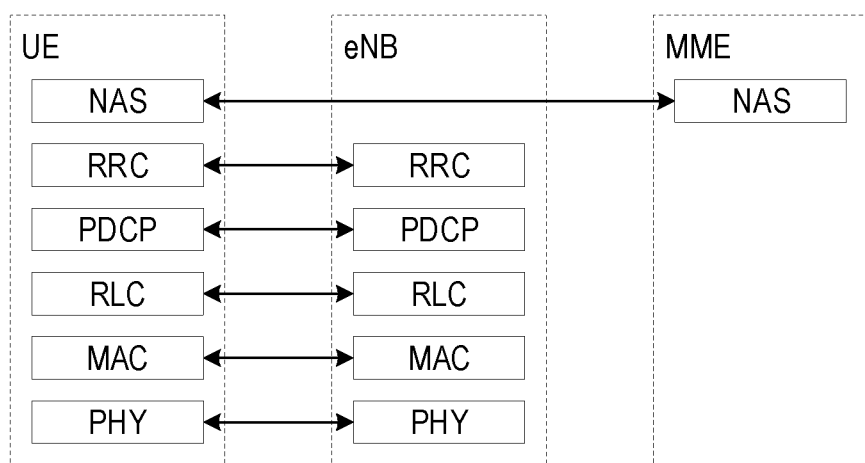
FIG. 2 is a high-level illustration of exemplary protocol layers of the control-plane portion of the radio interface between a user equipment (UE) and the E-UTRAN.
Figure 3:
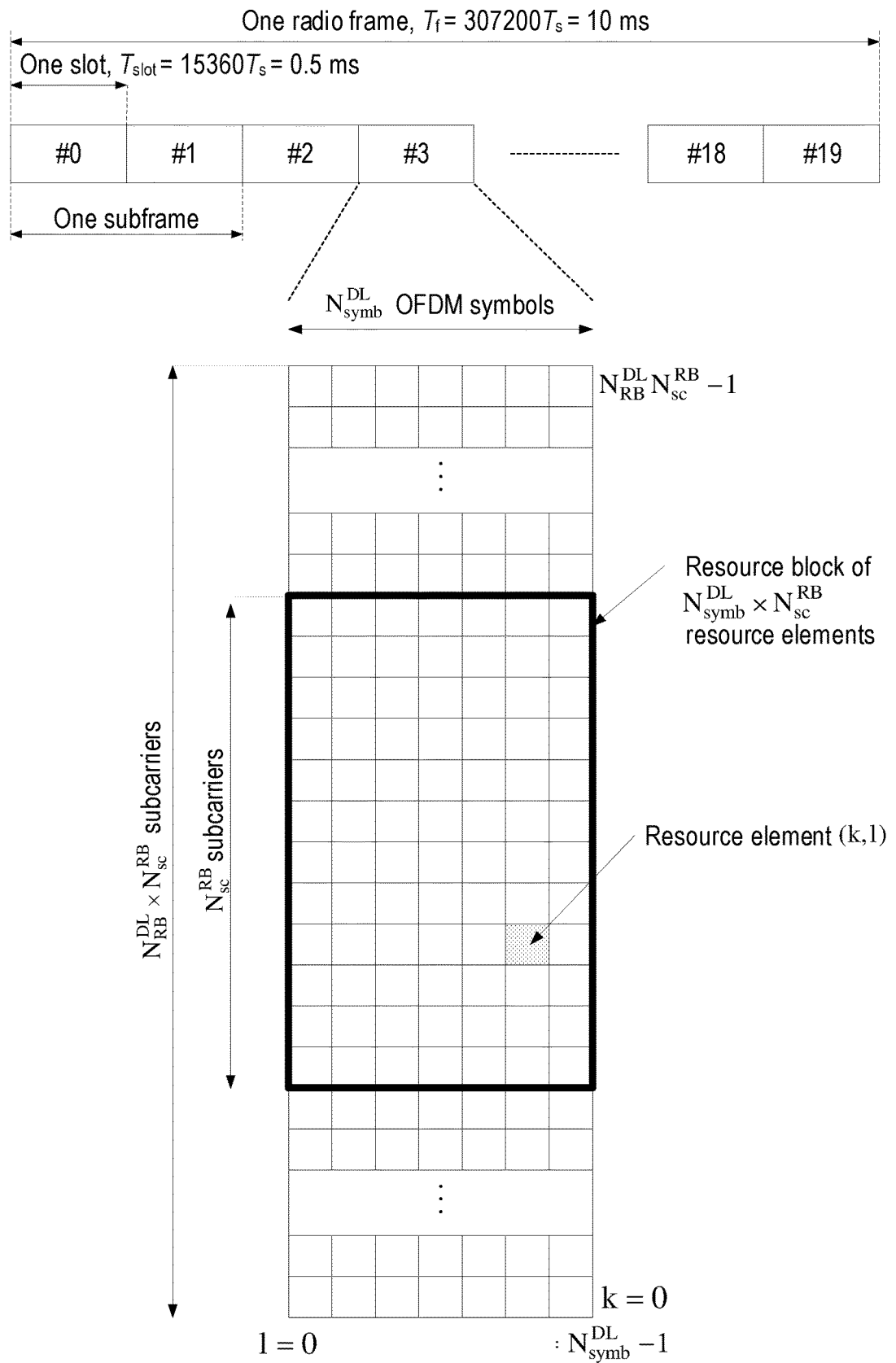
FIG. 3 is a block diagram of an exemplary downlink LTE radio frame structure used for frequency division duplexing (FDD) operation.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods and/or procedures disclosed herein do not have to be performed in the exact order disclosed, unless a step is explicitly described as following or preceding another step and/or where it is implicit that a step must follow or precede another step. Any feature of any of the embodiments disclosed herein can be applied to any other embodiment, wherever appropriate. Likewise, any advantage of any of the embodiments can apply to any other embodiments, and vice versa. Other objectives, features and advantages of the enclosed embodiments will be apparent from the following description.

Furthermore, the following terms are used throughout the description given below:

Radio Node: As used herein, a "radio node" can be either a "radio access node" or a "wireless device."

Radio Access Node: As used herein, a "radio access node" (or "radio network node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (network node) in a 3GPP LTE network), a high-power or macro base station, a low-power base station (e.g., a micro base station, a pico base station, a home eNB, or the like), an integrated access backhaul (IAB) node, and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" (or "WD" for short) is any type of device that has access to (i.e., is served by) a cellular communications network by communicate wirelessly with network nodes and/or other wireless devices. Unless otherwise noted, the term "wireless device" is used interchangeably herein with "user equipment" (or "UE" for short). Some examples of a wireless device include, but are not limited to, a UE in a 3GPP network and a Machine Type Communication (MTC) device. Communicating wirelessly can involve transmitting and/or receiving wireless signals using electromagnetic waves, radio waves, infrared waves, and/or other types of signals suitable for conveying information through air.

Network Node: As used herein, a "network node" is any node that is either part of the radio access network or the core network of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other to functions (e.g., administration) in the cellular communications network.

Note that the description given herein focuses on a 3GPP cellular communications system and, as such, 3GPP terminology or terminology similar to 3GPP terminology is oftentimes used. However, the concepts disclosed herein are not limited to a 3GPP system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from the concepts, principles, and/or embodiments described herein.

In addition, functions and/or operations described herein as being performed by a wireless device or a network node may be distributed over a plurality of wireless devices and/or network nodes. Furthermore, although the term "cell" is used herein, it should be understood that (particularly with respect to 5G NR) beams may be used instead of cells and, as such, concepts described herein apply equally to both cells and beams.

As discussed above, seamless handovers are a key feature of 3GPP technologies. Successful handovers ensure that the UE moves around in the coverage area of different cells without causing too much interruptions in the data transmission. However, handover can have various problems related to robustness. For example, the HO command (e.g., RRCConnectionReconfiguration with mobilityControlInfo or RRCReconfiguration with a reconfigurationWithSync) is normally sent when the radio conditions for the UE are already quite bad. As such, the HO command may need to be segmented (e.g., to allow for redundancy to protect against errors) and/or retransmitted (e.g., using HARQ) one or more times before it reaches the UE. In such case, the HO command may not reach the UE in time (or at all) before the degraded connection with the source node (e.g., the node hosting the UE's current serving cell) is dropped. When the UE fails to handover to the "correct" neighbor cell in such scenarios, the UE will declare radio link failure (RLF) or Handover Failure (HOF).

One solution to improve mobility robustness is called "conditional handover" ("CHO" for short) or "early handover command." In order to avoid the dependence on the serving radio link conditions at the time when the UE should execute the handover, the RRC signaling for the handover can be provided to the UE earlier, while conditions on the radio link are better. Nevertheless, these "conditional mobility" techniques suffer from various deficiencies—particularly when a UE is provided multiple target cell candidates for handover—that make them unsuitable in various use cases, scenarios, and/or conditions. These issues are discussed in more detail below.

To support mobility (e.g., handover or reselection) between cells and/or beams, a UE can perform periodic cell search and measurements of signal power and quality (e.g., reference signal received power, RSRP, and reference signal received quality, RSRQ) in both RRC_CONNECTED and RRC_IDLE states. The UE is responsible for detecting new neighbor cells, and for tracking and monitoring already detected cells. The detected cells and the associated measurement values are reported to the network. An LTE UE can perform such measurements on various downlink reference signals (RS) including, e.g., cell-specific Reference Signal (CRS), MB SFN RS, UE-specific demodulation RS (DM-RS) associated with PDSCH, DM-RS associated with EPDCCH or M/NPDCCH, positioning RS (PRS), and channel state information RS (CSI-RS).

UE measurement reports to the network can be configured to be periodic or aperiodic based a particular event. For example, the network can configure a UE to perform measurements on various carrier frequencies and various radio access technologies (RATs) corresponding to neighbor cells, as well as for various purposes including, e.g., mobility and/or positioning. The configuration for each of these measurements is referred to as a "measurement object." Furthermore, the UE can be configured to perform the measurements according to a "measurement gap pattern" (or "gap pattern" for short), which can include a measurement gap repetition period (MGRP, i.e., how often a recurring gap is available for measurements) and a measurement gap length (MGL, i.e., the length of each recurring gap).

When performing radio link monitoring (RLM), a UE monitors the radio link quality of its serving cell and uses that information to decide whether the UE is in-sync (IS) or out-of-sync (OOS) with respect to that serving cell. In particular, the UE in RRC_CONNECTED state measures downlink reference signals (e.g., CRS). In general, CRS are associated with a particular cell and can be derived by the UE based on the cell's Physical Cell Identifier (PCI). For purposes of RLM, a "cell" is the single connectivity entity transmitting both PDCCH and CRS.

If RLM indicates number of consecutive OOS conditions, then the UE starts a radio link failure (RLF) procedure and declares RLF after expiry of a timer (e.g., T310). The actual procedure is carried out by comparing the estimated CRS measurements to some target block error rates (BLERs), called Qout and Qin. In particular, Qout and Qin correspond to BLER of hypothetical PDCCH/PCIFCH transmissions from the serving cell, with exemplary values of 10% and 2%, respectively. In NR, the network can define the RS type (e.g., CSI-RS and/or SSB), exact resources to be monitored, and even the BLER target for IS and OOS indications. In general, RLM is performed at the PHY layer (L1).

In general, the mapping between CRS-based downlink quality and the hypothetical PDCCH BLER is UE implementation-specific. However, the performance is verified by conformance tests defined for various environments. Also, the downlink quality is calculated based on the reference signal received power (RSRP) measured for CRS distributed over the entire DL bandwidth of the cell, since UE does not know in advance the RBs in which the PDCCH will be scheduled by the network.

When the UE is not configured for DRX operation, OOS occurs when the downlink radio link quality estimated over the most recent 200-ms period becomes worse than the threshold Qout. Similarly, without DRX the IS occurs when the downlink radio link quality estimated over the most recent 100-ms period becomes better than the threshold Qin. Upon detection of OOS, the UE initiates the evaluation of IS.

To facilitate sufficient UE energy consumption reduction during DRX operation, OOS and IS evaluation periods are extended based on the configured DRX cycle length. Since the UE starts IS evaluation whenever OOS occurs, the same period (TEvaluate_Qout_DRX) is used for the evaluations of OOS and IS conditions. However, upon starting RLF timer T310 and until its expiry, the IS evaluation period is shortened to 100 ms, i.e., the same as without DRX. If T310 is stopped due to N311 consecutive IS indications, the UE performs IS evaluation according to the DRX-based period (TEvaluate_Qout_DRX).

Figure 4:
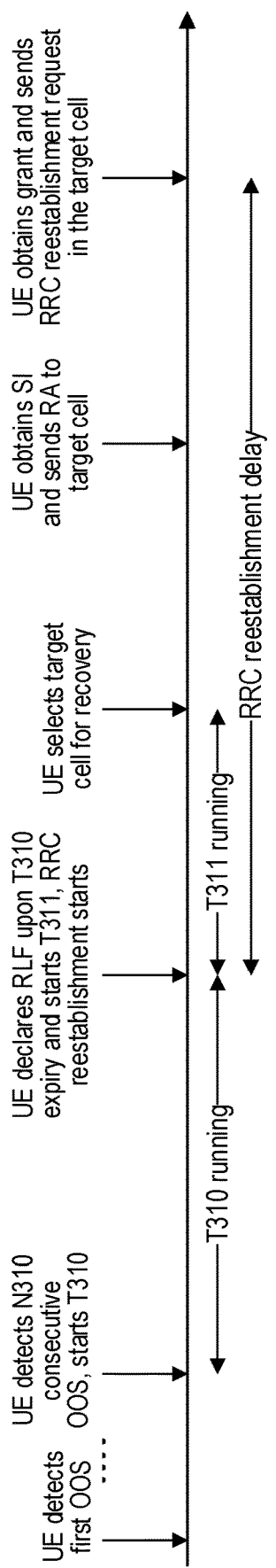
FIG. 4 shows a timeline of any exemplary UE radio link monitoring (RLM) procedure for LTE.

FIG. 4 shows a timeline of any exemplary UE RLM procedure for LTE. In general, the UE takes one RLM sample (e.g., of IS or OOS condition) per 10-ms radio frame. In this example, the UE detects N310 consecutive OOS conditions (e.g., via RLM) and then initiates timer T310.

After expiry of T310, the UE declares RLF, starts RRC reestablishment including timer T311, and initiates a search for the "best" target cell. After selecting a target cell for reestablishment, the UE obtains system information (SI) for the target cell and performs a random access (e.g., via RACH). Ultimately, the UE obtains access to the target cell and sends an RRC Reestablishment Request message to the target cell, with an overall delay after initiating reestablishment.

In addition to T310 expiry, an LTE UE may also experience RLF due to a reaching a maximum number of RLC retransmissions, due to a random-access problem (e.g., indicated by MAC layer), or due to handover failure after timer T304 expiry. During handover, T304 is started when the UE receives a handover command from the source cell, with the value of the timer T304 set to allow the UE to try the maximum random access attempts to the target cell. When the timer T304 is expired, a radio link failure due to handover is detected.

When a RLF is triggered for any of the above reasons, a connection re-establishment is triggered. As mentioned above, a UE performs cell search to determine the best target cell for re-establishment. According to 3GPP TS 36.300, a UE can select the same cell, a different cell from the same eNB, or a prepared cell from a different eNB, wherein the activity can be resumed (i.e., the UE stays in connected mode) via radio connection re-establishment procedure since the previous UE context can be retrieved by inter-cell communication. In general, a prepared eNB (providing a "prepared cell") is an eNB which has admitted the UE during an earlier executed handover preparation phase or has obtained the UE's context. When a prepared cell is not available, the UE selects an unprepared cell, which requires the UE to go to RCC_IDLE state and attempt to setup the radio connection from scratch.

The UE actions related to RLF are described in more detail in 3GPP TS 36.331 (see e.g. sections 5.3.10.7, 5.3.11.1 and 5.3.11.2).

To summarize, LTE RLM has been specified so that the network does not need to configure any parameter. Rather, a UE generates IS/OOS events internally based on lower-layer measurements. On the other hand, RLF and secondary cell group (SCG) failure procedures are RRC-configured and controlled by the network via counters N310, N311, N313, and N314 (which act as filters to avoid premature RLF triggering) and timers T310, T311, T313, and T314.

In LTE, a UE performs random access for many different purposes, both in RRC_CONNECTED and RCC_IDLE states. For example, a UE uses the RACH for initial network access. In LTE the RACH cannot carry any user data, which is exclusively sent on the Physical Uplink Shared CHannel (PUSCH). Instead, one of the primary purposes of RACH is to facilitate UE uplink timing synchronization. Once uplink synchronization is achieved for a UE, the eNB can schedule PUSCH resources for the UE.

Other relevant UE use scenarios for RACH include the following:
  UE in RRC_CONNECTED state, but not uplink-synchronized, needs to send new uplink data or control information (e.g. an event-triggered measurement report).
  UE in RRC_CONNECTED state, but not uplink-synchronized, needs to receive new downlink data, and therefore to transmit corresponding ACK/NACK in the uplink.
  (UE in RRC_CONNECTED state handing over from its current serving cell to a target cell.

For positioning purposes in RRC_CONNECTED state, when timing advance is needed for UE positioning.

UE transitions from RCC_IDLE to RRC_CONNECTED state, e.g., for initial access or tracking area updates.

UE recovering from radio link failure.

Uplink-synchronized UE uses RACH to send a Scheduling Request (SR) if it does not have any other uplink resource.

Figure 5:
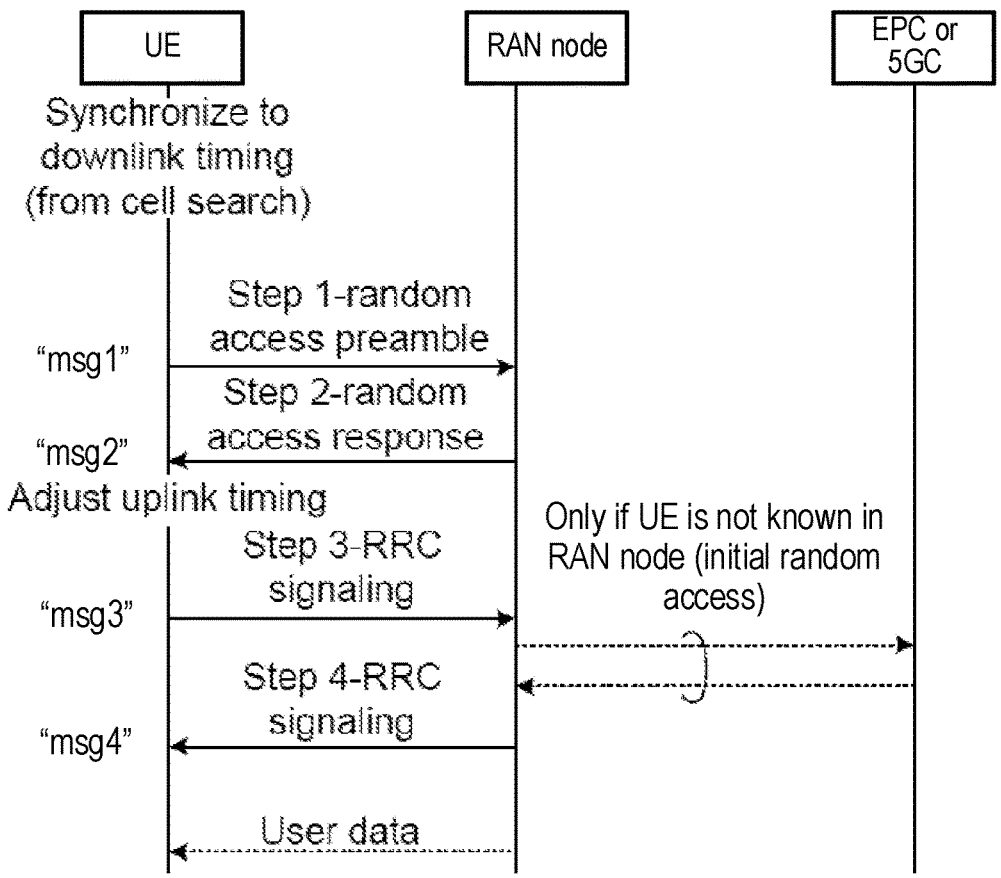
FIG. 5 illustrates an exemplary contention-based random-access (CBRA) procedure.

UEs conventionally access a serving cell using a contention-based random-access procedure (CBRA). FIG. 5 illustrates the steps (i.e., operations) in an exemplary CBRA procedure. In step 1, the UE randomly selects one random-access preamble (or sequence) from a known set of preambles indicated by the network (i.e., the serving RAN node, such as eNB or gNB) via broadcast system information (SI). The purpose of random preamble selection is to avoid collisions by separating the preambles in a code domain. In LIE there are typically 64 different available preambles in each cell, which are divided into multiple groups. The grouping allows the UE to signal with one bit whether it needs radio resources for a small or large message (data package). That is, a randomly selected preamble from one group can indicate that the UE has a small amount of data to send, while a preamble selected from another group indicates that resources for a larger amount of data are needed.

The UE transmits the RA preamble (also referred to as "msg1") only on certain UL time/frequency resources, which are also made known to all UEs via the broadcast SI. The eNB detects all non-colliding preambles transmitted by UEs in these resources and estimates the roundtrip time (RTT) for each UE. The RTT is needed to achieve time and frequency synchronization in both DL and UL for the UE in the LTE or NR OFDM-based systems.

In Step 2, the RA response (RAR, also referred to as "msg2") from the RAN node carries the RTT, a temporary UE identity (e.g., C-RNTI), and UL resources for the UE to use in step 3. As mentioned above, the UE can use the received RTT to adjust its transmission window in order to obtain UL synchronization. The RAR is scheduled on a DL shared channel (e.g., PDSCH) and is indicated on a DL control channel (e.g., PDCCH) using an identity reserved for RARs. All UEs that transmitted a RA preamble monitor PDCCH for RAR within a time window after their preamble transmissions. If the UE does not detect a RAR within the time window, it declares a failed attempt and repeats step 1 using an increased transmission power level for the preamble (or msg1). Note that the RAN node will detect the presence of a particular preamble but not how many UEs concurrently transmitted that particular preamble.

The received UL resource assignment to be used in Step 3 is essentially a pointer (e.g., to a location on the UL time/frequency resource grid) that informs the UE exactly which subframes (time) to transmit in and what resource blocks (frequency) to use. The higher layers indicate the 20-bit UL Grant to the PHY, as defined in 3GPP TS 36.321 and 36.213. In the LTE PHY, this is referred to the RAR Grant and is carried on the PDCCH by a specific format of downlink control information (DCI). The RAR Grant size balances between minimizing number of bits to convey the resource assignment while providing some resource assignment flexibility for the RAN scheduler. In general, the length of the PHY message depends on the system bandwidth.

In step 3, upon correct reception of the RAR in step 2, the UE is time synchronized with the RAN node. Before any transmission can take place, a unique identity C-RNTI is assigned. The UE transmission in this step (referred to as "msg3") uses the UL channel radio resources assigned in step 2. Additional message exchange might also be needed depending on the UE state, as indicated in FIG. 6 by the arrows drawn with dashed lines. In particular, if the UE is not known in the RAN node, then some signaling is needed between the RAN node and the core network (e.g., EPC or 5GC).

In step 4, the RAN node sends msg4 via RRC signal to possibly solve contention. If the UE has used the allocated C-RNTI in msg3, this C-RNTI is echoed back in MSG.4 to indicate that collision is resolved. Otherwise, the network addresses the UE with the TC-RNTI and includes in the MAC payload the UE identity used in msg3. If the UE identity matches the one the UE has the UE considers the contention resolved. In case a collision is detected, the UE shall perform preamble re-transmission and initiates random access again. Collision is considered to be detected in the following cases:

After transmitting msg3 using a C-RNTI assigned by target cell (e.g. in handover or when UE is in RRC_CONNECTED), UE detects a msg4 not addressing its C-RNTI and contention resolution timer expires;

After transmitting a msg3 using a TC-RNTI assigned to it in the RAR, UE detects a msg4 addressing the same TC-RNTI but the UE Identity in the msg4 payload does not match the UE's identity transmitted on msg3.

Note that collision is not considered in MAC as a failure case. As such, upper layers are not aware that a collision has occurred.

In addition to the cases mentioned above, preamble retransmission is also triggered when the UE sends a preamble and does not receive a RAR within a RAR time window. In that case, the UE performs preamble power ramping and transmits the preamble again. In all these cases, when RAR time window expires when collision is detected, the UE performs preamble retransmission. A parameter provided by the RAN node via RRC signaling (see parameter preambleTransMax in RACH-ConfigCommon IE) controls how many times the UE should attempt preamble retransmission.

Preamble retransmission can increase latency for the UE in accessing the cell. To reduce this latency, a two-step random-access procedure has been proposed as an alternative to the four-step CBRA illustrated in FIG. 5. This alternative procedure is often referred to as contention-free random access (CFRA), since a UE uses resources that are reserved for it by the network. In other words, the UE does not have to contend with other UEs for resources in CFRA.

Accordingly, there will be scenarios when the network fails to handover a UE to the "correct" neighbor cell in time, resulting in the UE declaring RLF or HOF. RLF/HOF ultimately results in poor user experience since there is no reliable communication channel (radio link) available between the UE and the network, such that the UE is not reachable by the network (and vice versa).

Upon declaring HOF and RLF, the UE may take autonomous actions such as trying to select a new target cell and initiate reestablishment procedure so that so that it can be reachable again by the network. Reestablishing the connection requires signaling with the newly selected cell including a random access procedure (e.g., as in FIG. 5) and subsequent messaging including RRCReestablishmentRequest, RRCReestablishment, RRCReestablishmentComplete, RRCReconfiguration, and RRCReconfigurationComplete. This can add considerable latency and/or delay until the UE can exchange data with the network again.

In addition to the expiration of T310, discussed above in relation to FIG. 4, other causes of RLF defined in 3GPP TS 36.331 include:

Expiry of the measurement reporting associated timer T312 (not receiving the handover command from the network within this timer's duration despite sending the measurement report when T310 was running);

Upon reaching the maximum number of RLC retransmissions;

Upon receiving random access problem indication from the MAC entity;

Since RLF degrades UE/network performance and user experience, it is in the interest of the network to understand reasons for UE RLFs and to optimize mobility related parameters (e.g. trigger conditions for UE measurement reports) to avoid future RLFs. In early LTE releases, only the UE was aware of some information about the radio quality at the time of RLF, the actual reason for declaring RLF, etc. An RLF reporting procedure was included in the mobility robustness optimization (MRO) solution in LTE Rel-9, in particular 3GPP TS 36.331 (RRC specification). In this procedure, the UE logs relevant information at the time of declaring RLF and reports it to a target cell to which the UE subsequently connects after reestablishment. The eNB serving the target cell can then forward the UE's report to the eNB serving the cell in which the RLF originated.

The Rel-9 RLF measurement report generated by the UE has been enhanced with more details in subsequent LTE releases. Currently, the measurements included in the measurement report are:

Measurement quantities (RSRP, RSRQ) of the last serving cell (PCell).

Measurement quantities of the neighbor cells in different frequencies of different RATs (EUTRA, UTRA, GERAN, CDMA2000).

Measurement quantity (RSSI) associated to WLAN Aps.

Measurement quantity (RSSI) associated to Bluetooth beacons.

Location information, if available (including location coordinates and velocity)

Globally unique identity of the last serving cell, if available, otherwise the PCI and the carrier frequency of the last serving cell.

Tracking area code of the PCell.

Time elapsed since the last reception of the 'Handover command' message.

C-RNTI used in the previous serving cell.

Whether or not the UE was configured with a DRB having QCI value of 1.

3GPP TS 36.331 section 5.3.11.3 specifies the UE's detection and logging of the RLF related parameters to be included in a measurement report.

After the RLF is declared, the RLF report is logged and stored in a UE variable VarRLF-Report. After the UE selects a target cell and succeeds with reestablishment, it includes an indication in the RRC Reestablishment Complete message that an RLF report is available. Upon receiving an UEInformationRequest message in the target cell with a flag rlf-ReportReq-r9, the UE includes the RLF report in an UEInformationResponse message sent to the network.

Based on the globally-unique identity of the last serving cell specified in the RLF report (i.e., where the RLF failure occured), the network node providing the target cell (also referred to as "target node") in which the UE reestablishes can forward the RLF report to the network node providing the last serving cell (also referred to as "source node"). Forwarding of the RLF report facilitates tuning handover-related parameters (e.g., measurement report triggering thresholds) in the last serving cell. Two different types of inter-node messages have been specified in 3GPP TS 36.423 for this purpose: Radio link failure indication and Handover report. The Radio link failure indication procedure is used to transfer information regarding RRC re-establishment attempts or received RLF reports between eNBs. This message is sent from the eNB in which the UE performs reestablishment to the eNB providing the UE's last serving cell of the UE.

In Rel-16 discussions of self-optimizing networks (SON) and minimization of drive testing (MDT), the concept of a successful handover report was described in section 5.3.2.5 of 3GPP TR 37.816 (v16.0.0). In general, this concept involves the UE sending additional information to the target cell upon successfully completing a handover. In this way, additional knowledge available at the UE about the radio conditions, failure possibilities, etc. can be provided to the network, which can facilitate tuning handover parameters. However, the specification work of this feature was postponed to rel-17.

Handovers are normally triggered when the UE is at the edge of a cell's coverage and experiences poor radio conditions. Once the UE experiences such conditions, the network may be unable to receive a measurement report from the UE, such that the network will not initiate a handover procedure. Even if the network does receive measurement reports, the UE may be unable to receive the network's handover command (i.e. the RRCReconfiguration message with a reconfigurationWithSync field) due to poor DL radio conditions. Moreover, in poor radio conditions the DL message is often segmented, which increases the likelihood of retransmissions with associated delay. As such, even if the handover command reaches the UE, it may be too late. For these reasons, failed transmission of handover command is a common reason for unsuccessful handovers.

Figures 6A, 6B:
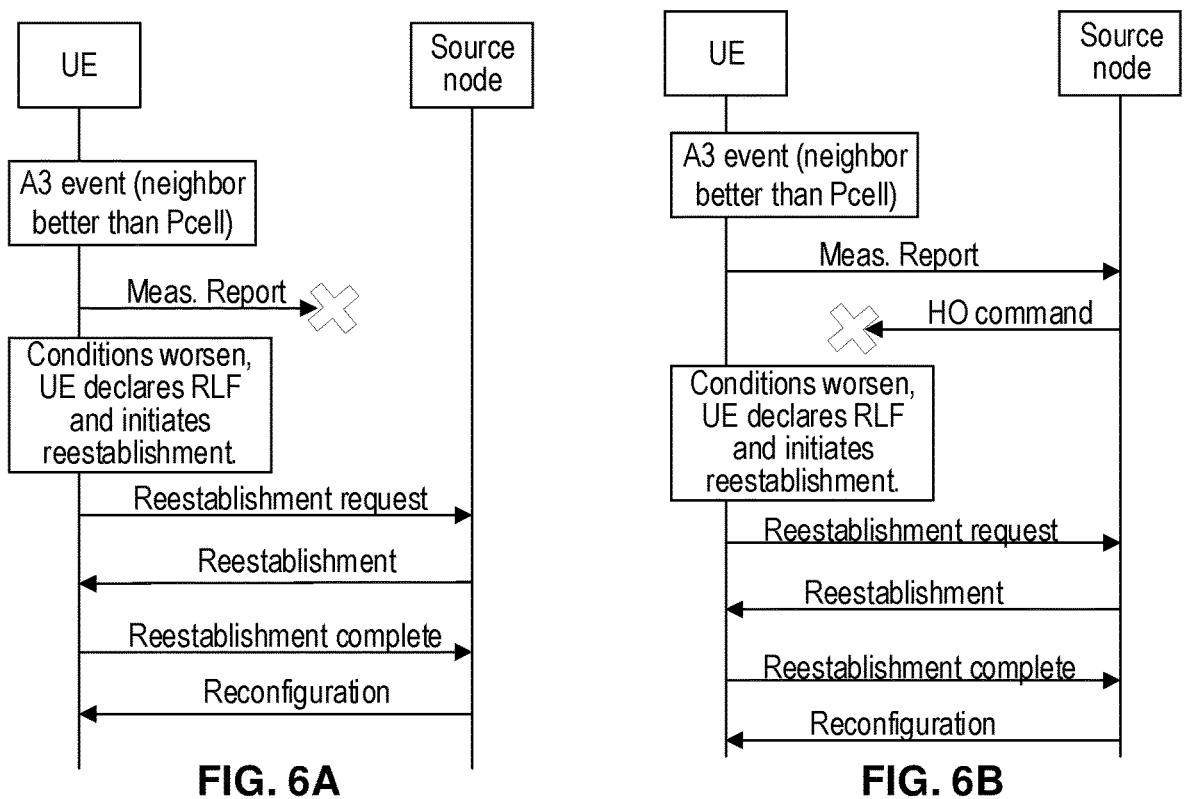
FIGS. 6A and 6B, illustrates various exemplary robustness problems that can occur during UE mobility operations, such as during a handover.

FIG. 6, which includes FIGS. 6A and 6B, illustrates various exemplary robustness problems that can occur during UE mobility operations, such as during a handover. In the scenario shown in FIG. 6A, based on neighbour-cell measurements, the UE triggers an "A3 event" where the neighbour cell is better than the UE's primary cell (PCell). In response, the UE attempts to send a measurement report about this condition to the source (e.g., serving) node. Due to the rapidly degrading uplink radio conditions, however, the source node does not receive the measurement report from the UE. Conditions continue to degrade in the UE's source cell, ultimiately prompting the UE to declare RLF and attempt to reestablish a connection with the source node (which may or may not be successful). In FIG. 6B, the source node correctly receives the UE's measurement report but due to degrading downlink radio conditions, the UE does not receive the HO command from the source node. Ultimately, the same result occurs in both cases shown in FIG. 6.

As such, there is a need to imrprove mobility robustness in NR systems, and work items for mobility enhancements in LTE and NR have started in 3GPP Rel-16. The main objectives of the work items are to improve the robustness at handover and to decrease the interruption time at handover. In LTE and NR, different solutions to increase mobility robustness have been discussed in the past. One solution is based on Dual Connectivity (DC) introduced in LTE Rel-12. In DC, the UE is connected to two network nodes simultaneously. This improves mobility robustness by serving control plane traffic (e.g. used for measurement reporting and handover command) by a robust macro layer at lower frequency and providing capacity boost with higher frequencies. This feature is often referred to as "UP/CP split." Alternately, DC can be configured such that control plane signaling is exchanged via both connected nodes. This is referred to as "RRC diversity" and can increase robustness due to the diversity in temporal and spatial domains.

As briefly mentioned above, another solution is called "conditional handover" (or "CHO" for short) or "early handover command." In CHO, transmission and execution of the handover command are separated. This allows the handover command to be sent earlier to UE when the radio conditions are still good, thus increasing the likelihood that the message is successfully transferred. The execution of the handover command is done at later point in time based on an associated execution condition. The execution condition is typically in the form a threshold, e.g., signal strength of candidate target cell becomes X dB better than the serving cell (so-called A3 event) or signal strength of serving cell becomes worse than X dBm and signal strength of candidate target cell becomes better than Y dBm (so-called A5 event).

A preceding measurement reporting event could use a threshold Y that is selected to be lower than the one in the handover execution condition. This allows the serving cell to prepare the handover upon reception of an early measurement report and to provide the RRCConnectionReconfiguration with mobilityControlInfo (for LTE), or a RRCReconfiguration with either a reconfigurationWithSync or a CellGroupConfig (for NR) at a time when the radio link between the source cell and the UE is still relatively stable. The execution of the handover is done at a later point in time (and threshold) that is optimal and/or preferred for handover execution.

In the present disclosure, a cell for which conditional handover (or other conditional mobility procedure) is configured is called a "candidate target cell" or "potential target cell". These terms will be used interchangeably. Similarly, a radio network node controlling a candidate/potential target cell is denoted "candidate target node" or "potential target node". These terms will also be used interchangeably. Once the CHO execution condition has been fulfilled for a particular candidate/potential target cell and CHO execution towards this particular cell has been triggered, this particular cell is no longer a "potential" or "candidate" target cell, and will be referred to herein as the "target cell" for the handover.

Figure 7:
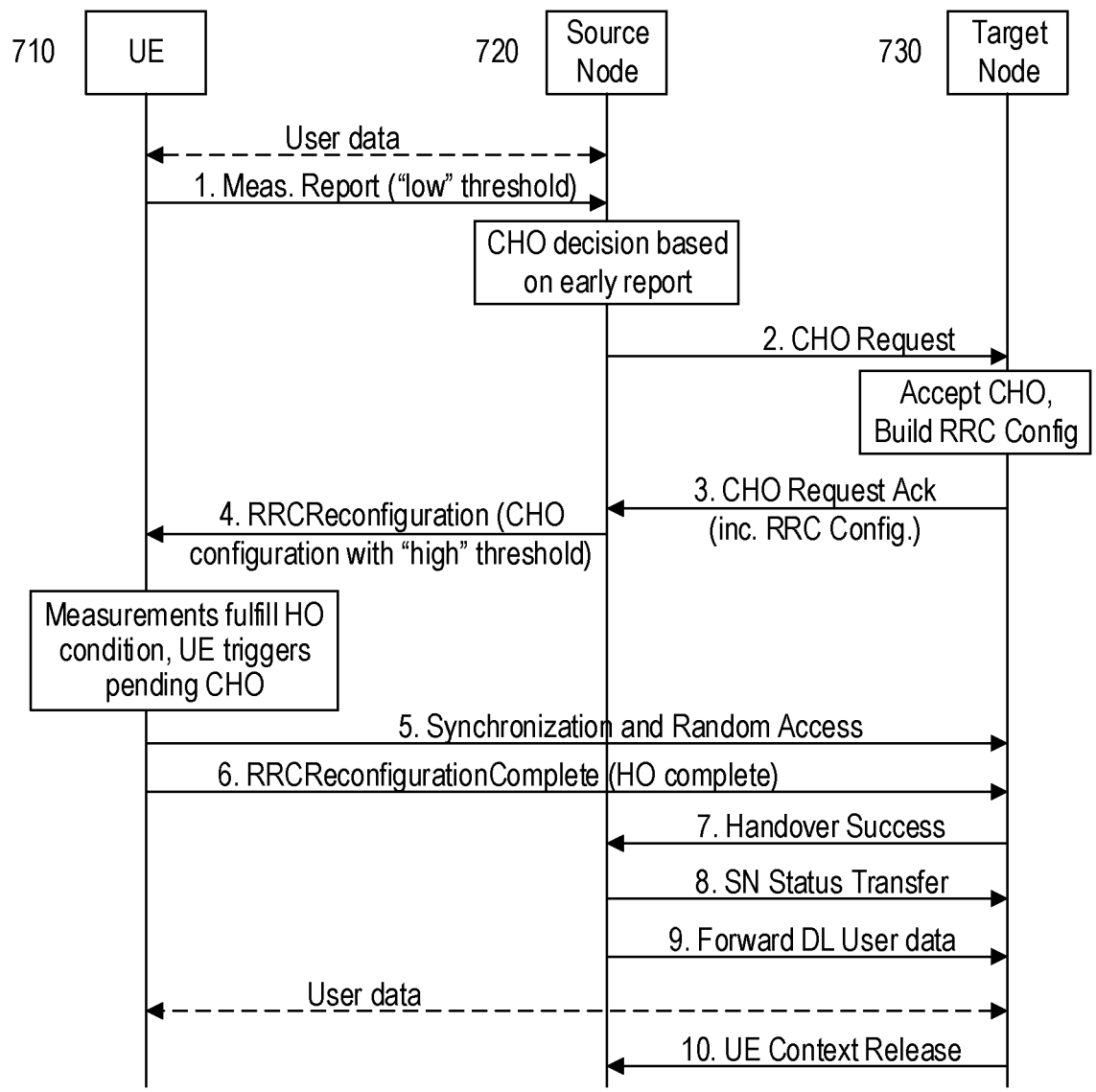
FIG. 7 illustrates an exemplary signal flow between a UE, a source node, and a target node for a conditional handover (HO), according to various exemplary embodiments of the present disclosure.

FIG. 7 illustrates an exemplary signal flow between a user equipment (UE) 710, a source node 720, and a target node 730 for a conditional handover (HO), according to exemplary embodiments of the present disclosure. For example, the source and target nodes can be eNBs, gNBs (as base stations in 5G/NR networks are commonly known), components of eNBs or gNBs (e.g., CUs and/or DUs), etc. Although names of certain messages shown in FIG. 7 may correspond specifically to LTE or NR, it should be understood that these names are exemplary and similar messages can be used for different network types.

This procedure involves two different measurement thresholds: a low threshold and a high threshold. The two thresholds can be expressed as different levels of a particular metric, e.g., signal strength, signal quality, etc. For example, the high threshold could be that the quality of the mobility RS (MRS) of the target cell or beam becomes X dB stronger than the MRS of the UE's serving cell (e.g., provided by the source node), with the low threshold being less than the high threshold (i.e., target exceeds source by lower amount). As used in this context, MRS denotes a reference signal used for any mobility-related purpose. For example, in NR, MRS can be either SSB (SS/PBCH block) or CSI-RS. As a further example, for NR operating in unlicensed spectrum (referred to as NR-U), MRS can be a discovery reference signal (DRS) in addition to any of the signals mentioned above.

Initially, the UE and the source node can be exchanging user data, e.g., via a source cell served by the source node. The UE can also be provided with a measurement configuration including the low threshold (not shown in the figure). Upon performing measurements that meet the low threshold, the UE can send a measurement report to the serving node (operation 1). While performing the measurements and evaluating the low threshold, the UE continues operating in its current RRC configuration. In operation 2, based on this report, the source node can decide to request a conditional handover (CHO) of the UE to the target node (e.g., to a cell indicated in the UE's measurement report).

The target node performs admission control for the UE and responds with the CHO Request Acknowledgement (operation 3) that includes RRC configuration, similar to conventional handover procedures. In operation 4, the source node then sends the UE a RRCReconfiguration message (a "CHO command") that includes a CHO configuration with the high threshold. Upon receiving this message, the UE continues to perform measurements and whenever the high threshold condition is met, it can move to the target node and perform the handover (e.g., operations 5-6). Even so, the UE can remain in the serving cell (i.e., provide by the source node) for an extended amount of time in case the high threshold condition is not fulfilled.

This allows the serving cell to prepare the handover upon reception of an early measurement report and to provide the Conditional HO Command (e.g., RRCConnectionReconfiguration with mobilityControlInfo for LTE, or RRCReconfiguration with either a reconfigurationWithSync or a CellGroupConfig for NR) at a time when the radio link between the source cell and the UE is still relatively stable. The UE executes the handover at a later point in time (and threshold) that is optimal and/or preferred.

In operation 7, the target node sends a HANDOVER SUCCESS message to the source node indicating the UE has successfully established the target connection. In operation 8, the source node stops scheduling any further DL or UL data to the UE and sends a SN STATUS TRANSFER message to the target gNB indicating the latest PDCP SN transmitter and receiver status. In operation 9, the source node starts forwarding DL user data for the UE to the target node. Subsequently, the UE and the target node can exchange UL and DL user data, e.g., via the target cell. Finally, in operation 10, the target node sens a UE Context Release message to the source node, similar to conventional handover procedures.

Although FIG. 7 shows an exemplary conditional handover involving a single serving cell and a single target cell, other scenarios may involve many cells or beams that the UE has reported as candidate targets based on its radio resource management (RRM) measurements. The network can issue CHO commands for any of those candidates. The CHO command for each of those candidates may differ, in terms of the HO execution condition (e.g., reference signal (RS) to measure, threshold to exceed, etc.) and/or in terms of the RA preamble to be sent when a condition is met.

Consider the scenarios wherein the UE is configured with multiple CHO commands, each associated to different target cell candidates. The condition associated with a first target cell is fulfilled and the UE applies a stored CHO target configuration (i.e. a stored RRCReconfiguration), starts timer T304, and attempts to perform random access towards that first candidate target cell while timer T304 is running. However, the UE fails to perform the random access successfully, due to either timer T304 expiring or the UE reaching a maximum number of random-access attempts.

These may be considered as two cases of handover failure during CHO execution. In addition to these cases, while the UE is monitoring CHO conditions, the network may provide the UE with a HO command (i.e. an RRCReconfiguration containing a reconfigurationWithSync) for another target cell. If the UE tries to access this target cell, a failure may also occur for any of these reasons. All these are HO failure cases while the UE has stored CHO configurations for CHO target candidates.

Another failure case is when the UE is monitoring CHO (i.e., it has stored CHO candidate target cell configurations) and RLF is detected (e.g., timer T310 expires and/or maximum number of random access attempts are reached). Unlike the conventional handover procedure where the failure to access the target cell (i.e. HO failure) or RLF detection leads to re-establishment by the UE, 3GPP has agreed that the UE can be configured (current field name is attemptCHO) to access any of the candidate target cells for which the UE has been configured for conditional handover. Such configurations can be stored in the UE variable VarCHO-Config. If the UE performs a successful handover to a second one of the candidate target cells, the UE will be connected via this second target cell. Exemplary specification text for such operations is given below. For example, such text can be included in 3GPP TS 38.331 (NR RRC specification).

\*\*\*Begin Proposed Specification Text\*\*\*

5.3.7.3 Actions Following Cell Selection while T311 is Tunning

Upon selecting a NR cell and the selected cell is one of the candidate cells in VarCHO-Config if attemptCHO is configured:

1> if this is the first cell selection procedure after the first failure:

2> stop timer T311;

2> apply the stored cho-RRCReconfig associated to the selected cell and perform the actions as specified in 5.3.5.3;

Upon selecting a suitable NR cell, the UE shall:

1> ensure having valid and up to date essential system information as specified in clause 5.2.2.2;

1> stop timer T311;

1> start timer T301;

1> if T390 is running:

2> stop timer T390 for all access categories;

2> perform the actions as specified in 5.3.14.4;

1> apply the default L1 parameter values as specified in corresponding physical layer specifications except for the parameters for which values are provided in SIB1;

1> apply the default MAC Cell Group configuration as specified in 9.2.2;

1> apply the CCCH configuration as specified in 9.1.1.2;

1> apply the timeAlignmentTimerCommon included in SIB1;

1> initiate transmission of the RRCReestablishmentRequest message in accordance with 5.3.7.4;

NOTE: This procedure applies also if the UE returns to the source PCell.

Upon selecting an inter-RAT cell, the UE shall:

1> perform the actions upon going to RCC_IDLE as specified in 5.3.11, with release cause 'RRC connection failure'.

\*\*\*End proposed specification text\*\*\*

In this scenario, if the UE completes the handover to the second target cell as if it was due to the normal CHO execution when the handover condition has been met, the network is not aware that the UE has experienced an RLF, HO failure, or CHO failure. Even though the reason for the feature is to avoid the UE to continue with a re-establishment procedure when it has stored CHO configurations for a selected target cell when a failure is detected, that is not an optimal behavior as a first failure followed by a successful attempt leads to a longer procedure before success. So, even if that could be considered as a non-failed scenarios, as the UE ends up connected without the need for re-establishment, that is not an optimal solution and it would be good if its probability is minimized by the network if possible e.g. via parameters tuning, coverage optimization, etc.

Embodiments of the present disclosure address these and other problems, challenges, and/or issues by providing specific enhancements and/or improvements to mobility robustness in wireless networks. In general, embodiments include techniques and/or mechanisms for a UE to report CHO-related information to a network, which can utilize such information mobility parameter optimization. For example, such techniques enable a UE to report RLF while monitoring CHO and/or failures in the execution of CHO towards a first target cell, upon successful completion of a handover to the second target cell. Amongst other things, the UE can include a RACH failure report in relation to first target cell, radio conditions at the time of failure (e.g., radio condition of the source cell, the second target cell, etc.). This information can be sent by the second target node (i.e., the node providing the second target cell) to the source node (i.e., the node providing the source cell) and a first target node (i.e., the node providing the first target cell), and can be used by the respective nodes to optimize the CHO parameters (e.g., thresholds, offsets, etc.) and/or random access parameters in the corresponding cells.

Such embodiments can provide various exemplary benefits, advantages, and/or improvements to conventional handover operation. For example, the source node for the CHO can realize the failed access towards the first and/or second target cells, and can change the event threshold/offset towards the first and/or second target cell for the future UEs accordingly. As another example, the source node for the CHO can realize the radio condition towards the second target cell when the UE performed the access towards the second target cell, and can change the event threshold/offset towards the second target cell for the future UEs accordingly. Furthermore, the source node can also optimize a set of candidate target cells for other UEs based on the provided measurements. As another example, the first target node for the CHO can realize the random-access failures based on the RACH failure report, and can optimize RACH parameters and/or the UL coverage in the first target cell.

At a high level, certain embodiments involve a UE logging information related to a RLF, information related to one or more failed attempts of HO execution, and/or information related to one or more failed attempts of CHO execution. The events related to the logged information may have occurred before a successful HO completion, before a successful CHO completion, before a successful re-establishment procedure, or before a successful connection setup procedure. The UE can also create a report based on the logged information.

In some of these embodiments, the UE has first detected the failure, logged the information as described above, has selected a cell for which it has stored a CHO configuration, and if attemptCHO (or equivalent) is configured (if the feature is configurable), the UE applies the CHO configuration and accesses that target cell (i.e., performs random access and transmits an RRCReconfigurationComplete as shown in FIG. 7). For example, if the first failure is an RLF, the UE logs information regarding the RLF (e.g. in an RLF report) that led to the cell selection that led to the successful CHO execution. Likewise, if the first failure is a HO failure, the UE logs information regarding the HO failure (e.g. in a HO failure report) that led to the cell selection that led to the successful CHO execution. Likewise, if the first failure is a CHO failure, the UE logs information regarding the CHO failure (e.g. in a CHO failure report or HO failure report) that led to the cell selection that led to the successful CHO execution.

In other of these embodiments, the UE has first detected the failure, logged the information as described above, and in the second attempt the UE selects a cell for which it has stored a CHO configuration (i.e. an RRCReconfiguration with reconfigurationWith-Sync) and applies that stored CHO configuration but the second attempt also fails, leading to cell selection and a re-establishment procedure that finally succeeds. For example, if the first failure is an RLF, the UE logs information regarding the RLF (e.g. in an RLF report) that led to the cell selection that led to the successful CHO execution and informing regarding the second failed CHO attempt. Likewise, if the first failure is a HO failure, the UE logs information regarding the HO failure (e.g. in a HO failure report) that led to the cell selection that led to the successful CHO execution and informing regarding the second failed CHO attempt. Similarly, if the first failure is a CHO failure, the UE logs information regarding the CHO failure (e.g. in a CHO failure report or HO failure report) that led to the cell selection that led to the successful CHO execution and informing regarding the second failed CHO attempt.

At a high level, certain embodiments involve a UE indicating to the network the existence of logged information related to an RLF, information related to one or more failed attempts of HO execution, and/or information related to one or more failed attempt of CHO execution. The events related to the logged information may have occurred before a successful HO completion, before a successful CHO completion, before a successful re-establishment procedure, or before a successful connection setup procedure.

In some of these embodiments, the UE indicates in a complete message the availability of the report. For example, it may be indicated by one or multiple flag(s) in the RRCReconfigurationComplete that is transmitted after random access in the target cell where the successful handover or CHO is executed. The indication may indicate the availability of a specific report and/or the existence of multiple reports, each associated to each possible failure. In this particular case, at the moment the UE performs re-establishment, there are information regarding two failed attempts. Even so, embodiments are applicable to any number of failed attempts, e.g., if the UE is allowed to try CHO execution multiple times before performing re-establishment.

As another example, the availability of the report may be indicated in one or multiple flag(s) in the RRCSetupComplete that is transmitted. In a scenario according to this example, a first HO attempt or CHO attempt may have failed. In the second attempt, the UE selects a cell for which it has stored a CHO configuration (i.e. an RRCReconfiguration with reconfigurationWithSync) and applies that stored CHO configuration. The second attempt also fails, leading to one of the following cases:

Cell selection and a re-establishment procedure that also fails, e.g. timer T301 expires or maximum number of RACH attempts is reached.

UE is not able to find a suitable cell upon cell selection while timer T301 is running, so the UE enters RCC_IDLE and tries to come back via an RRC setup/establishment procedure whereby it transmits an RRCSetupRequest message, receives an RRCSetup message, and responds with an RRCSetupComplete message.

In the second case, when the UE indicates the flag(s) to the network via the RRCSetupComplete, the UE may have available/stored failure information regarding the first CHO attempt, the second CHO attempt, and/or the failed re-establishment attempt.

As another example, the availability of the report may be indicated in one or multiple flag(s) in the RRCResumeComplete that is transmitted after the UE resumes RRC_CONNECTED operation after leaving a suspended/inactive state. The indication may indicate the availability of a specific report and/or the existence of multiple reports, each associated with a possible failure. The UE may have indicated the presence of the report(s) earlier, but they were not requested by the network before the UE was suspended.

At a high level, certain embodiments involve a UE reporting logged information related to an RLF while the UE was monitoring CHO, information related to one or more failed attempts of HO execution, and/or information related to one or more failed attempts of CHO execution, any of which may have occurred before a successful HO or CHO completion. In some embodiments, the UE may transmit such information (e.g., in a report) upon request from the network. For example, the network (e.g., the second target node providing the second target cell) may send a UEInformationRequest message including the request of at least one of the multiple reports the UE may have stored, and/or specific information related to one or multiple procedures that have failed. Upon receiving the request, the UE may include including information associated to one or multiple failed procedures in a responsive message, such as a UEInformationResponse.

Subsequently, the node receiving the UE report can forwarding the logged information reported by the UE to the node(s) providing the cell(s) in which the specific mobility events indicated by the report occurred. In some embodiments, the receiving node analyses the report and determines information about the cells and nodes that were involved in these mobility events for the UE. For example, the node receiving the report may determine a cell where the UE attempted to connect unsuccessfully (e.g., a first candidate target cell), a cell where the UE managed to connect successfully but subsequently experienced a connection failure, and/or a source cell in which the UE received the CHO configuration. Based on determining such information, the node receiving the report can forward information in the report to the respective other nodes involved in the mobility events for the UE. This information can facilitate these other nodes optimizing the configurations of the respective cells, so as to eliminate, mitigate, and/or reduce the cause(s) of the UE's mobility failure(s).

In some embodiments, the node receiving the forwarded information (from the UE report) can be the source node that configured the UE with a CHO configuration that resulted in a CHO failure. The source node can use the logged information from the UE to adjust its CHO configuration and therefore avoid future failures In some embodiments, the node receiving the forwarded information (from the UE report) can be a node that last served the UE but not the source node that configured the UE with the CHO configuration. For example, if the UE first connected, via handover, to a cell of a first target node (either a cell configured via CHO configuration or another cell) but such first connection failed shortly after the UE was able to establish the connection, the UE shortly after such failure successfully connected to a different cell of a second target node. In this embodiment the node receiving the forwarded information (i.e., the first target node) will also forward the received information to the source node that provided the CHO configuration to the UE. The source node can in that way optimize the CHO configuration of its respective cells, so as to eliminate, mitigate, and/or reduce the cause(s) of the UE's mobility failure(s).

Further details of certain embodiments are provided in the following description.

The information logged and/or reported by the UE will be referred to as CHOFailureReportList in the subsequent explanation. This information can include a list of failure information (so-called CHOFailureReport) associated with each RLF that occured when UE is configured with a conditional handover configuration. For each respective failure, CHOFailureReport can include any of the following information:

1) Random access failure information
   a. The chronological order of the beams using which the random access was performed towards the first target cell.
   b. Whether the UE detected contention or not on each performed random access attempt.
   c. Whether the beam (SSB or CSI-RS) used to perform the random access was below or above the network configured threshold (rsrp-ThresholdSSB).
   d. Number of preambles.
   e. Configuration of RACH resources for conditional handover e.g., preamble type, Root Sequence Index used as part of RACH resources to produce the preambles
2) Measurement quantities associated to one or more cells at the time of failure and/or at the time of accessing the second target cell.
   a. Measurement quantities (RSRP, RSRQ, SINR) associated to the source cell
   b. Measurement quantities (RSRP, RSRQ, SINR) associated to the first target cell
   c. Measurement quantities (RSRP, RSRQ, SINR) associated to the second target cell
   d. Measurement quantities (RSRP, RSRQ, SINR) associated to the other target cells for which the conditional handover was configured.
   e. Measurement quantities (RSRP, RSRQ, SINR) associated to any other neighboring cells for which the UE has been performing measurements but has not received the conditional handover configuration.
   f. Measurement quantities (RSRP, RSRQ, SINR, RSSI) of any neighboring unlicensed or IRAT cell for which the UE has been performing measurements but has not received the conditional handover configuration for.
3) List of any neighboring cells for which the UE has been performing measurements but has not received the conditional handover configuration for
4) Location information, e.g., derived based on GNSS and/or other methods.
5) Available measurements for other radio technologies, such as WLAN and Bluetooth.
6) Available sensor information
   a. Measurements based on barometer in the UE
   b. Measurements based on IMU sensor in the UE
   c. Measurements based on gyroscope in the UE
7) CHO-related configurations including the thresholds or offsets configured as CHO events. Alternatively a more simple report with a list of the cells which were configured for CHO.
8) Timer T304 value.

The UE can use any of the following ways to report the CHOFailureReportList including multiple CHOFailureReport to the second target cell, or when the UE returns to RRC_CONNECTED state if CHO to the second target cell failed:

1) RLF report including CHOFailureReport. In some embodiments, the CHOFailureReport report is stored as a new field in the RLF report. In some embodiments, the CHOFailureReport report is stored with the help of existing fields (as an example, the first target cell related information is stored in failedPCellId field, the source cell related information is stored in previousPCellId field, the second target cell related information is stored in one of the entry of measResultNeighCells or the field reestablishmentCellId is reused for second target cell related information. If the reestablishmentCellId is not reused for second target cell related information, then the field reestablishmentCellId shall be absent in the RLF report).
2) Successful Handover report including CHOFailureReportList
3) UE treats the CHOFailureReportList as a new report and thus the UE indicates to the second target cell or to the cell UE is connected after two successive CHO failures about the presence of CHOFailureReportList in the RRCReconfigurationComplete message using CHOFailureReportListAvailable flag. If the second target cell does not fetch this report from the UE, then the UE can report the same to any of the future serving cells using RRCReconfigurationComplete, RRCResumeComplete, RRCSetupComplete or RRCReestablishmentComplete messages.

In some alternative embodiments, the UE sends a HOFailureReportList with an indication (possibly for each target cell) that a failed handover was a CHO. In such embodiments, there is no specific CHOFailureReportList, but rather a FailureReportList used for reporting RLF, handover failure, and CHO failure. When appropriate, the FailureReportList can include indications that failed handover attempts were CHO attempts.

The network node that receives the CHOFailureReportList from the UE sends it to the last node serving the UE. The node receiving the CHOFailureReportList from the UE may signal the CHOFailureReportList to all the target cells configured for the UE, e.g. first and second target cells. If the node receiving the CHOFailureReportList, signaled by the node that received it from the UE, is not the node that provided the CHO configuration to the UE, that node can forward the CHOFailureReportList to the node that provided the CHO configuration to the UE.

Signalling of the CHOFailureReportList can be done by either including the CHOFailureReportList in messages over interfaces connecting the RAN nodes involved, or by extracting information relevant to the RAN nodes involved in the root cause failure detection and resolution and including them in messages over the interfaces connecting the RAN nodes involved. For example, in an NG-RAN, the CHOFailureReportList can be signaled using the Xn interface between nodes, and by including the CHOFailureReportList in a message such as the Xn:Failure Indication, Xn:Handover Indication, or a new message associated to conditional handover report.

Figure 8:
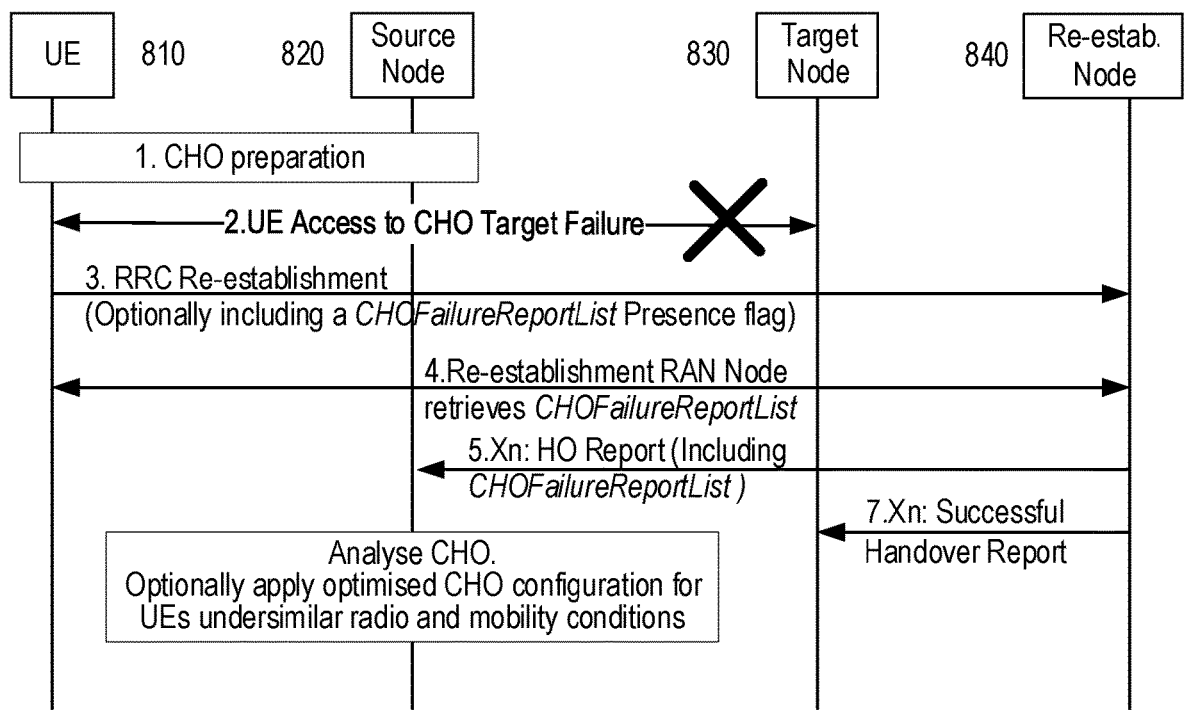
FIG. 8 shows an exemplary procedure for signaling information comprising a CHOFailureReportList to relevant nodes in an NG-RAN, according to various exemplary embodiments of the present disclosure.

FIG. 8 shows an exemplary network signaling procedure for how information comprising CHOFailureReportList or can be signaled to relevant nodes in an NG-RAN (e.g., connected via Xn interfaces). In this scenario, the UE (810) attempts connection to a cell served by a CHO target node (830) once the radio conditions in a source cell served by the source node (820) have degraded to the CHO threshold. However, the UE fails in connecting to the CHO target node. The UE will therefore attempt to re-establish connection to another cell—served by a node referred to as re-establishment node 840—that became available to the UE.

Once the re-establishment node retrieves the CHOFailureReportList, it will read the information contained in the report and determine the source cell, i.e. the cell that provided the CHO configuration to the UE. With such information at hand, the re-establishment node is able to send an Xn:HO Report message containing the CHOFailureReportList to the source node. The source node will be able to determine the issues that prevented completion of the UE's CHO to the target node, allowing the source node to optimize future UE configurations with the aim of preventing the occurrence of similar errors.

In LTE, there is currently an RLF report (within the RRC message UEInformationResponse) that may be sent when a handover has failed and RLF is triggered (see 3GPP TS 36.331 v 15.8.0). The same message is likely to be implemented for NR. For legacy handover, the UE can fail handover only in one cell, whereas for CHO the UE may fail in multiple cells. According to some embodiments of the present disclosure, some of the information concerning RLF can be reported on a per cell basis, instead of only being reported once as in the current LTE report Below are some exemplary ASN.1 data structures illustrating exemplary contents of a UEInformationResponse message according to various embodiments. For example, the exemplary contents shown in the data structure below can be combined with, or added to, the UEInformationResponse ASN.1 data structure according to 3GPP TS 36.331 v15.8.0.

In one example, the text below provides an ASN.1 data structure for a new UEInformationResponse-v16xy-IEs that includes a CHOFailureReportList-r16 IE. The CHOFailureReportList-r16 IE includes a list of CHOFailureReport-r16 IEs, each of which includes a conditional handover failure report for a particular cell where the UE attempted to execute conditional handover, but failed. In other words, each CHOFailureReport-r16 IE can include any of the logged/reported information discussed above with respect to the various embodiments.

```
-- ASN1START
...
UEInformationResponse-v16xy-IEs ::=    SEQUENCE {
    choFailureReportList-r16          CHOFailureReportList-r16            OPTIONAL
}
...
CHOFailureReportList-r16 ::=          SEQUENCE (SIZE (1.. maxNrofCHO-Cells)) OF
                                                  CHOFailureReport-r16
CHOFailureReport-r9 ::=               SEQUENCE {
    measResultLastServCell-r9             SEQUENCE {
        rsrpResult-r9                         RSRP-Range,
        rsrqResult-r9                         RSRQ-Range                  OPTIONAL
    },
    measResultNeighCells-r9               SEQUENCE {
        measResultListEUTRA-r9                MeasResultList2EUTRA-r9
            OPTIONAL,
        measResultListUTRA-r9                 MeasResultList2UTRA-r9
            OPTIONAL,
        measResultListGERAN-r9                MeasResultListGERAN
            OPTIONAL,
        measResultsCDMA2000-r9                MeasResultList2CDMA2000-r9
          OPTIONAL
    }
                                                                          OPTIONAL,
    ...,
    [[ locationInfo-r10                   LocationInfo-r10 OPTIONAL,
    failedPCellId-r10                     CHOICE {
        cellGlobalId-r10                      CellGlobalIdEUTRA,
        pci-arfcn-r10                         SEQUENCE {
            physCellId-r10                        PhysCellId,
            carrierFreq-r10                       ARFCN-ValueEUTRA
        }
    }
                                                                          OPTIONAL,
    reestablishmentCellId-r10         CellGlobalIdEUTRA
                OPTIONAL,
    timeConnFailure-r10               INTEGER (0..1023)
                OPTIONAL,
    connectionFailureType-r10         ENUMERATED {rlf, hof}
                OPTIONAL,
    previousPCellId-r10               CellGlobalIdEUTRA                   OPTIONAL
    ]],
    [[ failedPCellId-v1090            SEQUENCE {
```

```
        carrierFreq-v1090           ARFCN-ValueEUTRA-v9e0
        }                                                           OPTIONAL
    ] ],
    [ [ basicFields-r11            SEQUENCE {
        c-RNTI-r11                     C-RNTI,
        rlf-Cause-r11                  ENUMERATED {
                                           t310-Expiry, randomAccessProblem,
                                           rlc-MaxNumRetx, t312-Expiry-r12},
        timeSinceFailure-r11           TimeSinceFailure-r11
                                                                    OPTIONAL,
        }
        previousUTRA-CellId-r11    SEQUENCE {
            carrierFreq-r11            ARFCN-ValueUTRA,
            physCellId-r11             CHOICE {
                fdd-r11                    PhysCellIdUTRA-FDD,
                tdd-r11                    PhysCellIdUTRA-TDD
            },
            cellGlobalId-r11           CellGlobalIdUTRA             OPTIONAL
        }
                                                                    OPTIONAL,
        selectedUTRA-CellId-r11    SEQUENCE {
            carrierFreq-r11            ARFCN-ValueUTRA,
            physCellId-r11             CHOICE {
                fdd-r11                    PhysCellIdUTRA-FDD,
                tdd-r11                    PhysCellIdUTRA-TDD
            }
        }                                                           OPTIONAL
    ] ],
    [ [ failedPCellId-v1250        SEQUENCE {
        tac-FailedPCell-r12            TrackingAreaCode
        }                                                           OPTIONAL,
        measResultLastServCell-v1250   RSRQ-Range-v1250              OPTIONAL,
        lastServCellRSRQ-Type-r12      RSRQ-Type-r12                 OPTIONAL,
        measResultListEUTRA-v1250      MeasResultList2EUTRA-v1250    OPTIONAL
    ] ],
    [ [ drb-EstablishedWithQCI-1-r13 ENUMERATED {qcil}               OPTIONAL
    ] ],
    [ [ measResultLastServCell-v1360 RSRP-Range-v1360                OPTIONAL
    ] ],
    [ [ logMeasResultListBT-r15    LogMeasResultListBT-r15           OPTIONAL,
        logMeasResultListWLAN-r15      LogMeasResultListWLAN-r15
    OPTIONAL ] ]
}
...
-- ASN1STOP
```

In other embodiments, the current RLF report can reused, but it can be signaled multiple times in a list instead of only once. Each RLF report also indicates if the particular RLF is related to a failed conditional handover. The text below shows an ASN.1 data structure illustrating some exemplary contents of another UEInformationResponse according to these embodiments, in which a new UEInformationResponse-v16xy-IEs with a rlf-ReportList-r16 IE is included. The rlf-ReportList-r16 IE contains a list of RLF-Report-v16xy IEs, each of which relates to a single RLF in a particular cell. Each RLF-Report-v16xy includes a RLF-Report-r9 (see 3GPP TS 36.331 v 15.8.0) and a connectionFailureType-v16xy flag that indicates whether the RLF is related to a failed CHO.

```
-- ASN1START : :=

...

UEInformationResponse-v16xy-IEs : := SEQUENCE {
    rlf-ReportList-r16              REL-ReportList-r16 OPTIONAL
}

...

RLF-ReportList-r16 : :=             SEQUENCE (SIZE (1.. maxNrofCHO-Cells) ) OF
                                                RLF-Report-v16xy RLF-Report-v16xy : :=               SEQUENCE {
    rlf-Report-r9                   RLF-Report-r9
    connectionFailureType-v16xy     ENUMERATED {chof} OPTIONAL
}

...

-- ASN1STOP
```

Figure 9:
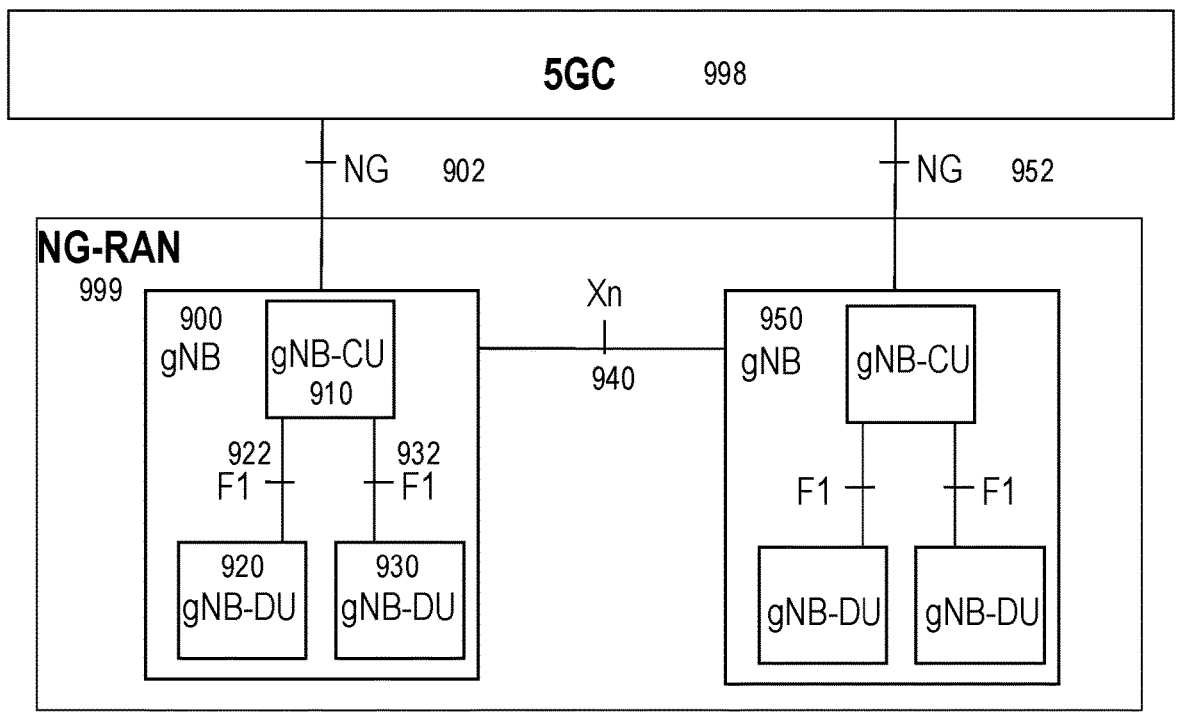
FIG. 9 illustrates a high-level view of an exemplary 5G network architecture, according to various exemplary embodiments of the present disclosure.

FIG. 9 illustrates a high-level view of the 5G network architecture, including a next generation RAN (NG-RAN) 999 and a 5G core network (5GC) 998. NG-RAN 999 can include one or more gNodeB's (gNBs) connected to the 5GC via one or more NG interfaces, such as gNBs 900, 950 connected via interfaces 902, 952, respectively. More specifically, gNBs 900, 950 can be connected to one or more Access and Mobility Management Functions (AMF) in the 5GC 998 via respective NG-C interfaces. Similarly, gNBs 900, 950 can be connected to one or more User Plane Functions (UPFs) in 5GC 998 via respective NG-U interfaces. NG-C and NG-U are control plane and user plane portions, respectively, of NG interfaces 902 and 952 shown in FIG. 9.

Although not shown, in some deployments 5GC 998 can be replaced by an Evolved Packet Core (EPC), which conventionally has been used together with LTE E-UTRAN. In such deployments, gNBs 900, 950 can connect to one or more Mobility Management Entities (MMES) in EPC via respective S1-C interfaces. Similarly, gNBs 900, 950 can connect to one or more Serving Gateways (SGWs) in EPC via respective NG-U interfaces.

In addition, the gNBs can be connected to each other via one or more Xn interfaces, such as Xn interface 940 between gNBs 900 and 950. The radio technology for the NG-RAN is often referred to as "New Radio" (NR). For the NR interface to UEs, each of the gNBs can support frequency division duplexing (FDD), time division duplexing (TDD), or a combination thereof.

NG-RAN 999 can be partitioned into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In some exemplary configurations, each gNB is connected to all 5GC nodes within an "AMF Region" which is defined in 3GPP TS 23.501 (v15.4.0). If security protection for CP and UP data on TNL of NG-RAN interfaces is supported, NDS/IP (defined in 3GPP TS 33.401 v15.6.0) shall be applied.

The NG-RAN logical nodes shown in FIG. 9 (and described in 3GPP TS 38.401 v15.4.0 and 3GPP TR 38.801 v14.0.0) include a Central Unit (CU or gNB-CU) and one or more Distributed Units (DU or gNB-DU). For example, gNB 900 includes gNB-CU 910 and gNB-DUs 920 and 930. CUs (e.g., gNB-CU 910) are logical nodes that host higher-layer protocols and perform various gNB functions such controlling the operation of DUs. A DU (e.g., gNB-DUs 920, 930) is a decentralized logical node that hosts lower layer protocols and can include, depending on the functional split option, various subsets of the gNB functions. As such, each of the CUs and DUs can include various circuitry needed to perform their respective functions, including processing circuitry, transceiver circuitry (e.g., for communication), and power supply circuitry. Moreover, the terms "central unit" and "centralized unit" are used interchangeably herein, as are the terms "distributed unit" and "decentralized unit."

A gNB-CU connects to one or more gNB-DUs over respective F1 logical interfaces, such as interfaces 922 and 932 shown in FIG. 9. However, a gNB-DU can be connected to only a single gNB-CU. The gNB-CU and connected gNB-DU(s) are only visible to other gNBs and the 5GC as a gNB. In other words, the F1 interface is not visible beyond gNB-CU. Furthermore, the F1 interface between the gNB-CU and gNB-DU is specified and/or based on the following general principles:

F1 is an open interface;

F1 supports the exchange of signaling information between respective endpoints, as well as data transmission to the respective endpoints;

from a logical standpoint, F1 is a point-to-point interface between the endpoints (even in the absence of a physical direct connection between the endpoints);

F1 supports control plane (CP) and user plane (UP) separation, such that a gNB-CU may be separated in CP and UP;

F1 separates Radio Network Layer (RNL) and Transport Network Layer (TNL);

F1 enables exchange of user-equipment (UE) associated information and non-UE associated information;

F1 is defined to be future proof with respect to new requirements, services, and functions;

A gNB terminates X2, Xn, NG and S1-U interfaces and, for the F1 interface between DU and CU, utilizes the F1 application part protocol (F1-AP) which is defined in 3GPP TS 38.473.

Furthermore, a CU can host protocols such as RRC and PDCP, while a DU can host protocols such as RLC, MAC and PHY. Other variants of protocol distributions between CU and DU can exist, however, such as hosting the RRC, PDCP and part of the RLC protocol in the CU (e.g., Automatic Retransmission Request (ARQ) function), while hosting the remaining parts of the RLC protocol in the DU, together with MAC and PHY. In some exemplary embodiments, the CU can host RRC and PDCP, where PDCP is assumed to handle both UP traffic and CP traffic. Nevertheless, other exemplary embodiments may utilize other protocol splits that by hosting certain protocols in the CU and certain others in the DU. Exemplary embodiments can also locate centralized control plane protocols (e.g., PDCP-C and RRC) in a different CU with respect to the centralized UP protocols (e.g., PDCP-U).

Figure 10:
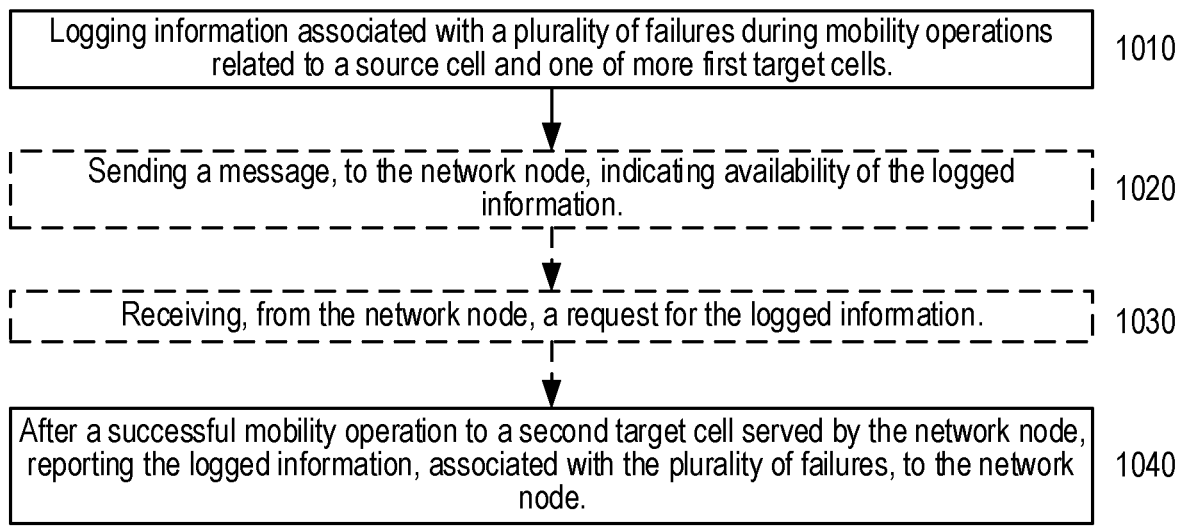
FIG. 10 illustrates an exemplary method (e.g., procedure) performed by a user equipment (UE), according to various exemplary embodiments of the present disclosure.

The embodiments described above can be further illustrated with reference to FIGS. 10-11, which depict exemplary methods (e.g., procedures) performed by a UE and a network node, respectively. In other words, various features of the operations described below, with reference to FIGS. 10-11, correspond to various embodiments described above. Although these exemplary methods are illustrated by specific blocks in particular orders, the operations corresponding to the blocks can be performed in different orders than shown and can be combined and/or divided into blocks having different functionality than shown. Furthermore, the exemplary methods shown in FIGS. 10-11 can be used cooperatively (e.g., with each other and/or with other embodiments described herein) to provide various benefits, advantages, and/or solutions to problems described herein. Optional blocks and/or operations are indicated by dashed lines In particular, FIG. 10 illustrates an exemplary method (e.g., procedure) for reporting failures related to mobility operations, by a UE, to a network node in a radio access network (RAN), according to various exemplary embodiments of the present disclosure. The exemplary method can be performed by a user equipment (e.g., UE, wireless device, MTC device, NB-IoT device, modem, etc. or component thereof) in communication with a network node (e.g., base station, eNB, gNB, etc., or components thereof) serving a cell in the RAN (e.g., E-UTRAN, NG-RAN). For example, the exemplary method shown in FIG. 10 can be implemented in a UE or device configured according to other figures described herein.

The exemplary method can include the operations of block 1010, where the UE can log information associated with a plurality of failures during mobility operations related to a source cell and one or more first target cells. In various embodiments, the plurality of failures can include any of the following:
- one or more radio link failures (RLF) while monitoring for conditional handover (CHO) in the source cell;
- one or more failed handovers from the source cell to any of the first target cells;
- one or more failed handovers from a first one of the first target cells to a second one of the first target cells;
- one or more failed conditional handovers (CHO) from the source cell to any of the first target cells; and
- one or more failed CHOs from a first one of the first target cells to a second one of the first target cells.

In various embodiments, the logged information, for each failure, can include one or more of the following (as described in more detail above):
- random-access failure information for one of the first target cells;
- UE measurement information, at time of the failure, associated with one or more of the following: the source cell, one or more of the first target cells, the second target cell, one or more candidate target cells associated with a conditional handover (CHO) configuration, and one or more neighbor cells not associated with a CHO configuration;
- UE location information at the time of the failure;
- UE measurements for other radio technologies;
- CHO configuration associated with the failure; and
- UE timer values at the time of the failure.

In some embodiments, the logged information for each failure can include a failure type identifier. Each failure type identifier can indicate one of the following types of failures: radio link failure (RLF), handover failure, or conditional handover (CHJO) failure.

The exemplary method can also include the operations of block 1040, where the UE can, after a successful mobility operation to a second target cell served by the network node, report the logged information, associated with the plurality of failures, to the network node. In various embodiments, the successful mobility operation includes one of the following:
- a handover to the second target cell;
- a conditional handover (CHO) to the second target cell;
- a connection re-establishment procedure with the second target cell;
- a connection resume procedure with the second target cell; or
- a connection setup procedure with the second target cell.

In various embodiments, the logged information can be reported according to one of the following formats: a field in a radio link failure (RLF) report; a field in a successful handover report; or a separate report from other mobility-related reports. Various examples of such formats were discussed above.

In some embodiments, the exemplary method can also include the operations of blocks 1020-1030. In block 1020, the UE can send a message, to the network node, indicating availability of the logged information. In some embodiments, the message can be one of the following:
- an RRCReconfigurationComplete message transmitted after successful random access in the second target cell;
- an RRCReestablishmentComplete message transmitted after successfully reestablishing a connection in the second target cell;
- an RRCSetupComplete message transmitted after successful connection setup in the second target cell; or
- an RRCResumeComplete message transmitted after successfully resuming a connection in the second target cell.

In block 1030, the UE can receive, from the network node, a request for the logged information. The request can be in response to the message indicating availability (e.g., sent in block 1020). The logged information can be reported (e.g., in block 1040) in response to the request. In some embodiments, the request can be a UEInformationRequest message, and the logged information can be included in a UEInformationResponse message, such as illustrated in other figures herein.

Figure 11:
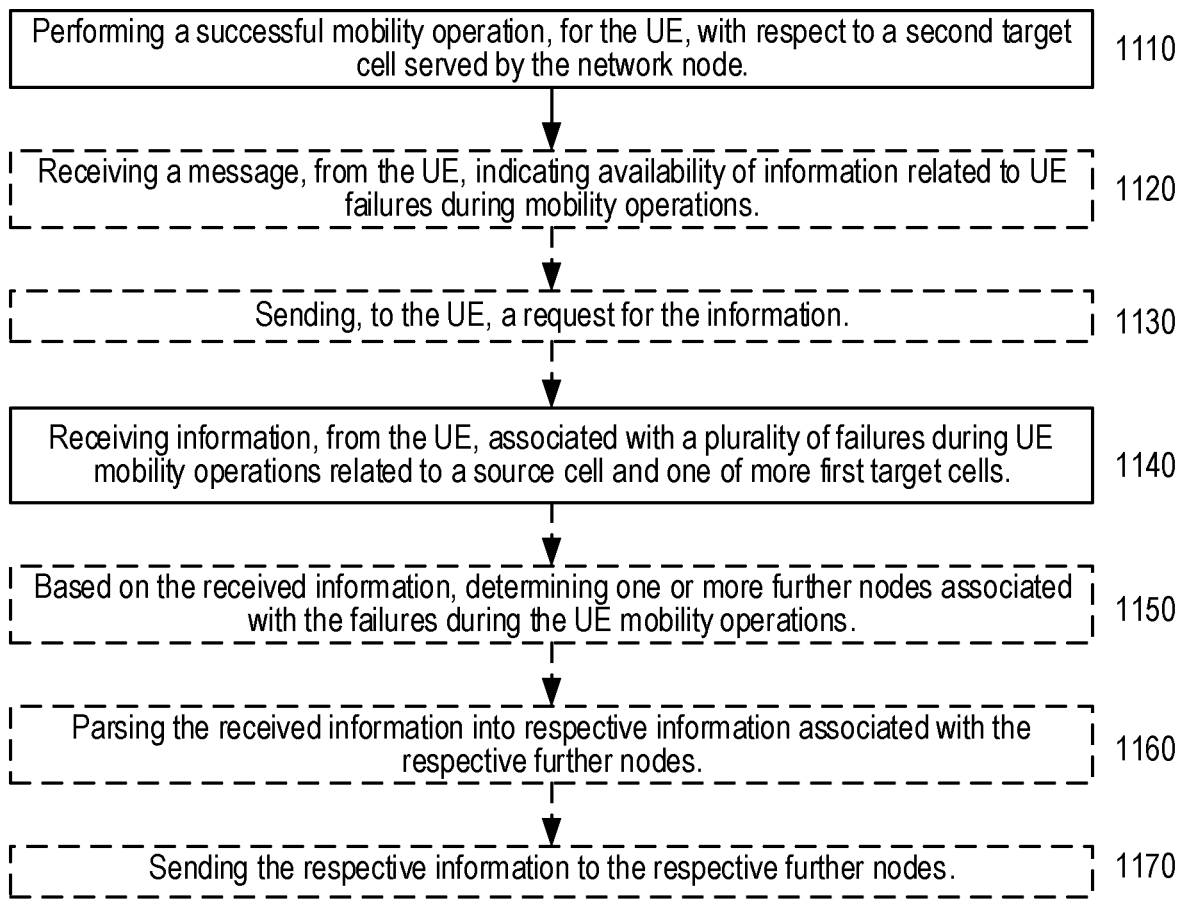
FIG. 11 illustrates an exemplary method (e.g., procedure) performed by a network node in a radio access network (RAN), according to various exemplary embodiments of the present disclosure.

In addition, FIG. 11 illustrates another exemplary method (e.g., procedure) for receiving failure reports related to mobility operations by a user equipment (UE), according to various exemplary embodiments of the present disclosure. The exemplary method can be performed by a network node (e.g., base station, eNB, gNB, etc., or component thereof) serving in a cell in a radio access network (RAN, e.g., E-UTRAN, NG-RAN). For example, the exemplary method shown in FIG. 11 can be implemented by a network node configured according to other figures described herein.

The exemplary method can include the operations of block 1110, where the network node can perform a successful mobility operation, for the UE, with respect to a second target cell served by the network node. In various embodiments, the successful mobility operation includes one of the following:
- a handover to the second target cell;
- a conditional handover (CHO) to the second target cell;
- a connection re-establishment procedure with the second target cell;
- a connection resume procedure with the second target cell; or
- a connection setup procedure with the second target cell.

The exemplary method can also include the operations of block 1140, where the network node can subsequently receive information, from the UE, associated with a plurality of failures during UE mobility operations related to a source cell and one or more first target cells. For example, the information can be received after the successful mobility operation of block 1110. In various embodiments, the plurality of failures can include any of the following:
- one or more radio link failures (RLF) during UE monitoring for conditional handover (CHO) in the source cell;
- one or more failed handovers of the UE from the source cell to any of the first target cells;
- one or more failed handovers of the UE from a first one of the first target cells to a second one of the first target cells;
- one or more failed conditional handovers (CHO) of the UE from the source cell to any of the first target cells; and
- one or more failed CHOs of the UE from a first one of the first target cells to a second one of the first target cells.

In various embodiments, the received information, for each failure, can include one or more of the following (as described in more detail above):
- random-access failure information for one of the first target cells;

UE measurement information, at time of the failure, associated with one or more of the following: the source cell, one or more of the first target cells, the second target cell, one or more candidate target cells associated with a conditional handover (CHO) configuration, and one or more neighbor cells not associated with a CHO configuration;

UE location information at the time of the failure;

UE measurements for other radio technologies;

CHO configuration associated with the failure; and

UE timer values at the time of the failure.

In some embodiments, the received information for each failure can include a failure type identifier. Each failure type identifier can indicate one of the following types of failures: radio link failure (RLF), handover failure, or conditional handover (CHJO) failure.

In various embodiments, the information can be received according to one of the following formats: a field in a radio link failure (RLF) report; a field in a successful handover report; or a separate report from other mobility-related reports. Various examples of such formats were discussed above.

In some embodiments, the exemplary method can also include the operations of blocks 1120-1130. In block 1120, the network node can receive a message, from the UE, indicating availability of the information. In some embodiments, the message can be one of the following:

an RRCReconfigurationComplete message transmitted after the UE's successful random access in the second target cell;

an RRCReestablishmentComplete message transmitted after the UE successfully reestablishes a connection in the second target cell;

an RRCSetupComplete message transmitted after successful connection setup by the UE in the second target cell; or an RRCResumeComplete message transmitted after the UE successfully resumes a connection in the second target cell.

In block 1130, the network node can transmit, to the UE, a request for the information. The request can be in response to the message indicating availability (e.g., received in block 1120). The information can be received (e.g., in block 1140) in response to the request. In some embodiments, the request can be a UEInformationRequest message, and the logged information can be included in a UEInformationResponse message, such as illustrated in other figures herein.

In some embodiments, the exemplary method can also include the operations of blocks 1150-1170. In block 1150, the network node can, based on the received information, determine one or more further nodes associated with the failures during the UE mobility operations. For example, the network node can determine a source node associated with the source cell, and one or more target nodes associated with the one or more first target cells, as discussed in more detail above. In block 1160, the network node can parse the received information into respective information associated with the respective further nodes (e.g., by to associating cell-specific information with the corresponding further nodes).

In block 1170, the network node can send the respective information to the respective further nodes. For example, the network node can send information related to failures in the source cell to the source node, and information related to failures in the one or more first target cells to the corresponding first target nodes. Such information can facilitate optimization of mobility settings (e.g., CHO configurations) by those respective nodes, as discussed in more detail above.

Figure 12:
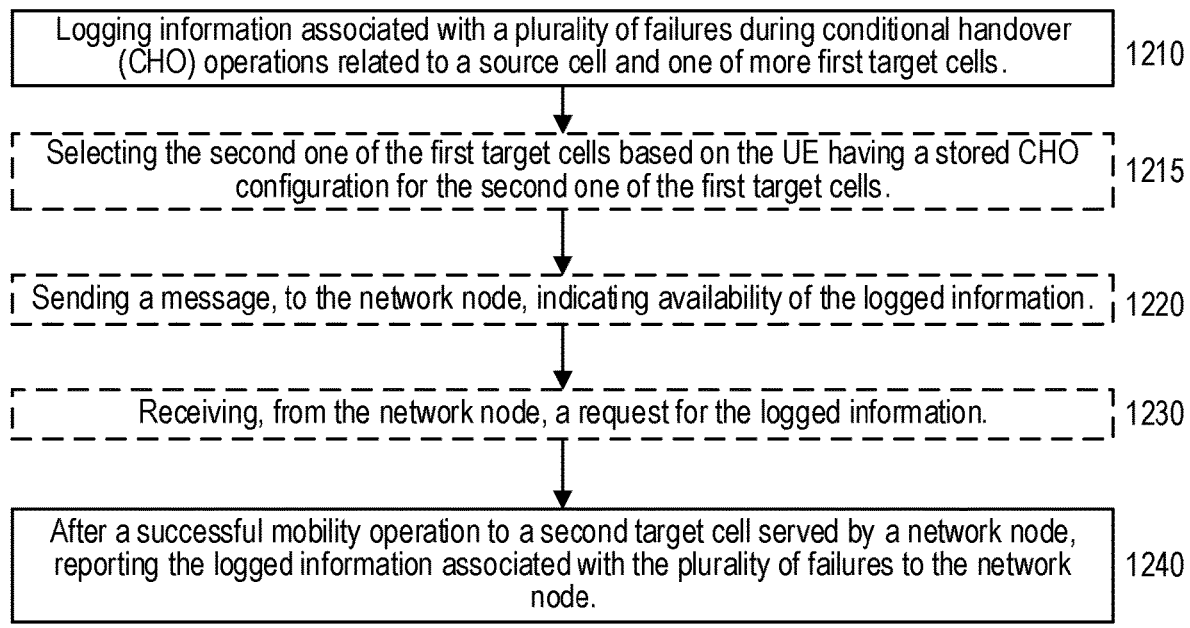
FIG. 12 illustrates an exemplary method (e.g., procedure) performed by a user equipment (UE), according to various exemplary embodiments of the present disclosure.

The embodiments described above can also be illustrated with reference to FIGS. 12-13, which depict exemplary methods (e.g., procedures) for a UE and a network node, respectively. In other words, various features of the operations described below, with reference to FIGS. 12-13, correspond to various embodiments described above. Although these exemplary methods are illustrated by specific blocks in particular orders, the operations corresponding to the blocks can be performed in different orders than shown and can be combined and/or divided into blocks having different functionality than shown. Furthermore, the exemplary methods shown in FIGS. 12-13 can be used cooperatively (e.g., with each other and/or with other embodiments described herein) to provide various benefits, advantages, and/or solutions to problems described herein. Optional blocks and/or operations are indicated by dashed lines In particular, FIG. 12 illustrates an exemplary method (e.g., procedure) for reporting failures related to mobility operations, by a UE, to a network node in a RAN, according to various exemplary embodiments of the present disclosure. The exemplary method can be performed by a UE (e.g., wireless device, MTC device, NB-IoT device, modem, etc. or component thereof) in communication with a network node (e.g., base station, eNB, gNB, etc., or components thereof) serving a cell in the RAN (e.g., E-UTRAN, NG-RAN). For example, the exemplary method shown in FIG. 12 can be implemented in a UE or device configured according to other figures described herein.

The exemplary method can include the operations of block 1210, where the UE can log information associated with a plurality of failures during conditional handover (CHO) operations related to a source cell and one or more first target cells. In various embodiments, the plurality of failures can include any of the following:

one or more radio link failures (RLF) while monitoring for CHO in the source cell; and one or more failed CHOs from the source cell to any of the first target cells.

In some embodiments, the plurality of failures can include a first failure and a subsequent second failure. The first failure can be a RLF while monitoring for CHO in the source cell or a failed CHO to a first one of the first target cells. The second failure can be a failed CHO to a second one of the first target cells. In some of these embodiments, the exemplary method can also include the operations of block 1215, where the UE can, in response to the first failure, select the second one of the first target cells based on the UE having a stored CHO configuration for the second one of the first target cells. Note that since the second one of the first target cells is the logged second failure mentioned above, the selecting operations of block 1215 alternately can be viewed as part of the logging operations of block 1210.

In various embodiments, the logged information, for each failure, can include one or more of the following (as described in more detail above):

random-access failure information for one of the first target cells;

UE measurement information, at time of the failure, associated with one or more of the following: the source cell, one or more of the first target cells, the second target cell, one or more candidate target cells associated with a CHO configuration, and one or more neighbor cells not associated with a CHO configuration;

UE location information at the time of the failure;
UE measurements for other radio technologies;
CHO configuration associated with the failure; and
UE timer values at the time of the failure.

In some embodiments, the logged information for each failure can include a failure type identifier. Each failure type identifier can indicate one of the following types of failures: radio link failure (RLF), handover failure, or conditional handover (CHO) failure. In some embodiments, the logged information for each failed CHO includes a CHO configuration associated with the failure.

The exemplary method can also include the operations of block 1240, where the UE can, after a successful mobility operation to a second target cell served by the network node, report the logged information, associated with the plurality of failures, to the network node. In various embodiments, the successful mobility operation can include one of the following:

- a handover to the second target cell;
- a CHO to the second target cell;
- a connection re-establishment procedure with the second target cell;
- a connection resume procedure with the second target cell; or
- a connection setup procedure with the second target cell.

In various embodiments, the logged information can be reported according to one of the following formats: a field in a radio link failure (RLF) report; a field in a successful handover report; or a separate report from other mobility-related reports. Various examples of such formats were discussed above.

In some embodiments, the exemplary method can also include the operations of blocks 1220-1230. In block 1220, the UE can send a message, to the network node, indicating availability of the logged information. In some embodiments, the message can be one of the following:

- an RRCReconfigurationComplete message transmitted after successful random access in the second target cell;
- an RRCReestablishmentComplete message transmitted after successfully reestablishing a connection in the second target cell;
- an RRCSetupComplete message transmitted after successful connection setup in the second target cell; or
- an RRCResumeComplete message transmitted after successfully resuming a connection in the second target cell.

In block 1230, the UE can receive, from the network node, a request for the logged information. The request can be in response to the message indicating availability (e.g., sent in block 1220). The logged information can be reported (e.g., in block 1240) in response to the request. In some embodiments, the request can be a UEInformationRequest message, and the logged information can be included in a UEInformationResponse message, such as illustrated in other figures herein.

Figure 13:
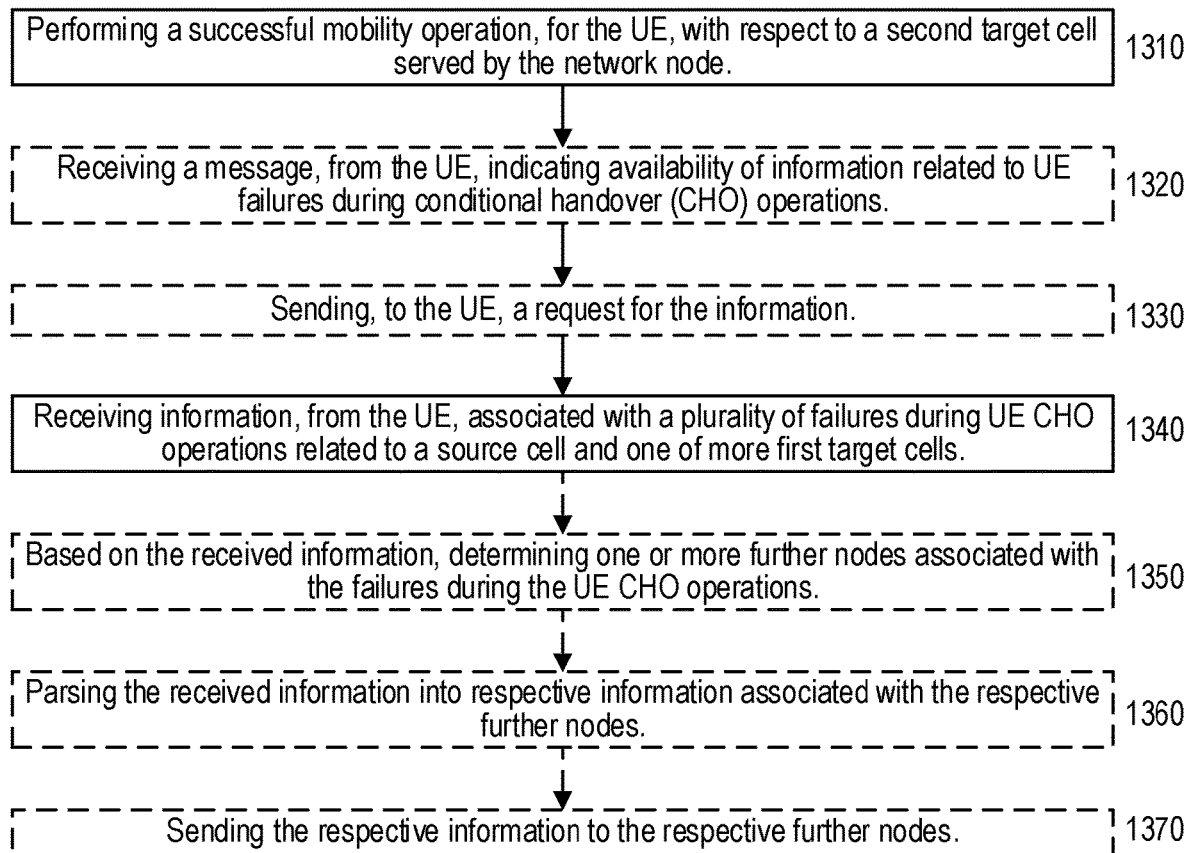
FIG. 13 illustrates an exemplary method (e.g., procedure) performed by a network node in a radio access network (RAN), according to various exemplary embodiments of the present disclosure.

In addition, FIG. 13 illustrates an exemplary method (e.g., procedure) for receiving failure reports related to mobility operations by a UE, according to various exemplary embodiments of the present disclosure. The exemplary method can be performed by a network node (e.g., base station, eNB, gNB, etc., or component thereof) serving in a cell in a RAN (e.g., E-UTRAN, NG-RAN). For example, the exemplary method shown in FIG. 13 can be implemented by a network node configured according to other figures described herein.

The exemplary method can include the operations of block 1310, where the network node can perform a successful mobility operation, for the UE, with respect to a second target cell served by the network node. In various embodiments, the successful mobility operation includes one of the following:

- a handover to the second target cell;
- a conditional handover (CHO) to the second target cell;
- a connection re-establishment procedure with the second target cell;
- a connection resume procedure with the second target cell; or
- a connection setup procedure with the second target cell.

The exemplary method can also include the operations of block 1340, where the network node can subsequently receive information, from the UE, associated with a plurality of failures during UE CHO operations related to a source cell and one or more first target cells. For example, the information can be received after the successful mobility operation of block 1310.

In some embodiments, the plurality of failures can include a first failure and a subsequent second failure. The first failure can be a radio link failure (RLF) while monitoring for CHO in the source cell or a failed CHO to a first one of the first target cells. The second failure can be a failed CHO to a second one of the first target cells.

In various embodiments, the plurality of failures can include any of the following:

- one or more radio link failures (RLF) during UE monitoring for CHO in the source cell; and
- one or more failed CHOs of the UE from the source cell to any of the first target cells.

In various embodiments, the received information, for each failure, can include one or more of the following (as described in more detail above):

- random-access failure information for one of the first target cells;
- UE measurement information, at time of the failure, associated with one or more of the following: the source cell, one or more of the first target cells, the second target cell, one or more candidate target cells associated with a CHO configuration, and one or more neighbor cells not associated with a CHO configuration;
- UE location information at the time of the failure;
- UE measurements for other radio technologies;
- CHO configuration associated with the failure; and
- UE timer values at the time of the failure.

In some embodiments, the received information for each failure can include a failure type identifier. Each failure type identifier can indicate one of the following types of failures: radio link failure (RLF), handover failure, or conditional handover (CHO) failure. In some embodiments, the logged information for each failed CHO includes a CHO configuration associated with the failure.

In various embodiments, the information can be received according to one of the following formats: a field in a radio link failure (RLF) report; a field in a successful handover report; or a separate report from other mobility-related reports. Various examples of such formats were discussed above.

In some embodiments, the exemplary method can also include the operations of blocks 1320-1330. In block 1320, the network node can receive a message, from the UE, indicating availability of the information. In some embodiments, the message can be one of the following:

- an RRCReconfigurationComplete message transmitted after the UE's successful random access in the second target cell;

an RRCReestablishmentComplete message transmitted after the UE successfully reestablishes a connection in the second target cell;

an RRCSetupComplete message transmitted after successful connection setup by the UE in the second target cell; or an RRCResumeComplete message transmitted after the UE successfully resumes a connection in the second target cell.

In block 1330, the network node can transmit, to the UE, a request for the information. The request can be in response to the message indicating availability (e.g., received in block 1320). The information can be received (e.g., in block 1340) in response to the request. In some embodiments, the request can be a UEInformationRequest message, and the logged information can be included in a UEInformationResponse message, such as illustrated in other figures herein.

In some embodiments, the exemplary method can also include the operations of blocks 1350-1370. In block 1350, the network node can, based on the received information, determine one or more further nodes associated with the failures during the UE CHO operations. For example, the network node can determine a source node associated with the source cell, and one or more target nodes associated with the one or more first target cells, as discussed in more detail above. In block 1360, the network node can parse the received information into respective information associated with the respective further nodes (e.g., by associating cell-specific information with the corresponding further nodes).

In block 1370, the network node can send the respective information to the respective further nodes. For example, the network node can send information related to failures in the source cell to the source node, and information related to failures in the one or more first target cells to the corresponding first target nodes. Such information can facilitate optimization of mobility settings (e.g., CHO configurations) by those respective nodes, as discussed in more detail above.

Figure 14:
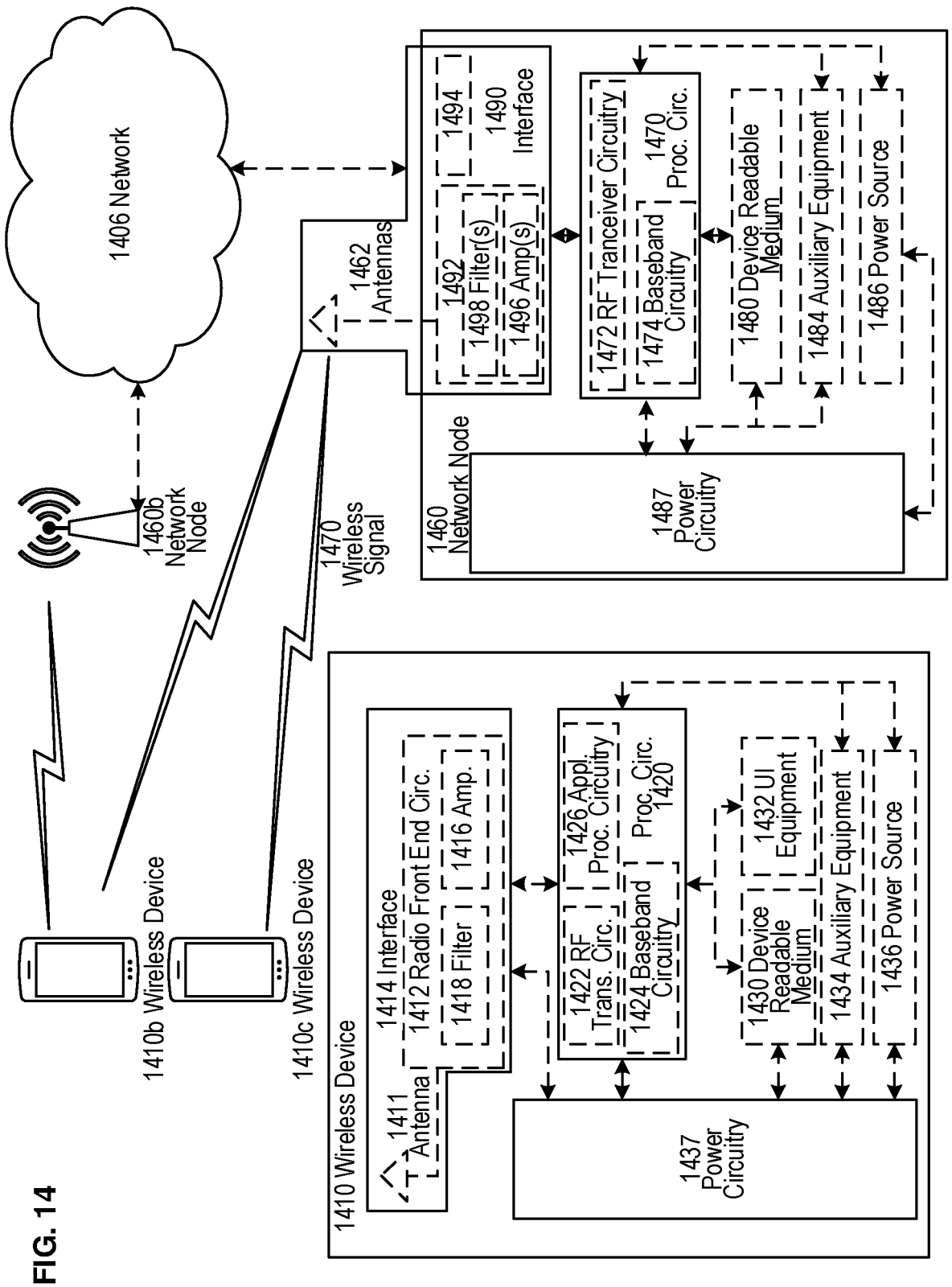
FIG. 14 illustrates an exemplary embodiment of a wireless network, in accordance with various aspects described herein.

Although the subject matter described herein can be implemented in any appropriate type of system using any suitable components, the embodiments disclosed herein are described in relation to a wireless network, such as the example wireless network illustrated in FIG. 14. For simplicity, the wireless network of FIG. 14 only depicts network 1406, network nodes 1460 and 1460*b*, and WDs 1410, 1410*b*, and 1410*c*. In practice, a wireless network can further include any additional elements suitable to support communication between wireless devices or between a wireless device and another communication device, such as a landline telephone, a service provider, or any other network node or end device. Of the illustrated components, network node 1460 and wireless device (WD) 1410 are depicted with additional detail. The wireless network can provide communication and other types of services to one or more wireless devices to facilitate the wireless devices' access to and/or use of the services provided by, or via, the wireless network.

The wireless network can comprise and/or interface with any type of communication, telecommunication, data, cellular, and/or radio network or other similar type of system. In some embodiments, the wireless network can be configured to operate according to specific standards or other types of predefined rules or procedures. Thus, particular embodiments of the wireless network can implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1406 can comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1460 and WD 1410 comprise various components described in more detail below. These components work together in order to provide network node and/or wireless device functionality, such as providing wireless connections in a wireless network. In different embodiments, the wireless network can comprise any number of wired or wireless networks, network nodes, base stations, controllers, wireless devices, relay stations, and/or any other components or systems that can facilitate or participate in the communication of data and/or signals whether via wired or wireless connections.

Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations can be categorized based on the amount of coverage they provide (or, stated differently, their transmit power level) and can then also be referred to as femto base stations, pico base stations, micro base stations, or macro base stations. A base station can be a relay node or a relay donor node controlling a relay. A network node can also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station can also be referred to as nodes in a distributed antenna system (DAS).

Further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node can be a virtual network node as described in more detail below. More generally, however, network nodes can represent any suitable device (or group of devices) capable, configured, arranged, and/or operable to enable and/or provide a wireless device with access to the wireless network or to provide some service to a wireless device that has accessed the wireless network.

In FIG. 14, network node 1460 includes processing circuitry 1470, device readable medium 1480, interface 1490, auxiliary equipment 1484, power source 1486, power circuitry 1487, and antenna 1462. Although network node 1460 illustrated in the example wireless network of FIG. 14 can represent a device that includes the illustrated combination of hardware components, other embodiments can comprise network nodes with different combinations of components. It is to be understood that a network node comprises any suitable combination of hardware and/or software needed to perform the tasks, features, functions and methods and/or procedures disclosed herein. Moreover, while the components of network node 1460 are depicted as single boxes located within a larger box, or nested within multiple boxes, in practice, a network node can comprise multiple different physical components that make up a single illustrated component (e.g., device readable medium 1480 can comprise multiple separate hard drives as well as multiple RAM modules).

Similarly, network node 1460 can be composed of multiple physically separate components (e.g., a NodeB component and a RNC component, or a BTS component and a BSC component, etc.), which can each have their own respective components. In certain scenarios in which network node 1460 comprises multiple separate components (e.g., BTS and BSC components), one or more of the separate components can be shared among several network nodes. For example, a single RNC can control multiple NodeB's. In such a scenario, each unique NodeB and RNC pair, can in some instances be considered a single separate network node. In some embodiments, network node 1460 can be configured to support multiple radio access technologies (RATs). In such embodiments, some components can be duplicated (e.g., separate device readable medium 1480 for the different RATs) and some components can be reused (e.g., the same antenna 1462 can be shared by the RATs). Network node 1460 can also include multiple sets of the various illustrated components for different wireless technologies integrated into network node 1460, such as, for example, GSM, WCDMA, LTE, NR, WiFi, or Bluetooth wireless technologies. These wireless technologies can be integrated into the same or different chip or set of chips and other components within network node 1460.

Processing circuitry 1470 can be configured to perform any determining, calculating, or similar operations (e.g., certain obtaining operations) described herein as being provided by a network node. These operations performed by processing circuitry 1470 can include processing information obtained by processing circuitry 1470 by, for example, converting the obtained information into other information, comparing the obtained information or converted information to information stored in the network node, and/or performing one or more operations based on the obtained information or converted information, and as a result of said processing making a determination.

Processing circuitry 1470 can comprise a combination of one or more of a microprocessor, controller, microcontroller, central processing unit, digital signal processor, application-specific integrated circuit, field programmable gate array, or any other suitable computing device, resource, or combination of hardware, software and/or encoded logic to operable to provide various functionality of network node 1460, either alone or in conjunction with other network node 1460 components (e.g., device readable medium 1480). Such functionality can include any of the various wireless features, functions, or benefits discussed herein.

For example, processing circuitry 1470 can execute instructions stored in device readable medium 1480 or in memory within processing circuitry 1470. In some embodiments, processing circuitry 1470 can include a system on a chip (SOC). As a more specific example, instructions (also referred to as a computer program product) stored in medium 1480 can include instructions that, when executed by processing circuitry 1470, can configure network node 1460 to perform operations corresponding to various exemplary methods (e.g., procedures) described herein.

In some embodiments, processing circuitry 1470 can include one or more of radio frequency (RF) transceiver circuitry 1472 and baseband processing circuitry 1474. In some embodiments, radio frequency (RF) transceiver circuitry 1472 and baseband processing circuitry 1474 can be on separate chips (or sets of chips), boards, or units, such as radio units and digital units. In alternative embodiments, part or all of RF transceiver circuitry 1472 and baseband processing circuitry 1474 can be on the same chip or set of chips, boards, or units In certain embodiments, some or all of the functionality described herein as being provided by a network node, base station, eNB or other such network device can be performed by processing circuitry 1470 executing instructions stored on device readable medium 1480 or memory within processing circuitry 1470. In alternative embodiments, some or all of the functionality can be provided by processing circuitry 1470 without executing instructions stored on a separate or discrete device readable medium, such as in a hard-wired manner. In any of those embodiments, whether executing instructions stored on a device readable storage medium or not, processing circuitry 1470 can be configured to perform the described functionality. The benefits provided by such functionality are not limited to processing circuitry 1470 alone or to other components of network node 1460 but are enjoyed by network node 1460 as a whole, and/or by end users and the wireless network generally.

Device readable medium 1480 can comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that can be used by processing circuitry 1470. Device readable medium 1480 can store any suitable instructions, data or information, including a computer program, software, an application including one or more of logic, rules, code, tables, etc. and/or other instructions capable of being executed by processing circuitry 1470 and, utilized by network node 1460. Device readable medium 1480 can be used to store any calculations made by processing circuitry 1470 and/or any data received via interface 1490. In some embodiments, processing circuitry 1470 and device readable medium 1480 can be considered to be integrated.

Interface 1490 is used in the wired or wireless communication of signaling and/or data between network node 1460, network 1406, and/or WDs 1410. As illustrated, interface 1490 comprises port(s)/terminal(s) 1494 to send and receive data, for example to and from network 1406 over a wired connection. Interface 1490 also includes radio front end circuitry 1492 that can be coupled to, or in certain embodiments a part of, antenna 1462. Radio front end circuitry 1492 comprises filters 1498 and amplifiers 1496. Radio front end circuitry 1492 can be connected to antenna 1462 and processing circuitry 1470. Radio front end circuitry can be configured to condition signals communicated between antenna 1462 and processing circuitry 1470. Radio front end circuitry 1492 can receive digital data that is to be sent out to other network nodes or WDs via a wireless connection. Radio front end circuitry 1492 can convert the digital data into a radio signal having the appropriate channel and bandwidth parameters using a combination of filters 1498 and/or amplifiers 1496. The radio signal can then be transmitted via antenna 1462. Similarly, when receiving data, antenna 1462 can collect radio signals which are then converted into digital data by radio front end circuitry 1492. The digital data can be passed to processing circuitry 1470. In other embodiments, the interface can comprise different components and/or different combinations of components.

In certain alternative embodiments, network node 1460 may not include separate radio front end circuitry 1492, instead, processing circuitry 1470 can comprise radio front end circuitry and can be connected to antenna 1462 without separate radio front end circuitry 1492. Similarly, in some embodiments, all or some of RF transceiver circuitry 1472 can be considered a part of interface 1490. In still other embodiments, interface 1490 can include one or more ports or terminals 1494, radio front end circuitry 1492, and RF transceiver circuitry 1472, as part of a radio unit (not shown), and interface 1490 can communicate with baseband processing circuitry 1474, which is part of a digital unit (not shown).

Antenna 1462 can include one or more antennas, or antenna arrays, configured to send and/or receive wireless signals. Antenna 1462 can be coupled to radio front end circuitry 1490 and can be any type of antenna capable of transmitting and receiving data and/or signals wirelessly. In some embodiments, antenna 1462 can comprise one or more omni-directional, sector or panel antennas operable to transmit/receive radio signals between, for example, 2 GHz and 66 GHz. An omni-directional antenna can be used to transmit/receive radio signals in any direction, a sector antenna can be used to transmit/receive radio signals from devices within a particular area, and a panel antenna can be a line of sight antenna used to transmit/receive radio signals in a relatively straight line. In some instances, the use of more than one antenna can be referred to as MIMO. In certain embodiments, antenna 1462 can be separate from network node 1460 and can be connectable to network node 1460 through an interface or port.

Antenna 1462, interface 1490, and/or processing circuitry 1470 can be configured to perform any receiving operations and/or certain obtaining operations described herein as being performed by a network node. Any information, data and/or signals can be received from a wireless device, another network node and/or any other network equipment. Similarly, antenna 1462, interface 1490, and/or processing circuitry 1470 can be configured to perform any transmitting operations described herein as being performed by a network node. Any information, data and/or signals can be transmitted to a wireless device, another network node and/or any other network equipment.

Power circuitry 1487 can comprise, or be coupled to, power management circuitry and can be configured to supply the components of network node 1460 with power for performing the functionality described herein. Power circuitry 1487 can receive power from power source 1486. Power source 1486 and/or power circuitry 1487 can be configured to provide power to the various components of network node 1460 in a form suitable for the respective components (e.g., at a voltage and current level needed for each respective component). Power source 1486 can either be included in, or external to, power circuitry 1487 and/or network node 1460. For example, network node 1460 can be connectable to an external power source (e.g., an electricity outlet) via an input circuitry or interface such as an electrical cable, whereby the external power source supplies power to power circuitry 1487. As a further example, power source 1486 can comprise a source of power in the form of a battery or battery pack which is connected to, or integrated in, power circuitry 1487. The battery can provide backup power should the external power source fail. Other types of power sources, such as photovoltaic devices, can also be used.

Alternative embodiments of network node 1460 can include additional components beyond those shown in FIG. 14 that can be responsible for providing certain aspects of the network node's functionality, including any of the functionality described herein and/or any functionality necessary to support the subject matter described herein. For example, network node 1460 can include user interface equipment to allow and/or facilitate input of information into network node 1460 and to allow and/or facilitate output of information from network node 1460. This can allow and/or facilitate a user to perform diagnostic, maintenance, repair, and other administrative functions for network node 1460.

In some embodiments, a wireless device (WD, e.g., WD 1410) can be configured to transmit and/or receive information without direct human interaction. For instance, a WD can be designed to transmit information to a network on a predetermined schedule, when triggered by an internal or external event, or in response to requests from the network. Examples of a WD include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc.

A WD can support device-to-device (D2D) communication, for example by implementing a 3GPP standard for sidelink communication, vehicle-to-vehicle (V2V), vehicle-to-infrastructure (V2I), vehicle-to-everything (V2X) and can in this case be referred to as a D2D communication device. As yet another specific example, in an Internet of Things (IoT) scenario, a WD can represent a machine or other device that performs monitoring and/or measurements and transmits the results of such monitoring and/or measurements to another WD and/or a network node. The WD can in this case be a machine-to-machine (M2M) device, which can in a 3GPP context be referred to as an MTC device. As one particular example, the WD can be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD can represent a vehicle or other equipment that is capable of monitoring and/or reporting on its operational status or other functions associated with its operation. A WD as described above can represent the endpoint of a wireless connection, in which case the device can be referred to as a wireless terminal. Furthermore, a WD as described above can be mobile, in which case it can also be referred to as a mobile device or a mobile terminal.

As illustrated, wireless device 1410 includes antenna 1411, interface 1414, processing circuitry 1420, device readable medium 1430, user interface equipment 1432, auxiliary equipment 1434, power source 1436 and power circuitry 1437. WD 1410 can include multiple sets of one or more of the illustrated components for different wireless technologies supported by WD 1410, such as, for example, GSM, WCDMA, LTE, NR, WiFi, WiMAX, or Bluetooth wireless technologies, just to mention a few. These wireless technologies can be integrated into the same or different chips or set of chips as other components within WD 1410.

Antenna 1411 can include one or more antennas or antenna arrays, configured to send and/or receive wireless signals, and is connected to interface 1414. In certain alternative embodiments, antenna 1411 can be separate from WD 1410 and be connectable to WD 1410 through an interface or port. Antenna 1411, interface 1414, and/or processing circuitry 1420 can be configured to perform any receiving or transmitting operations described herein as being performed by a WD. Any information, data and/or signals can be received from a network node and/or another WD. In some embodiments, radio front end circuitry and/or antenna 1411 can be considered an interface.

As illustrated, interface 1414 comprises radio front end circuitry 1412 and antenna 1411. Radio front end circuitry 1412 comprise one or more filters 1418 and amplifiers 1416. Radio front end circuitry 1414 is connected to antenna 1411 and processing circuitry 1420 and can be configured to condition signals communicated between antenna 1411 and processing circuitry 1420. Radio front end circuitry 1412 can be coupled to or a part of antenna 1411. In some embodiments, WD 1410 may not include separate radio front end circuitry 1412; rather, processing circuitry 1420 can comprise radio front end circuitry and can be connected to antenna 1411. Similarly, in some embodiments, some or all of RF transceiver circuitry 1422 can be considered a part of interface 1414. Radio front end circuitry 1412 can receive digital data that is to be sent out to other network nodes or WDs via a wireless connection. Radio front end circuitry 1412 can convert the digital data into a radio signal having the appropriate channel and bandwidth parameters using a combination of filters 1418 and/or amplifiers 1416. The radio signal can then be transmitted via antenna 1411. Similarly, when receiving data, antenna 1411 can collect radio signals which are then converted into digital data by radio front end circuitry 1412. The digital data can be passed to processing circuitry 1420. In other embodiments, the interface can comprise different components and/or different combinations of components.

Processing circuitry 1420 can comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide WD 1410 functionality either alone or in combination with other WD 1410 components, such as device readable medium 1430. Such functionality can include any of the various wireless features or benefits discussed herein.

For example, processing circuitry 1420 can execute instructions stored in device readable medium 1430 or in memory within processing circuitry 1420 to provide the functionality disclosed herein. More specifically, instructions (also referred to as a computer program product) stored in medium 1430 can include instructions that, when executed by processor 1420, can configure wireless device 1410 to perform operations corresponding to various exemplary methods (e.g., procedures) described herein.

As illustrated, processing circuitry 1420 includes one or more of RF transceiver circuitry 1422, baseband processing circuitry 1424, and application processing circuitry 1426. In other embodiments, the processing circuitry can comprise different components and/or different combinations of components. In certain embodiments processing circuitry 1420 of WD 1410 can comprise a SOC. In some embodiments, RF transceiver circuitry 1422, baseband processing circuitry 1424, and application processing circuitry 1426 can be on separate chips or sets of chips. In alternative embodiments, part or all of baseband processing circuitry 1424 and application processing circuitry 1426 can be combined into one chip or set of chips, and RF transceiver circuitry 1422 can be on a separate chip or set of chips. In still alternative embodiments, part or all of RF transceiver circuitry 1422 and baseband processing circuitry 1424 can be on the same chip or set of chips, and application processing circuitry 1426 can be on a separate chip or set of chips. In yet other alternative embodiments, part or all of RF transceiver circuitry 1422, baseband processing circuitry 1424, and application processing circuitry 1426 can be combined in the same chip or set of chips. In some embodiments, RF transceiver circuitry 1422 can be a part of interface 1414. RF transceiver circuitry 1422 can condition RF signals for processing circuitry 1420.

In certain embodiments, some or all of the functionality described herein as being performed by a WD can be provided by processing circuitry 1420 executing instructions stored on device readable medium 1430, which in certain embodiments can be a computer-readable storage medium. In alternative embodiments, some or all of the functionality can be provided by processing circuitry 1420 without executing instructions stored on a separate or discrete device readable storage medium, such as in a hard-wired manner. In any of those particular embodiments, whether executing instructions stored on a device readable storage medium or not, processing circuitry 1420 can be configured to perform the described functionality. The benefits provided by such functionality are not limited to processing circuitry 1420 alone or to other components of WD 1410, but are enjoyed by WD 1410 as a whole, and/or by end users and the wireless network generally.

Processing circuitry 1420 can be configured to perform any determining, calculating, or similar operations (e.g., certain obtaining operations) described herein as being performed by a WD. These operations, as performed by processing circuitry 1420, can include processing information obtained by processing circuitry 1420 by, for example, converting the obtained information into other information, comparing the obtained information or converted information to information stored by WD 1410, and/or performing one or more operations based on the obtained information or converted information, and as a result of said processing making a determination.

Device readable medium 1430 can be operable to store a computer program, software, an application including one or more of logic, rules, code, tables, etc. and/or other instructions capable of being executed by processing circuitry 1420. Device readable medium 1430 can include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that can be used by processing circuitry 1420. In some embodiments, processing circuitry 1420 and device readable medium 1430 can be considered to be integrated.

User interface equipment 1432 can include components that allow and/or facilitate a human user to interact with WD 1410. Such interaction can be of many forms, such as visual, audial, tactile, etc. User interface equipment 1432 can be operable to produce output to the user and to allow and/or facilitate the user to provide input to WD 1410. The type of interaction can vary depending on the type of user interface equipment 1432 installed in WD 1410. For example, if WD 1410 is a smart phone, the interaction can be via a touch screen; if WD 1410 is a smart meter, the interaction can be through a screen that provides usage (e.g., the number of gallons used) or a speaker that provides an audible alert (e.g., if smoke is detected). User interface equipment 1432 can include input interfaces, devices and circuits, and output interfaces, devices and circuits. User interface equipment 1432 can be configured to allow and/or facilitate input of information into WD 1410 and is connected to processing circuitry 1420 to allow and/or facilitate processing circuitry 1420 to process the input information. User interface equipment 1432 can include, for example, a microphone, a proximity or other sensor, keys/buttons, a touch display, one or more cameras, a USB port, or other input circuitry. User interface equipment 1432 is also configured to allow and/or facilitate output of information from WD 1410, and to allow and/or facilitate processing circuitry 1420 to output information from WD 1410. User interface equipment 1432 can include, for example, a speaker, a display, vibrating circuitry, a USB port, a headphone interface, or other output circuitry. Using one or more input and output interfaces, devices, and circuits, of user interface equipment 1432, WD 1410 can communicate with end users and/or the wireless network and allow and/or facilitate them to benefit from the functionality described herein.

Auxiliary equipment 1434 is operable to provide more specific functionality which may not be generally performed by WDs. This can comprise specialized sensors for doing measurements for various purposes, interfaces for additional types of communication such as wired communications etc. The inclusion and type of components of auxiliary equipment 1434 can vary depending on the embodiment and/or scenario.

Power source 1436 can, in some embodiments, be in the form of a battery or battery pack. Other types of power sources, such as an external power source (e.g., an electricity outlet), photovoltaic devices or power cells, can also be used. WD 1410 can further comprise power circuitry 1437 for delivering power from power source 1436 to the various parts of WD 1410 which need power from power source 1436 to carry out any functionality described or indicated herein. Power circuitry 1437 can in certain embodiments comprise power management circuitry. Power circuitry 1437 can additionally or alternatively be operable to receive power from an external power source; in which case WD 1410 can be connectable to the external power source (such as an electricity outlet) via input circuitry or an interface such as an electrical power cable. Power circuitry 1437 can also in certain embodiments be operable to deliver power from an external power source to power source 1436. This can be, for example, for the charging of power source 1436. Power circuitry 1437 can perform any converting or other modification to the power from power source 1436 to make it suitable for supply to the respective components of WD 1410.

Figure 15:
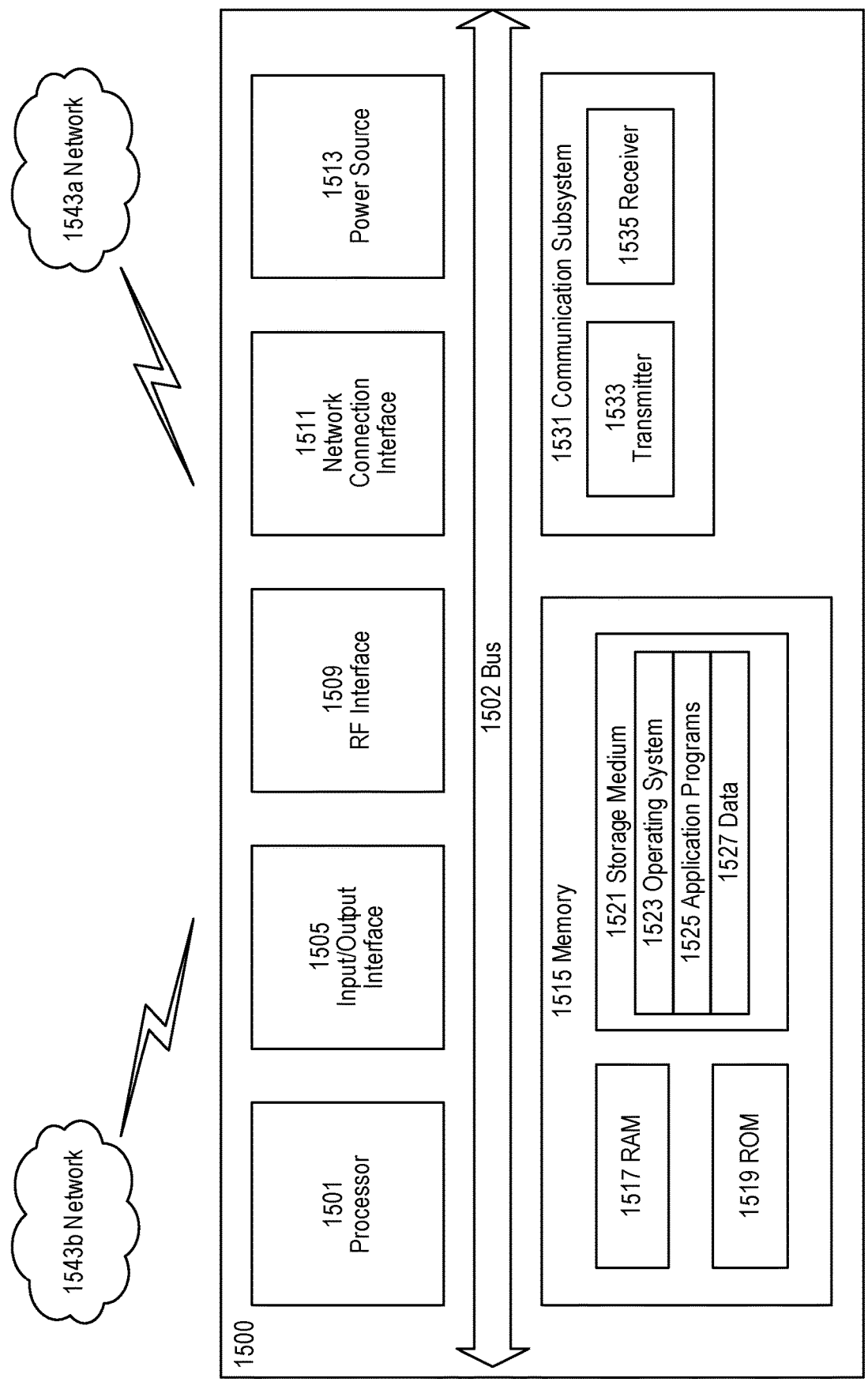
FIG. 15 illustrates an exemplary embodiment of a UE, in accordance with various aspects described herein.

FIG. 15 illustrates one embodiment of a UE in accordance with various aspects described herein. As used herein, a user equipment or UE may not necessarily have a user in the sense of a human user who owns and/or operates the relevant device. Instead, a UE can represent a device that is intended for sale to, or operation by, a human user but which may not, or which may not initially, be associated with a specific human user (e.g., a smart sprinkler controller). Alternatively, a UE can represent a device that is not intended for sale to, or operation by, an end user but which can be associated with or operated for the benefit of a user (e.g., a smart power meter). UE 15200 can be any UE identified by the $3^{rd}$ Generation Partnership Project (3GPP), including a NB-IoT UE, a machine type communication (MTC) UE, and/or an enhanced MTC (eMTC) UE. UE 1500, as illustrated in FIG. 15, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE can be used interchangeable. Accordingly, although FIG. 15 is a UE, the components discussed herein are equally applicable to a WD, and vice-versa.

In FIG. 15, UE 1500 includes processing circuitry 1501 that is operatively coupled to input/output interface 1505, radio frequency (RF) interface 1509, network connection interface 1511, memory 1515 including random access memory (RAM) 1517, read-only memory (ROM) 1519, and storage medium 1521 or the like, communication subsystem 1531, power source 1533, and/or any other component, or any combination thereof. Storage medium 1521 includes operating system 1523, application program 1525, and data 1527. In other embodiments, storage medium 1521 can include other similar types of information. Certain UEs can utilize all of the components shown in FIG. 15, or only a subset of the components. The level of integration between the components can vary from one UE to another UE. Further, certain UEs can contain multiple instances of a component, such as multiple processors, memories, transceivers, transmitters, receivers, etc.

In FIG. 15, processing circuitry 1501 can be configured to process computer instructions and data. Processing circuitry 1501 can be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1501 can include two central processing units (CPUs). Data can be information in a form suitable for use by a computer.

In the depicted embodiment, input/output interface 1505 can be configured to provide a communication interface to an input device, output device, or input and output device. UE 1500 can be configured to use an output device via input/output interface 1505. An output device can use the same type of interface port as an input device. For example, a USB port can be used to provide input to and output from UE 1500. The output device can be a speaker, a sound card, a video card, a display, a monitor, a printer, an actuator, an emitter, a smartcard, another output device, or any combination thereof. UE 1500 can be configured to use an input device via input/output interface 1505 to allow and/or facilitate a user to capture information into UE 1500. The input device can include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display can include a capacitive or resistive touch sensor to sense input from a user. A sensor can be, for instance, an accelerometer, a gyroscope, a tilt sensor, a force sensor, a magnetometer, an optical sensor, a proximity sensor, another like sensor, or any combination thereof. For example, the input device can be an accelerometer, a magnetometer, a digital camera, a microphone, and an optical sensor.

In FIG. 15, RF interface 1509 can be configured to provide a communication interface to RF components such as a transmitter, a receiver, and an antenna. Network connection interface 1511 can be configured to provide a communication interface to network 1543a. Network 1543a can encompass wired and/or wireless networks such as a local-area network (LAN), a wide-area network (WAN), a computer network, a wireless network, a telecommunications network, another like network or any combination thereof. For example, network 1543a can comprise a Wi-Fi network. Network connection interface 1511 can be configured to include a receiver and a transmitter interface used to communicate with one or more other devices over a communication network according to one or more communication protocols, such as Ethernet, TCP/IP, SONET, ATM, or the like. Network connection interface 1511 can implement receiver and transmitter functionality appropriate to the communication network links (e.g., optical, electrical, and the like). The transmitter and receiver functions can share circuit components, software or firmware, or alternatively can be implemented separately.

RAM 1517 can be configured to interface via bus 1502 to processing circuitry 1501 to provide storage or caching of data or computer instructions during the execution of software programs such as the operating system, application programs, and device drivers. ROM 1519 can be configured to provide computer instructions or data to processing circuitry 1501. For example, ROM 1519 can be configured to store invariant low-level system code or data for basic system functions such as basic input and output (I/O), startup, or reception of keystrokes from a keyboard that are stored in a non-volatile memory. Storage medium 1521 can be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives.

In one example, storage medium 1521 can be configured to include operating system 1523; application program 1525 such as a web browser application, a widget or gadget engine or another application; and data file 1527. Storage medium 1521 can store, for use by UE 1500, any of a variety of various operating systems or combinations of operating systems. For example, application program 1525 can include executable program instructions (also referred to as a computer program product) that, when executed by processor 1501, can configure UE 1500 to perform operations corresponding to various exemplary methods (e.g., procedures) described herein.

Storage medium 1521 can be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1521 can allow and/or facilitate UE 1500 to access computer-executable instructions, application programs or the like, stored on transitory or non-transitory memory media, to off-load data, or to upload data. An article of manufacture, such as one utilizing a communication system can be tangibly embodied in storage medium 1521, which can comprise a device readable medium.

In FIG. 15, processing circuitry 1501 can be configured to communicate with network 1543b using communication subsystem 1531. Network 1543a and network 1543b can be the same network or networks or different network or networks. Communication subsystem 1531 can be configured to include one or more transceivers used to communicate with network 1543b. For example, communication subsystem 1531 can be configured to include one or more transceivers used to communicate with one or more remote transceivers of another device capable of wireless communication such as another WD, UE, or base station of a radio access network (RAN) according to one or more communication protocols, such as IEEE 802.15, CDMA, WCDMA, GSM, LTE, UTRAN, WiMax, or the like. Each transceiver can include transmitter 1533 and/or receiver 1535 to implement transmitter or receiver functionality, respectively, appropriate to the RAN links (e.g., frequency allocations and the like). Further, transmitter 1533 and receiver 1535 of each transceiver can share circuit components, software or firmware, or alternatively can be implemented separately.

In the illustrated embodiment, the communication functions of communication subsystem 1531 can include data communication, voice communication, multimedia communication, short-range communications such as Bluetooth, near-field communication, location-based communication such as the use of the global positioning system (GPS) to determine a location, another like communication function, or any combination thereof. For example, communication subsystem 1531 can include cellular communication, Wi-Fi communication, Bluetooth communication, and GPS communication. Network 1543b can encompass wired and/or wireless networks such as a local-area network (LAN), a wide-area network (WAN), a computer network, a wireless network, a telecommunications network, another like network or any combination thereof. For example, network 1543b can be a cellular network, a Wi-Fi network, and/or a near-field network. Power source 1513 can be configured to provide alternating current (AC) or direct current (DC) power to components of UE 1500.

The features, benefits and/or functions described herein can be implemented in one of the components of UE 1500 or partitioned across multiple components of UE 1500. Further, the features, benefits, and/or functions described herein can be implemented in any combination of hardware, software or firmware. In one example, communication subsystem 1531 can be configured to include any of the components described herein. Further, processing circuitry 1501 can be configured to communicate with any of such components over bus 1502. In another example, any of such components can be represented by program instructions stored in memory that when executed by processing circuitry 1501 perform the corresponding functions described herein. In another example, the functionality of any of such components can be partitioned between processing circuitry 1501 and communication subsystem 1531. In another example, the non-computationally intensive functions of any of such components can be implemented in software or firmware and the computationally intensive functions can be implemented in hardware.

Figure 16:
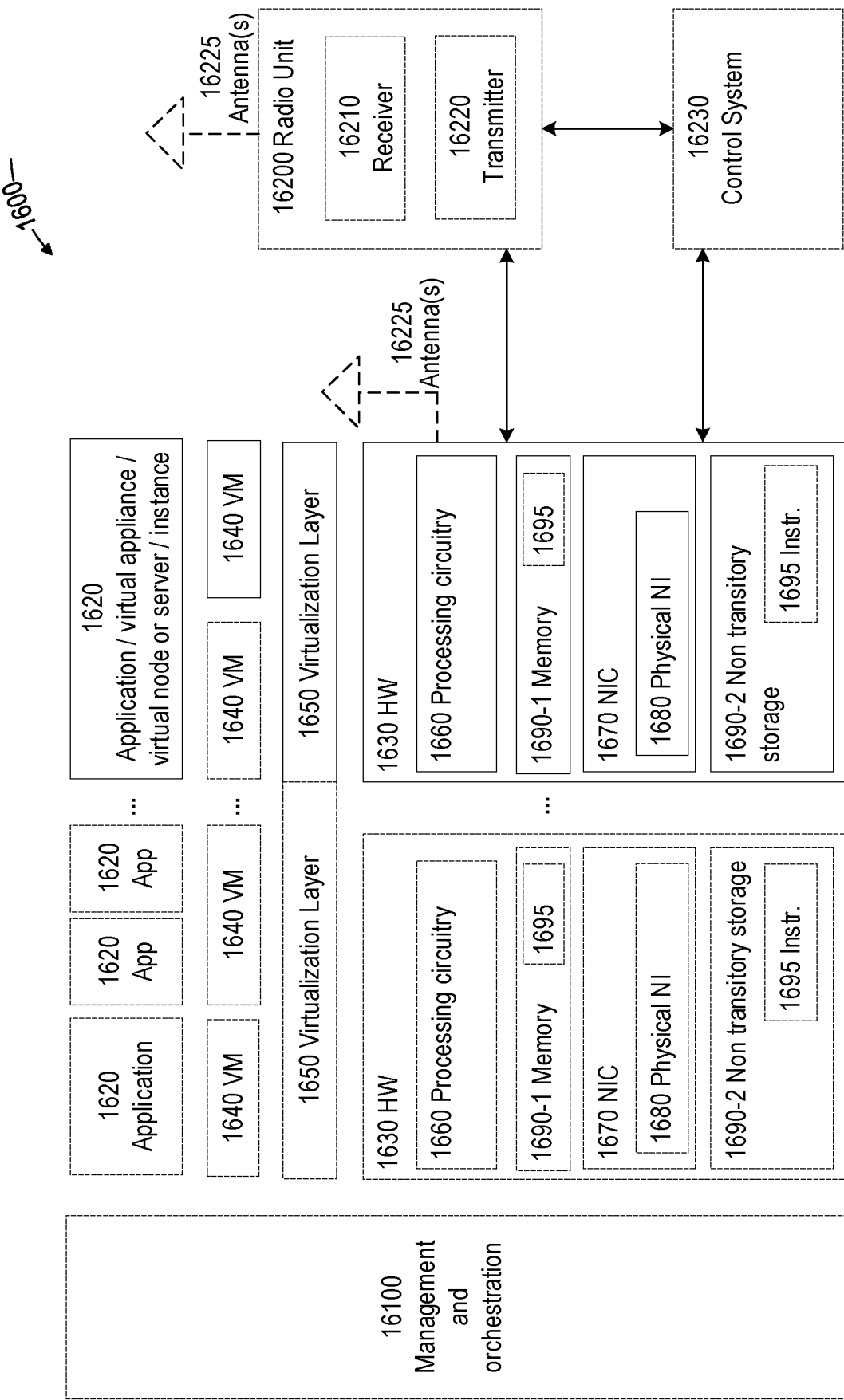
FIG. 16 is a block diagram illustrating an exemplary virtualization environment usable for implementation of various embodiments of network nodes described herein.

FIG. 16 is a schematic block diagram illustrating a virtualization environment 1600 in which functions implemented by some embodiments can be virtualized. In the present context, virtualizing means creating virtual versions of apparatuses or devices which can include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein can be implemented as virtual components executed by one or more virtual machines implemented in one or more virtual environments 1600 hosted by one or more of hardware nodes 1630. Further, in embodiments in which the virtual node is not a radio access node or does not require radio connectivity (e.g., a core network node), then the network node can be entirely virtualized.

The functions can be implemented by one or more applications 1620 (which can alternatively be called software instances, virtual appliances, network functions, virtual nodes, virtual network functions, etc.) operative to implement some of the features, functions, and/or benefits of some of the embodiments disclosed herein. Applications 1620 are run in virtualization environment 1600 which provides hardware 1630 comprising processing circuitry 1660 and memory 1690. Memory 1690 contains instructions 1695 executable by processing circuitry 1660 whereby application 1620 is operative to provide one or more of the features, benefits, and/or functions disclosed herein.

Virtualization environment 1600 can include general-purpose or special-purpose network hardware devices (or nodes) 1630 comprising a set of one or more processors or processing circuitry 1660, which can be commercial off-the-shelf (COTS) processors, dedicated Application Specific Integrated Circuits (ASICs), or any other type of processing circuitry including digital or analog hardware components or special purpose processors. Each hardware device can comprise memory 1690-1 which can be non-persistent memory for temporarily storing instructions 1695 or software executed by processing circuitry 1660. For example, instructions 1695 can include program instructions (also referred to as a computer program product) that, when executed by processing circuitry 1660, can configure hardware node 1620 to perform operations corresponding to various exemplary methods (e.g., procedures) described herein. Such operations can also be attributed to virtual node(s) 1620 that is/are hosted by hardware node 1630.

Each hardware device can comprise one or more network interface controllers (NICs) 1670, also known as network interface cards, which include physical network interface 1680. Each hardware device can also include non-transitory, persistent, machine-readable storage media 1690-2 having stored therein software 1695 and/or instructions executable by processing circuitry 1660. Software 1695 can include any type of software including software for instantiating one or more virtualization layers 1650 (also referred to as hypervisors), software to execute virtual machines 1640 as well as software allowing it to execute functions, features and/or benefits described in relation with some embodiments described herein.

Virtual machines 1640, comprise virtual processing, virtual memory, virtual networking or interface and virtual storage, and can be run by a corresponding virtualization layer 1650 or hypervisor. Different embodiments of the instance of virtual appliance 1620 can be implemented on one or more of virtual machines 1640, and the implementations can be made in different ways.

During operation, processing circuitry 1660 executes software 1695 to instantiate the hypervisor or virtualization layer 1650, which can sometimes be referred to as a virtual machine monitor (VMM). Virtualization layer 1650 can present a virtual operating platform that appears like networking hardware to virtual machine 1640.

As shown in FIG. 16, hardware 1630 can be a standalone network node with generic or specific components. Hardware 1630 can comprise antenna 16225 and can implement some functions via virtualization. Alternatively, hardware 1630 can be part of a larger cluster of hardware (e.g., such as in a data center or customer premise equipment (CPE)) where many hardware nodes work together and are managed via management and orchestration (MANO) 16100, which, among others, oversees lifecycle management of applications 1620.

Virtualization of the hardware is in some contexts referred to as network function virtualization (NFV). NFV can be used to consolidate many network equipment types onto industry standard high volume server hardware, physical switches, and physical storage, which can be located in data centers, and customer premise equipment.

In the context of NFV, virtual machine 1640 can be a software implementation of a physical machine that runs programs as if they were executing on a physical, non-virtualized machine. Each of virtual machines 1640, and that part of hardware 1630 that executes that virtual machine, be it hardware dedicated to that virtual machine and/or hardware shared by that virtual machine with others of the virtual machines 1640, forms a separate virtual network elements (VNE).

Still in the context of NFV, Virtual Network Function (VNF) is responsible for handling specific network functions that run in one or more virtual machines 1640 on top of hardware networking infrastructure 1630 and corresponds to application 1620 in FIG. 16.

In some embodiments, one or more radio units 16200 that each include one or more transmitters 16220 and one or more receivers 16210 can be coupled to one or more antennas 16225. Radio units 16200 can communicate directly with hardware nodes 1630 via one or more appropriate network interfaces and can be used in combination with the virtual components to provide a virtual node with radio capabilities, such as a radio access node or a base station. Nodes arranged in this manner can also communicate with one or more UEs, such as described elsewhere herein.

In some embodiments, some signaling can be performed via control system 16230, which can alternatively be used for communication between the hardware nodes 1630 and radio units 16200.

Figure 17:
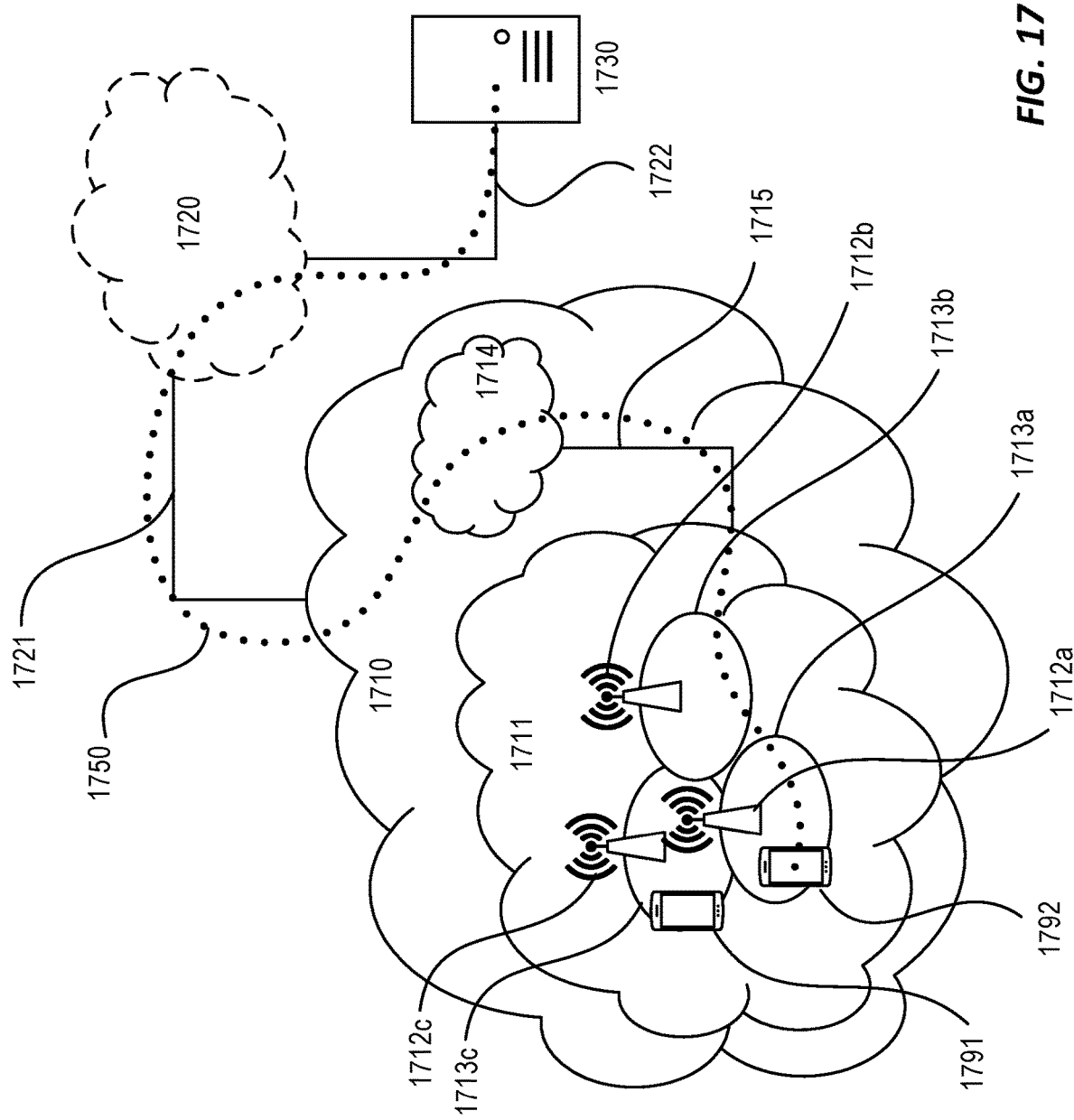
FIGS. 17-18 are block diagrams of various exemplary communication systems and/or networks, in accordance with various aspects described herein.

With reference to FIG. 17, in accordance with an embodiment, a communication system includes telecommunication network 1710, such as a 3GPP-type cellular network, which comprises access network 1711, such as a radio access network, and core network 1714. Access network 1711 comprises a plurality of base stations 1712a, 1712b, 1712c, such as NBs, eNBs, gNBs or other types of wireless access points, each defining a corresponding coverage area 1713a, 1713b, 1713c. Each base station 1712a, 1712b, 1712c is connectable to core network 1714 over a wired or wireless connection 1715. A first UE 1791 located in coverage area 1713c can be configured to wirelessly connect to, or be paged by, the corresponding base station 1712*c*. A second UE 1792 in coverage area 1713*a* is wirelessly connectable to the corresponding base station 1712*a*. While a plurality of UEs 1791, 1792 are illustrated in this example, the disclosed embodiments are equally applicable to a situation where a sole UE is in the coverage area or where a sole UE is connecting to the Telecommunication network 1710 is itself connected to host computer 1730, which can be embodied in the hardware and/or software of a standalone server, a cloud-implemented server, a distributed server or as processing resources in a server farm. Host computer 1730 can be under the ownership or control of a service provider or can be operated by the service provider or on behalf of the service provider. Connections 1721 and 1722 between telecommunication network 1710 and host computer 1730 can extend directly from core network 1714 to host computer 1730 or can go via an optional intermediate network 1720. Intermediate network 1720 can be one of, or a combination of more than one of, a public, private or hosted network; intermediate network 1720, if any, can be a backbone network or the Internet; in particular, intermediate network 1720 can comprise two or more sub-networks (not shown).

The communication system of FIG. 17 as a whole enables connectivity between the connected UEs 1791, 1792 and host computer 1730. The connectivity can be described as an over-the-top (OTT) connection 1750. Host computer 1730 and the connected UEs 1791, 1792 are configured to communicate data and/or signaling via OTT connection 1750, using access network 1711, core network 1714, any intermediate network 1720 and possible further infrastructure (not shown) as intermediaries. OTT connection 1750 can be transparent in the sense that the participating communication devices through which OTT connection 1750 passes are unaware of routing of uplink and downlink communications. For example, base station 1712 may not or need not be informed about the past routing of an incoming downlink communication with data originating from host computer 1730 to be forwarded (e.g., handed over) to a connected UE 1791. Similarly, base station 1712 need not be aware of the future routing of an outgoing uplink communication originating from the UE 1791 towards the host computer 1730.

Example implementations, in accordance with an embodiment, of the UE, base station and host computer discussed in the preceding paragraphs will now be described with reference to FIG. 18. In communication system 1800, host computer 1810 comprises hardware 1815 including communication interface 1816 configured to set up and maintain a wired or wireless connection with an interface of a different communication device of communication system 1800. Host computer 1810 further comprises processing circuitry 1818, which can have storage and/or processing capabilities. In particular, processing circuitry 1818 can comprise one or more programmable processors, application-specific integrated circuits, field programmable gate arrays or combinations of these (not shown) adapted to execute instructions. Host computer 1810 further comprises software 1811, which is stored in or accessible by host computer 1810 and executable by processing circuitry 1818. Software 1811 includes host application 1812. Host application 1812 can be operable to provide a service to a remote user, such as UE 1830 connecting via OTT connection 1850 terminating at UE 1830 and host computer 1810. In providing the service to the remote user, host application 1812 can provide user data which is transmitted using OTT connection 1850.

Communication system 1800 can also include base station 1820 provided in a telecommunication system and comprising hardware 1825 enabling it to communicate with host computer 1810 and with UE 1830. Hardware 1825 can include communication interface 1826 for setting up and maintaining a wired or wireless connection with an interface of a different communication device of communication system 1800, as well as radio interface 1827 for setting up and maintaining at least wireless connection 1870 with UE 1830 located in a coverage area (not shown in FIG. 18) served by base station 1820. Communication interface 1826 can be configured to facilitate connection 1860 to host computer 1810. Connection 1860 can be direct, or it can pass through a core network (not shown in FIG. 18) of the telecommunication system and/or through one or more intermediate networks outside the telecommunication system. In the embodiment shown, hardware 1825 of base station 1820 can also include processing circuitry 1828, which can comprise one or more programmable processors, application-specific integrated circuits, field programmable gate arrays or combinations of these (not shown) adapted to execute instructions.

Base station 1820 also includes software 1821 stored internally or accessible via an external connection. For example, software 1821 can include program instructions (also referred to as a computer program product) that, when executed by processing circuitry 1828, can configure base station 1820 to perform operations corresponding to various exemplary methods (e.g., procedures) described herein.

Communication system 1800 can also include UE 1830 already referred to, whose hardware 1835 can include radio interface 1837 configured to set up and maintain wireless connection 1870 with a base station serving a coverage area in which UE 1830 is currently located. Hardware 1835 of UE 1830 can also include processing circuitry 1838, which can comprise one or more programmable processors, application-specific integrated circuits, field programmable gate arrays or combinations of these (not shown) adapted to execute instructions.

UE 1830 also includes software 1831, which is stored in or accessible by UE 1830 and executable by processing circuitry 1838. Software 1831 includes client application 1832. Client application 1832 can be operable to provide a service to a human or non-human user via UE 1830, with the support of host computer 1810. In host computer 1810, an executing host application 1812 can communicate with the executing client application 1832 via OTT connection 1850 terminating at UE 1830 and host computer 1810. In providing the service to the user, client application 1832 can receive request data from host application 1812 and provide user data in response to the request data. OTT connection 1850 can transfer both the request data and the user data. Client application 1832 can interact with the user to generate the user data that it provides. Software 1831 can also include program instructions (also referred to as a computer program product) that, when executed by processing circuitry 1838, can configure UE 1830 to perform operations corresponding to various exemplary methods (e.g., procedures) described herein.

Figure 18:
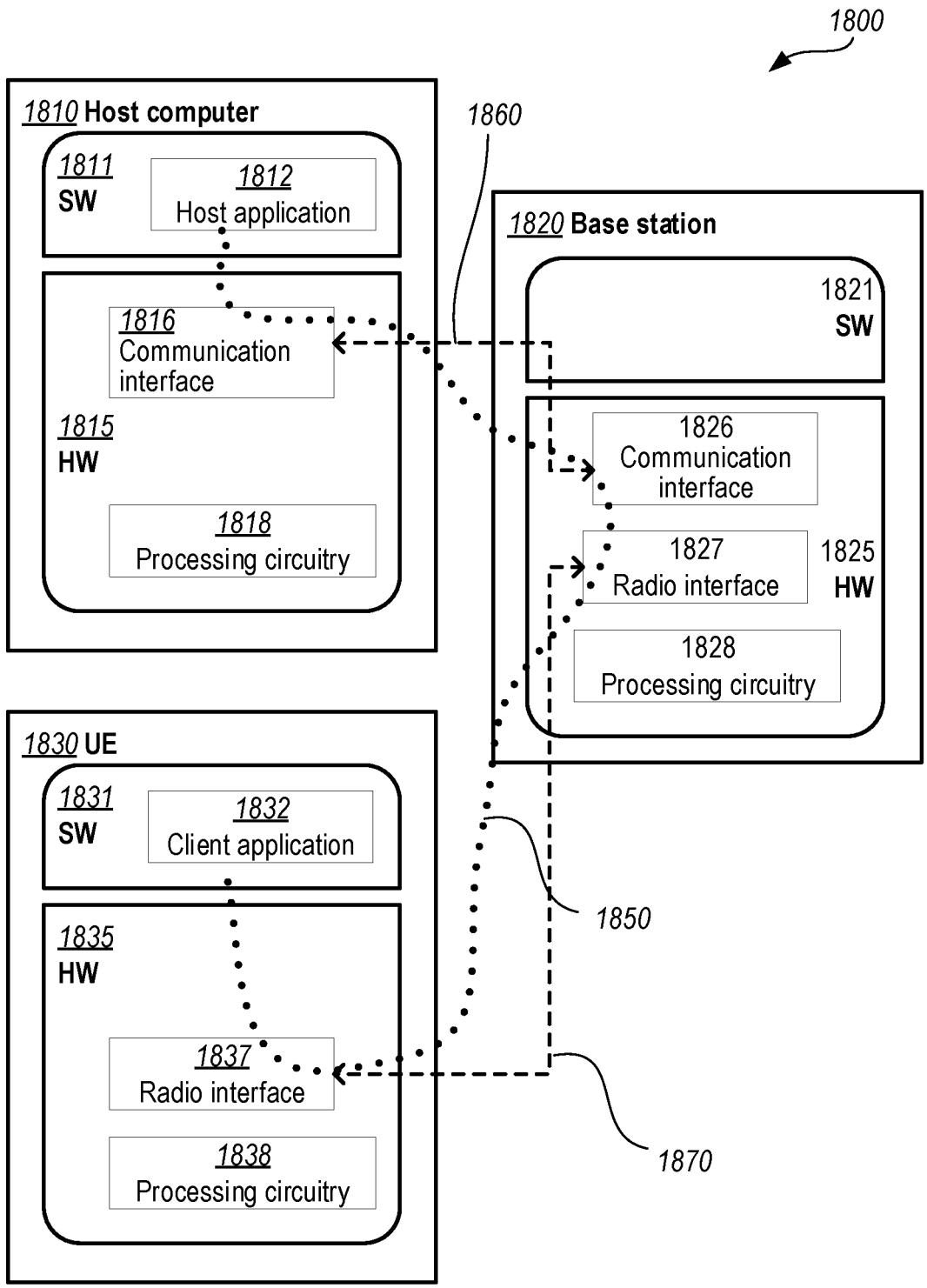

It is noted that host computer 1810, base station 1820 and UE 1830 illustrated in FIG. 18 can be similar or identical to host computer 1730, one of base stations 1712*a-c*, and one of UEs 1791, 1792 of FIG. 17, respectively. This is to say, the inner workings of these entities can be as shown in FIG. 18 and independently, the surrounding network topology can be that of FIG. 17.

In FIG. 18, OTT connection 1850 has been drawn abstractly to illustrate the communication between host computer 1810 and UE 1830 via base station 1820, without explicit reference to any intermediary devices and the precise routing of messages via these devices. Network infrastructure can determine the routing, which it can be configured to hide from UE 1830 or from the service provider operating host computer 1810, or both. While OTT connection 1850 is active, the network infrastructure can further take decisions by which it dynamically changes the routing (e.g., on the basis of load balancing consideration or reconfiguration of the network).

Wireless connection 1870 between UE 1830 and base station 1820 is in accordance with the teachings of the embodiments described throughout this disclosure. One or more of the various embodiments improve the performance of OTT services provided to UE 1830 using OTT connection 1850, in which wireless connection 1870 forms the last segment. More precisely, the exemplary embodiments disclosed herein can improve flexibility for the network to monitor end-to-end quality-of-service (QoS) of data flows, including their corresponding radio bearers, associated with data sessions between a user equipment (UE) and another entity, such as an OTT data application or service external to the 5G network. These and other advantages can facilitate more timely design, implementation, and deployment of 5G/NR solutions. Furthermore, such embodiments can facilitate flexible and timely control of data session QoS, which can lead to improvements in capacity, throughput, latency, etc. that are envisioned by 5G/NR and important for the growth of OTT services.

A measurement procedure can be provided for the purpose of monitoring data rate, latency and other network operational aspects on which the one or more embodiments improve. There can further be an optional network functionality for reconfiguring OTT connection 1850 between host computer 1810 and UE 1830, in response to variations in the measurement results. The measurement procedure and/or the network functionality for to reconfiguring OTT connection 1850 can be implemented in software 1811 and hardware 1815 of host computer 1810 or in software 1831 and hardware 1835 of UE 1830, or both. In embodiments, sensors (not shown) can be deployed in or in association with communication devices through which OTT connection 1850 passes; the sensors can participate in the measurement procedure by supplying values of the monitored quantities exemplified above, or supplying values of other physical quantities from which software 1811, 1831 can compute or estimate the monitored quantities. The reconfiguring of OTT connection 1850 can include message format, retransmission settings, preferred routing etc.; the reconfiguring need not affect base station 1820, and it can be unknown or imperceptible to base station 1820. Such procedures and functionalities can be known and practiced in the art. In certain embodiments, measurements can involve proprietary UE signaling facilitating host computer 1810's measurements of throughput, propagation times, latency and the like. The measurements can be implemented in that software 1811 and 1831 causes messages to be transmitted, in particular empty or 'dummy' messages, using OTT connection 1850 while it monitors propagation times, errors, etc.

FIG. 19 is a flowchart illustrating an exemplary method and/or procedure implemented in a communication system, in accordance with one embodiment. The communication system includes a host computer, a base station and a UE which, in some exemplary embodiments, can be those described with reference to other figures herein. For simplicity of the present disclosure, only drawing references to FIG. 19 will be included in this section. In step 1910, the host computer provides user data. In substep 1911 (which can be optional) of step 1910, the host computer provides the user data by executing a host application. In step 1920, the host computer initiates a transmission carrying the user data to the UE. In step 1930 (which can be optional), the base station transmits to the UE the user data which was carried in the transmission that the host computer initiated, in accordance with the teachings of the embodiments described throughout this disclosure. In step 1940 (which can also be optional), the UE executes a client application associated with the host application executed by the host computer.

FIG. 20 is a flowchart illustrating an exemplary method and/or procedure implemented in a communication system, in accordance with one embodiment. The communication system includes a host computer, a base station and a UE which can be those described with reference to other figures herein. For simplicity of the present disclosure, only drawing references to FIG. 20 will be included in this section. In step 2010 of the method, the host computer provides user data. In an optional substep (not shown) the host computer provides the user data by executing a host application. In step 2020, the host computer initiates a transmission carrying the user data to the UE. The transmission can pass via the base station, in accordance with the teachings of the embodiments described throughout this disclosure. In step 2030 (which can be optional), the UE receives the user data carried in the transmission.

FIG. 21 is a flowchart illustrating an exemplary method and/or procedure implemented in a communication system, in accordance with one embodiment. The communication system includes a host computer, a base station and a UE which can be those described with reference to other figures herein. For simplicity of the present disclosure, only drawing references to FIG. 21 will be included in this section. In step 2110 (which can be optional), the UE receives input data provided by the host computer. Additionally or alternatively, in step 212120, the UE provides user data. In substep 2121 (which can be optional) of step 212120, the UE provides the user data by executing a client application. In substep 2111 (which can be optional) of step 2110, the UE executes a client application which provides the user data in reaction to the received input data provided by the host computer. In providing the user data, the executed client application can further consider user input received from the user. Regardless of the specific manner in which the user data was provided, the UE initiates, in substep 2130 (which can be optional), transmission of the user data to the host computer. In step 2140 of the method, the host computer receives the user data transmitted from the UE, in accordance with the teachings of the embodiments described throughout this disclosure.

FIG. 22 is a flowchart illustrating an exemplary method and/or procedure implemented in a communication system, in accordance with one embodiment. The communication system includes a host computer, a base station and a UE which can be those described with reference to other figures herein. For simplicity of the present disclosure, only drawing references to FIG. 22 will be included in this section. In step 2210 (which can be optional), in accordance with the teachings of the embodiments described throughout this disclosure, the base station receives user data from the UE. In step 2220 (which can be optional), the base station initiates transmission of the received user data to the host computer. In step 2230 (which can be optional), the host computer receives the user data carried in the transmission initiated by the base station.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Furthermore, functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification, drawings and exemplary embodiments thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

As used herein unless expressly stated to the contrary, the phrases "at least one of" and "one or more of," followed by a conjunctive list of enumerated items (e.g., "A and B", "A, B, and C"), are intended to mean "at least one item, with each item selected from the list consisting of" the enumerated items. For example, "at least one of A and B" is intended to mean any of the following: A; B; A and B. Likewise, "one or more of A, B, and C" is intended to mean any of the following: A; B; C; A and B; B and C; A and C; A, B, and C.

As used herein unless expressly stated to the contrary, the phrase "a plurality of" followed by a conjunctive list of enumerated items (e.g., "A and B", "A, B, and C") is intended to mean "multiple items, with each item selected from the list consisting of" the enumerated items. For example, "a plurality of A and B" is intended to mean any of the following: more than one A; more than one B; or at least one A and at least one B.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

Example embodiments of the techniques and apparatus described herein include, but are not limited to, the following enumerated examples:

E1. A method, performed by a UE, for reporting failures related to mobility operations, by the UE, to a network node in a radio access network (RAN), the method comprising:
logging information associated with a plurality of failures during mobility operations related to a source cell and one or more first target cells; and
after a successful mobility operation to a second target cell served by the network node, reporting the logged information, associated with the plurality of failures, to the network node.

E2. The method of embodiment E1, further comprising:
sending a message, to the network node, indicating availability of the logged information; and
receiving, from the network node, a request for the logged information, wherein the logged information is reported in response to the request.

E3. The method of embodiment E2, wherein:
the request is a UEInformationRequest message; and
the logged information is included in a UEInformationResponse message.

E4. The method of any of embodiments E2-E3, wherein the message is one of the following:
an RRCReconfigurationComplete message transmitted after successful random access in the second target cell;
an RRCReestablishmentComplete message transmitted after successfully reestablishing a connection in the second target cell;
an RRCSetupComplete message transmitted after successful connection setup in the second target cell; or
an RRCResumeComplete message transmitted after successfully resuming a connection in the second target cell.

E5. The method of any of embodiments E1-E4, wherein the plurality of failures include any of the following:
one or more radio link failures (RLF) while monitoring for conditional handover (CHO) in the source cell;
one or more failed handovers from the source cell to any of the first target cells;
one or more failed handovers from a first one of the first target cells to a second one of the first target cells;
one or more failed conditional handovers (CHO) from the source cell to any of the first target cells; and
one or more failed CHOs from a first one of the first target cells to a second one of the first target cells.

E6. The method of any of embodiments E1-E5, wherein the successful mobility operation includes one of the following:
- a handover to the second target cell;
- a conditional handover (CHO) to the second target cell;
- a connection re-establishment procedure with the second target cell;
- a connection resume procedure with the second target cell; or
- a connection setup procedure with the second target cell.

E7. The method of any of embodiments E1-E6, wherein the logged information, for each failure, includes one or more of the following:
- random-access failure information for one of the first target cells;
- UE measurement information, at time of the failure, associated with one or more of the following:
  - the source cell,
  - one or more of the first target cells,
  - the second target cell,
  - one or more candidate target cells associated with a conditional handover (CHO) configuration, and
  - one or more neighbor cells not associated with a CHO configuration;
- UE location information at the time of the failure;
- UE measurements for other radio technologies;
- CHO configuration associated with the failure; and
- UE timer values at the time of the failure.

E8. The method of any of embodiments E1-E7, wherein the logged information is reported according to one of the following formats:
- a field in a radio link failure (RLF) report;
- a field in a successful handover report; or
- a separate report from other mobility-related reports.

E9. The method of any of embodiments E1-E8, wherein:
- the logged information for each failure includes a failure type identifier;
- each failure type identifier indicates one of the following types of failures: radio link failure, handover failure, or conditional handover failure.

E10. A method, performed by a network node in a radio access network (RAN), for receiving failure reports related to mobility operations by a user equipment (UE), the method comprising:
- performing a successful mobility operation, for the UE, with respect to a second target cell served by the network node; and
- subsequently receiving information, from the UE, associated with a plurality of failures during UE mobility operations related to a source cell and one or more first target cells.

E11. The method of embodiment E10, further comprising:
- receiving a message, from the UE, indicating availability of the information; and
- sending, to the UE, a request for the information, wherein the information is received in response to the request.

E12. The method of embodiment E11, wherein:
- the request is a UEInformationRequest message; and
- the information is included in a UEInformationResponse message.

E13. The method of any of embodiments E11-E12, wherein the message is one of the following:
- an RRCReconfigurationComplete message received after the UE's successful random access in the second target cell;
- an RRCReestablishmentComplete message received after the UE successfully reestablishes a connection in the second target cell;
- an RRCSetupComplete message received after successful connection setup by the UE in the second target cell; or
- an RRCResumeComplete message received after the UE successfully resumes a connection in the second target cell.

E14. The method of any of embodiments E10-E13, wherein the plurality of failures include any of the following:
- one or more radio link failures (RLF) during UE monitoring for conditional handover (CHO) in the source cell;
- one or more failed handovers of the UE from the source cell to any of the first target cells;
- one or more failed handovers of the UE from a first one of the first target cells to a second one of the first target cells;
- one or more failed conditional handovers (CHO) of the UE from the source cell to any of the first target cells; and
- one or more failed CHOs of the UE from a first one of the first target cells to a second one of the first target cells.

E15. The method of any of embodiments E10-E14, wherein the successful mobility operation includes one of the following:
- a handover to the second target cell;
- a conditional handover (CHO) to the second target cell;
- a connection re-establishment procedure with the second target cell;
- a connection resume procedure with the second target cell; or
- a connection setup procedure with the second target cell.

E16. The method of any of embodiments E10-E15, wherein the information, for each failure, includes one or more of the following:
- random-access failure information for one of the first target cells;
- UE measurement information, at time of the failure, associated with one or more of the following:
  - the source cell,
  - one or more of the first target cells,
  - the second target cell,
  - one or more candidate target cells associated with a conditional handover (CHO) configuration, and
  - one or more neighbor cells not associated with a CHO configuration;
- UE location information at the time of the failure;
- UE measurements for other radio technologies;
- CHO configuration associated with the failure; and
- UE timer values at the time of the failure.

E17. The method of any of embodiments E10-E16, wherein the information is received according to one of the following formats:
- a field in a radio link failure (RLF) report;
- a field in a successful handover report; or
- a separate report from other mobility-related reports.

E18. The method of any of embodiments E10-E17, wherein:
- the information for each failure includes a failure type identifier;

each failure type identifier indicates one of the following types of failures: radio link failure, handover failure; or conditional handover failure.

E19. The method of any of embodiments E10-E18, further comprising:
based on the received information, determining one or more further nodes associated with the failures during the UE mobility operations;
parsing the received information into respective information associated with the respective further nodes; and
sending the respective information to the respective further nodes.

E20. A user equipment (UE) configured to report failures related to mobility operations, by the UE, to a network node in a radio access network (RAN), the UE comprising:
radio interface circuitry configured to communicate with one or more network nodes via one or more cells in the RAN; and
processing circuitry operably coupled to the radio interface circuitry, whereby the processing circuitry and the radio interface circuitry are configured to perform operations corresponding to any of the methods of embodiments E1-E9.

E21. A user equipment (UE) configured to report failures related to mobility operations, by the UE, to a network node in a radio access network (RAN), the UE being further arranged to perform operations corresponding to any of the methods of embodiments E1-E9.

E22. A non-transitory, computer-readable medium storing program instructions that, when executed by processing circuitry of a user equipment (UE) configured to report failures related to mobility operations, by the UE, to a network node in a radio access network (RAN), configure the UE to perform operations corresponding to any of the methods of embodiments E1-E9.

E23. A computer program product comprising program instructions that, when executed by processing circuitry of a user equipment (UE) configured to report failures related to mobility operations, by the UE, to a network node in a radio access network (RAN), configure the UE to perform operations corresponding to any of the methods of embodiments E1-E9.

E24. A network node, in a radio access network (RAN), configured to receive failure reports related to mobility operations by a user equipment (UE), the network node comprising:
communication interface circuitry configured to communicate with the UE and with one or more other network nodes in the RAN; and
processing circuitry operably coupled with the communication interface circuitry, whereby the processing circuitry and the communication interface circuitry are configured to perform operations corresponding to any of the methods of embodiments E10-E19.

E25. A network node, in a radio access network (RAN), configured to receive failure reports related to mobility operations by a user equipment (UE), the network node being further arranged to perform operations corresponding to any of the methods of embodiments E10-E19.

E26. A non-transitory, computer-readable medium storing program instructions that, when executed by processing circuitry of a network node configured to receive failure reports related to mobility operations by a user equipment (UE), configure the network node to perform operations corresponding to any of the methods of embodiments E10-E19.

E27. A computer program product comprising program instructions that, when executed by processing circuitry of a network node configured to receive failure reports related to mobility operations by a user equipment (UE), configure the network node to perform operations corresponding to any of the methods of embodiments E10-E19.

The invention claimed is:

1. A method, performed by a user equipment (UE) for reporting failures related to mobility operations, by the UE, to a network node in a radio access network (RAN), the method comprising:
logging information associated with a plurality of failures during conditional handover (CHO) operations related to a source cell and one or more first target cells; and
after a successful mobility operation to a second target cell served by the network node, reporting to the network node the logged information associated with the plurality of failures, wherein:
the plurality of failures include a first failure and a subsequent second failure;
the first failure is one of the following: a radio link failure (RLF) while monitoring for CHO in the source cell, or a failed CHO to a first one of the first target cells; and
the second failure is a failed CHO to a second one of the first target cells.

2. The method of claim 1, further comprising:
sending a message, to the network node, indicating availability of the logged information; and
receiving a request for the logged information from the network node in response to the message,
wherein the logged information is reported in response to the request.

3. The method of claim 1, further comprising, in response to the first failure, selecting the second one of the first target cells based on the UE having a stored CHO configuration for the second one of the first target cells.

4. The method of claim 1, wherein the first failure is an RLF while monitoring for CHO in the source cell.

5. The method of claim 1, wherein the logged information for each failed CHO includes a CHO configuration associated with the failure.

6. The method of claim 1, wherein the logged information, for each failure, includes one or more of the following:
random-access failure information for one of the first target cells;
UE measurement information, at time of the failure, associated with one or more of the following:
the source cell,
one or more of the first target cells,
the second target cell,
one or more candidate target cells associated with a CHO configuration, and
one or more neighbor cells not associated with a CHO configuration;
UE location information at the time of the failure;
UE measurements for other radio technologies;
CHO configuration associated with the failure; and
UE timer values at the time of the failure.

7. The method of claim 1, wherein:
the logged information for each failure includes a failure type identifier; and each failure type identifier indicates one of the following types of failures: radio link failure, handover failure, or conditional handover failure.

8. The method of claim 1, wherein the logged information for each failed CHO includes a failure type identifier indicating that the failure is a CHO failure.

9. A user equipment (UE) configured to report failures related to mobility operations, by the UE, to a network node in a radio access network (RAN), the UE comprising:
   radio interface circuitry configured to communicate with one or more network nodes via one or more cells in the RAN; and
   processing circuitry operably coupled to the radio interface circuitry, whereby the processing circuitry and the radio interface circuitry are configured to:
      log information associated with a plurality of failures during conditional handover (CHO) operations related to a source cell and one or more first target cells; and
      after a successful mobility operation to a second target cell served by the network node, report to the network node the logged information associated with the plurality of failures, wherein:
      the plurality of failures include a first failure and a subsequent second failure;
      the first failure is one of the following: a radio link failure (RLF) while monitoring for CHO in the source cell, or a failed CHO to a first one of the first target cells; and
      the second failure is a failed CHO to a second one of the first target cells.

10. The UE of claim 9, wherein the processing circuitry and the radio interface circuitry are further configured to:
   send a message, to the network node, indicating availability of the logged information; and
   receive a request for the logged information from the network node in response to the message,
   wherein the logged information is reported in response to the request.

11. The UE of claim 9, wherein the processing circuitry and the radio interface circuitry are further configured to select, in response to the first failure, the second one of the first target cells based on the UE having a stored CHO configuration for the second one of the first target cells.

12. The UE of claim 9, wherein the first failure is an RLF while monitoring for CHO in the source cell.

13. The UE of claim 9, wherein the logged information for each failed CHO includes a CHO configuration associated with the failure.

14. The UE of claim 9, wherein the logged information, for each failure, includes one or more of the following:
   random-access failure information for one of the first target cells;
   UE measurement information, at time of the failure, associated with one or more of the following:
      the source cell,
      one or more of the first target cells,
      the second target cell,
      one or more candidate target cells associated with a CHO configuration, and
      one or more neighbor cells not associated with a CHO configuration;
   UE location information at the time of the failure;
   UE measurements for other radio technologies;
   CHO configuration associated with the failure; and
   UE timer values at the time of the failure.

15. The UE of claim 9, wherein:
   the logged information for each failure includes a failure type identifier; and
   each failure type identifier indicates one of the following types of failures: radio link failure, handover failure, or conditional handover failure.

16. The UE of claim 9, wherein the logged information for each failed CHO includes a failure type identifier indicating that the failure is a CHO failure.

17. The UE of claim 9, wherein the successful mobility operation includes one of the following:
   a handover to the second target cell;
   a CHO to the second target cell;
   a connection re-establishment procedure with the second target cell;
   a connection resume procedure with the second target cell; or
   a connection setup procedure with the second target cell.

18. A non-transitory, computer-readable medium storing program instructions that, when executed by processing circuitry of a user equipment (UE), configure the UE to perform operations corresponding to the method of claim 1.

* * * * *